US006951998B2

(12) United States Patent
Nanno et al.

(10) Patent No.: US 6,951,998 B2
(45) Date of Patent: Oct. 4, 2005

(54) CONTROLLER, TEMPERATURE REGULATOR AND HEAT TREATMENT APPARATUS

(75) Inventors: Ikuo Nanno, Kyoto (JP); Kousaku Ando, Kyoto (JP); Masahito Tanaka, Kyoto (JP); Seiya Narimatsu, Kyoto (JP); Naotaka Uchiyama, Kyoto (JP); Motohisa Furukawa, Kyoto (JP); Akira Takaishi, Kyoto (JP); Yuuki Kataoka, Kyoto (JP); Tsunetoshi Ooba, Kyoto (JP); Atsushi Mukai, Kyoto (JP); Takeshi Wakabayashi, Kyoto (JP); Hirokazu Kitamura, Kyoto (JP); Nobumasa Nakamizo, Kyoto (JP); Hideki Kobori, Kyoto (JP)

(73) Assignee: Omron Corporation, Kyoto (JP)

( * ) Notice: Subject to any disclaimer, the term of this patent is extended or adjusted under 35 U.S.C. 154(b) by 471 days.

(21) Appl. No.: 10/257,241

(22) PCT Filed: Apr. 13, 2001

(86) PCT No.: PCT/JP01/03179

§ 371 (c)(1),
(2), (4) Date: Oct. 10, 2002

(87) PCT Pub. No.: WO01/79942

PCT Pub. Date: Oct. 25, 2001

(65) Prior Publication Data

US 2003/0121905 A1 Jul. 3, 2003

(30) Foreign Application Priority Data

| Apr. 14, 2000 | (JP) | ........................................ 2000-113402 |
| Apr. 14, 2000 | (JP) | ........................................ 2000-113403 |
| Apr. 18, 2000 | (JP) | ........................................ 2000-116351 |
| Nov. 20, 2000 | (JP) | ........................................ 2000-353321 |

(51) Int. Cl.$^7$ ................................................ H05B 1/02
(52) U.S. Cl. ...................... 219/494; 219/486; 700/300; 236/78 B; 236/78 D; 165/205
(58) Field of Search ................................ 219/494, 486, 219/501; 700/90, 299, 300, 278; 236/78 B, 78 D; 165/205

(56) References Cited

U.S. PATENT DOCUMENTS

| 5,816,538 A | * | 10/1998 | Challoner et al. | .......... 244/170 |
| 6,622,104 B2 | * | 9/2003 | Wang et al. | .................. 702/99 |
| 2003/0111458 A1 | * | 6/2003 | Wakui et al. | ............... 219/494 |

FOREIGN PATENT DOCUMENTS

| DE | 3505795 | * | 8/1986 |
| GB | 2201014 | * | 8/1998 |

(Continued)

*Primary Examiner*—John A. Jeffery
(74) *Attorney, Agent, or Firm*—Foley & Lardner LLP

(57) ABSTRACT

A plurality of individually corresponding heaters and temperature sensors are provided along with a plurality of a PID control means. An average temperature/gradient temperature calculating means calculates the average temperatures of the temperatures measured by the temperature sensors and the gradient temperatures based on the measured temperatures. Each of the PID control means outputs an operation signal so that the average temperatures or gradient temperatures may be made equal to the desired values. A distributing means distributes the operation signal from each of the PID control means to each heater so that control by the PID control means may produce no effect on the control of the other PID control means.

79 Claims, 65 Drawing Sheets

FOREIGN PATENT DOCUMENTS

| | | | |
|---|---|---|---|
| JP | 61-131103 A | | 6/1986 |
| JP | 61-131103 | * | 6/1986 |
| JP | 1-141024 | * | 6/1989 |
| JP | 4-12689 | * | 1/1992 |
| JP | 7-261803 | * | 10/1995 |
| JP | 8-95648 | * | 4/1996 |
| JP | 8-202405 | * | 8/1996 |
| JP | 8-328603 | * | 12/1996 |
| JP | 11-54244 | * | 2/1999 |
| JP | 11-296204 | * | 10/1999 |
| JP | 2000-78750 | * | 3/2000 |
| JP | 2000-187514 | * | 7/2000 |
| JP | 2000-187614 A | | 7/2000 |
| JP | 2003-114724 | * | 4/2003 |
| WO | 90/06432 | * | 6/1990 |

\* cited by examiner

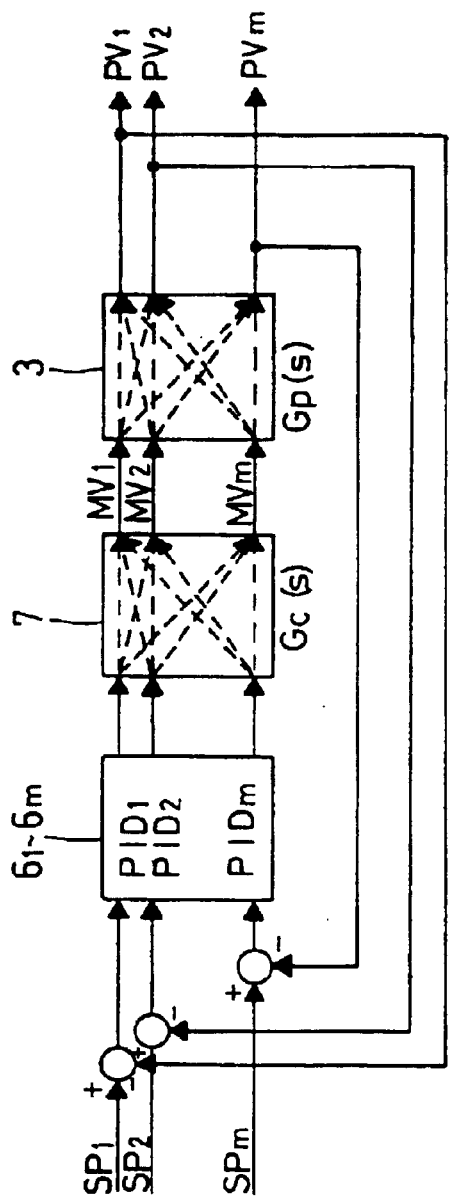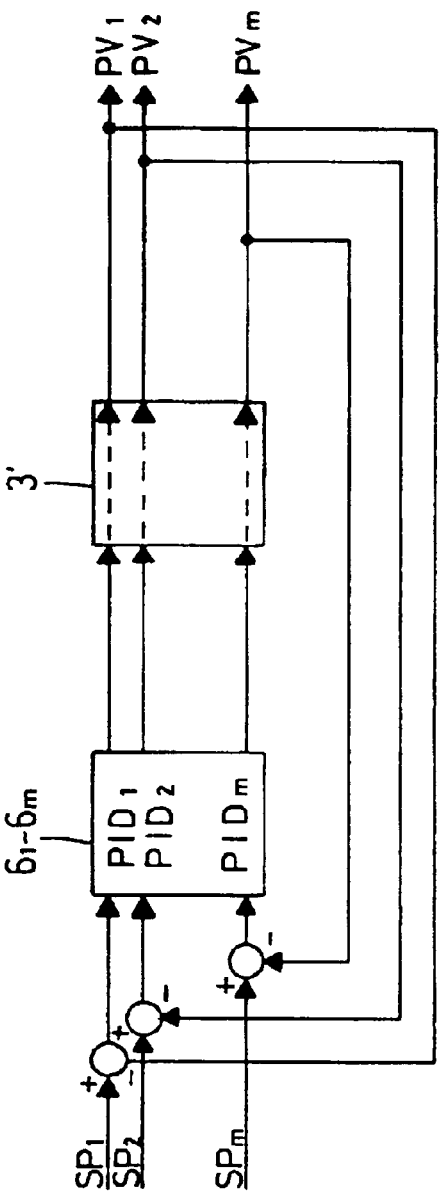
FIG. 9A
FIG. 9B

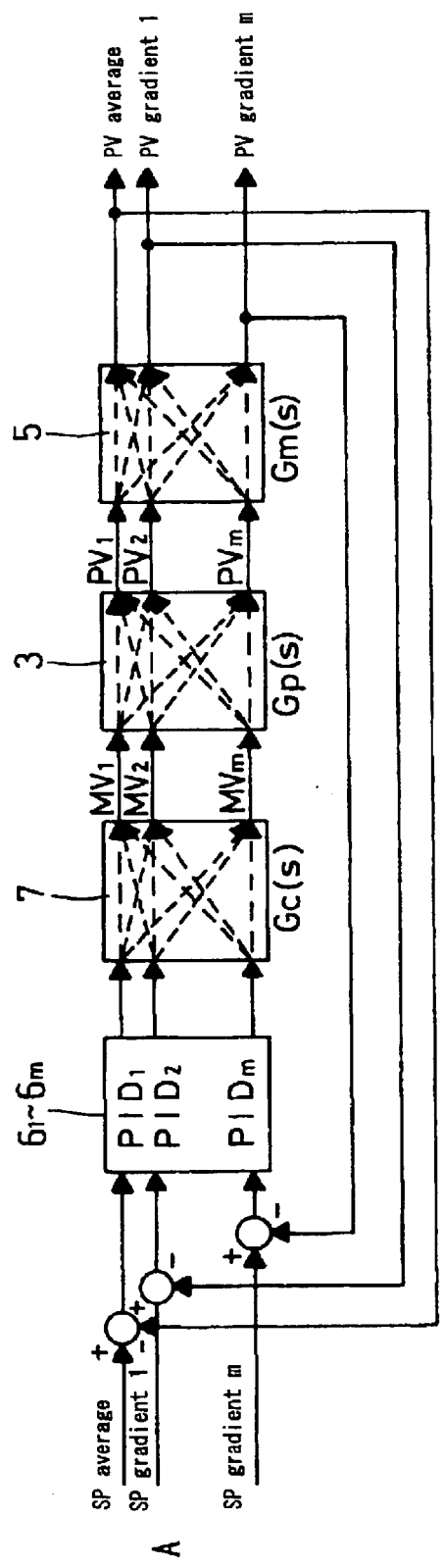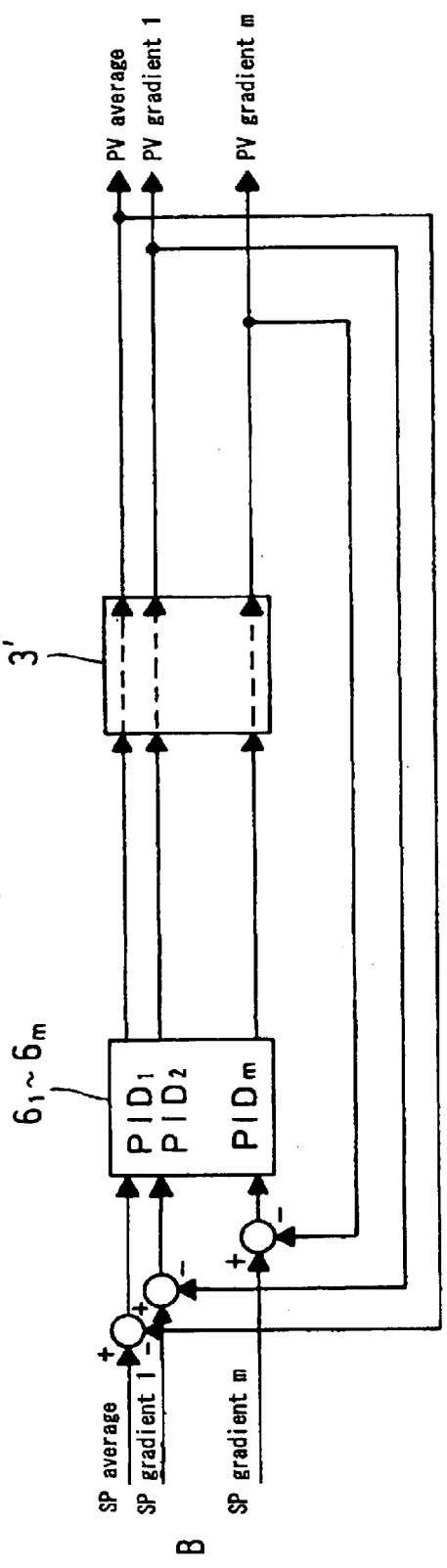
FIG. 10A
FIG. 10B

CONTROLLER, TEMPERATURE REGULATOR AND HEAT TREATMENT APPARATUS

TECHNICAL FIELD

The present invention relates to a controller which controls physical conditions of a control target, such as temperature and pressure, a temperature regulator which controls the temperature of the control target as a physical condition, and a heat treatment apparatus which uses the temperature regulator.

BACKGROUND ART

Some temperature regulators are used for the temperature control of the reaction tube in a heat treatment apparatus such as a heat oxidation apparatus in a semiconductor fabrication process. The heat oxidation apparatus is adapted to generate an oxidation film on a wafer put in a reaction tube while supplying necessary gas therein. The inside of the reaction tube is divided into plural zones each provided with a heater and a temperature sensor, although these zones are spatially communicated with each other. The detection result of each temperature sensor is inputted to the temperature regulator having a microcomputer and the like.

The temperature regulator controls the temperature of the corresponding zone by controlling each heater in accordance with the detection result of the corresponding temperature sensor. These zones of the reaction tube are thermally open to each other, so the amount of heat from a heater in a zone affects or causes interference with a temperature sensor in another zone. Such interference causes remarkable variations in temperature between each zone especially at the time of transient or in the presence of disturbance, making it difficult to perform uniform temperature control of each zone. The interference also makes it uneasy to control the different zones at different target temperatures.

In view of these, the present invention has a main object of providing a controller capable of keeping the control target under desired physical conditions by reducing the interference, even if the control target has the interference.

DISCLOSURE OF THE INVENTION

In summary, a controller according to the present invention comprises: a converting means for converting detection information from plural-detecting means for respectively detecting a physical condition of a control target into information indicating a gradient of the physical condition and into information indicating a representative of the physical conditions; a plurality of condition control means which are individually given the information from the converting means; and a distribution means for distributing operation signals transmitted from the plurality of condition control means to a plurality of operating means for operating the control target so that control of each of the plurality of condition control means may produce less effect on control of another condition control means.

The physical conditions indicate the conditions of various physical quantities such as temperature, pressure, flow amount, speed, and liquid level.

The gradient of physical conditions indicates the gradient of various physical quantities such as temperature gradient, pressure gradient, flow amount gradient, and speed gradient. The temperature gradient indicates temperature difference or gradient temperature.

The representative of the physical conditions indicates the one typically showing physical conditions of the target to be controlled. With respect to temperature, for example, the representative indicates the average temperature or the temperature at a certain position (e.g., the central position) of the control target.

The operating means indicates a means for changing physical conditions of the control target. For example, in the case of temperature, it indicates a heating means or a cooling means to increase or decrease the temperature of the control target.

According to the controller of the present invention, control is carried out by converting the detection information from the plurality of detecting means into information indicating the gradient of a physical condition and information indicating the representative, that is, when the physical condition indicates temperature, into the gradient temperature (temperature difference) as the temperature gradient and the average temperature indicating the representative or the temperature at a certain position of the control target. In other words, converting the detection information into interference-free independent information is carried out. Distribution is carried out by the distribution means so that control of each of the condition control means may produce no effect on control of another condition control means. As a result, in the control of a control target with interference, the interference can be reduced.

The controller of the present invention can be so structured that the converting means can convert a deviation between the detection information obtained from the plurality of detecting means and plural pieces of target information individually corresponding to the plurality of detecting means into a deviation of the information indicating a gradient of a physical condition and into a deviation of the information indicating the representative of the physical condition, and the two deviations can be individually given to the plurality of condition control means.

The target information indicates the information about the control target of a physical condition, such as target temperature, target pressure, and target flow amount.

In the controller of the present invention comprising a plurality of condition control means for individually outputting operation signals to a plurality of operating means individually corresponding to the plurality of detecting means, based on the deviations between plural pieces of detection information obtained from the plurality of detecting means for individually detecting the physical condition of the control target and plural pieces of target information, at least one interference-reducing control means is provided for outputting, based on the deviation corresponding to a detecting means, an operation signal to another operating means that does not correspond to the detecting means. As a result, in the same manner as in the controller equipped with the converting means and the distribution means, interference can be reduced in the control of the control target with interference.

The interference-reducing control means functions so that control of one of the condition control means produces no effect on control of another condition control means.

The controller of the present invention comprises: an estimating means for estimating a physical condition of an object to be processed and outputting plural pieces of estimation information, based on detection information transmitted from a plurality of detecting means for individually detecting the physical condition of a processing means for processing the object; a converting means for converting plural pieces of estimation information estimated by the estimating means into information indicating a gradient of the physical condition and information indicating a representative of the physical condition; a plurality of condition control means for individually outputting operation signal, based on the information indicating the gradient or the information indicating the representative obtained from the converting means; and a distribution means for distributing the operation signals transmitted from the plurality of condition control means to a plurality of operating means for operating the processing mean so that control of each of the condition control means may produce less effect on control of another condition control means.

According to the present invention, a physical condition of the object to be processed by the processing means, such as a wafer to be heat-processed by a heat-treated plate, can be estimated based on the physical condition of the processing means, e.g., the detection information obtained from the detecting means for detecting the temperature of the heat-treated plate, and control is carried out based on the estimated physical condition, thereby keeping the physical condition of the object to be processed under a desired condition by reducing the interference.

Alternatively, the controller of the present invention can be so designed that the converting means can convert the deviation between the plural pieces of estimation information estimated based on the detection information obtained from the plurality of detecting means and plural target information into the deviation of the information indicating the gradient of a physical condition and the deviation of the information indicating the representative of the physical condition, thereby individually giving the deviations to the plurality of condition control means.

BRIEF DESCRIPTION OF THE DRAWINGS

FIGS. 9A and 9B are block diagrams for explaining an interference-reducing control technique.

FIGS. 10A and 10B are block diagrams for explaining the predistorter of the embodiment.

BEST MODE FOR CARRING OUT THE INVENTION

A preferred embodiment of the present invention will be described in detail as follows with reference to the accompanying drawings.

Figure 1:
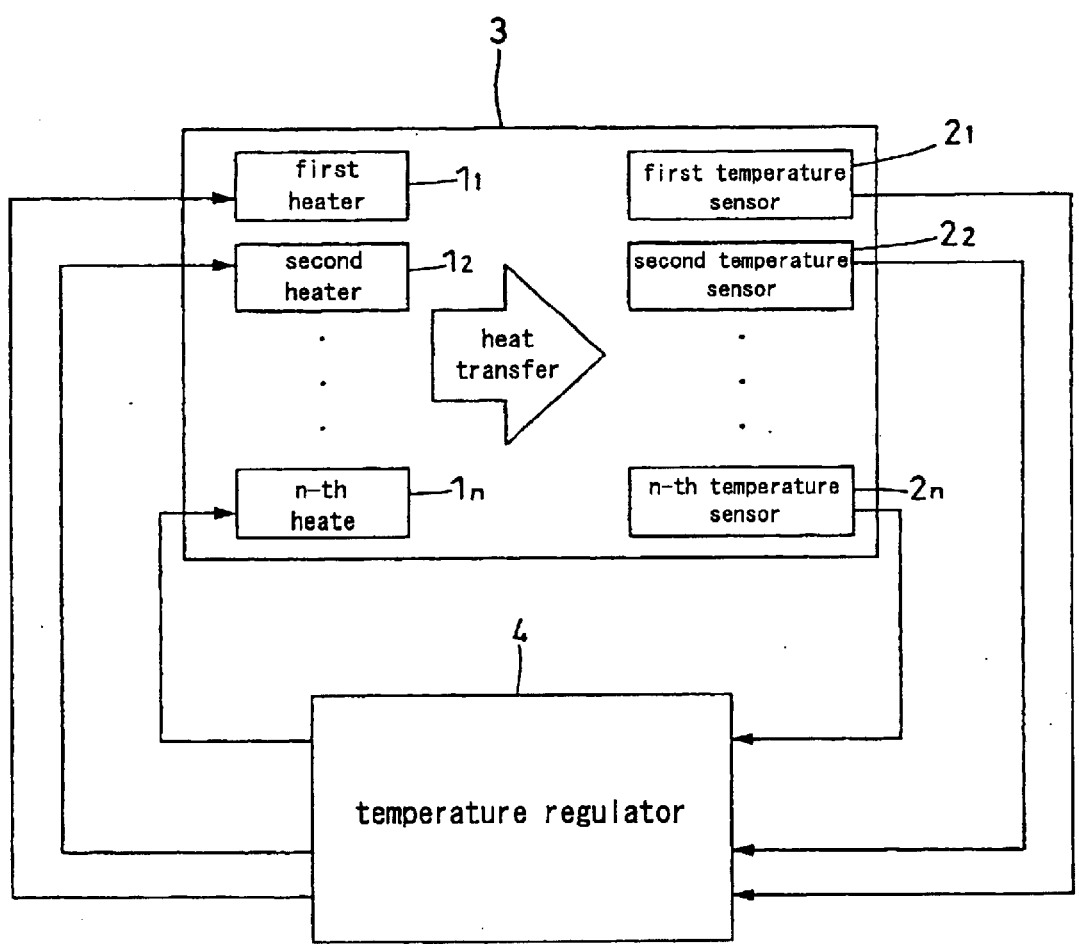
FIG. 1 is a schematic block diagram of a temperature control system according to a preferred embodiment of the present invention.

FIG. 1 shows a schematic block diagram of a temperature control system using a temperature regulator according to an embodiment of the present invention.

The temperature control system of the present embodiment is composed of a plurality of heaters $1_1$–$1_n$ for heating a control target 3; a plurality of temperature sensors $2_1$–$2_n$ for detecting temperatures of the control target 3 in correspondence with the heaters $1_1$–$1_n$ respectively, and; a temperature regulator 4 of the present invention for operating the heaters $1_1$–$1n$ via unillustrated electromagnetic switches, based on the detection results of these temperature sensors $2_1$–$2n$, thereby controlling the temperatures of the control target 3.

The control target 3 in the present embodiment causes thermally contiguous interference, and the heater $1_1$–$1n$ and the corresponding temperature sensors $2_1$–$2n$ are disposed close to each other to form a plurality of zones.

Figure 2:
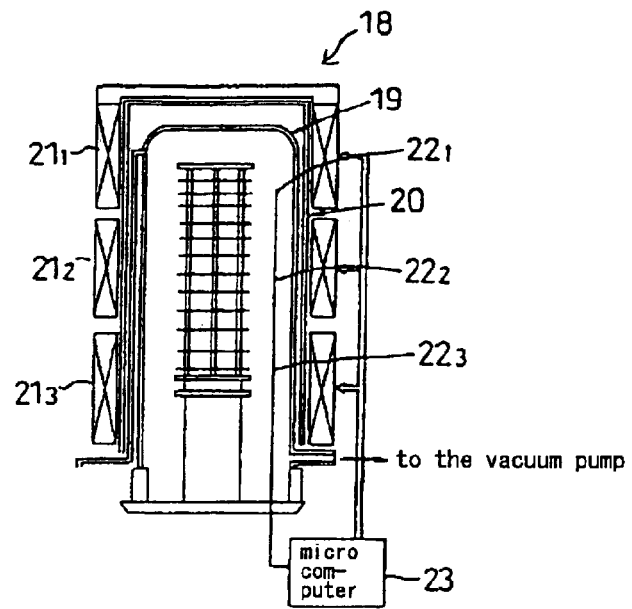
FIG. 2 is a block diagram of a heat oxidation apparatus used to explain the system of the present invention.

This temperature control system can be applied, e.g., to a heat oxidation apparatus 18 shown in FIG. 2 which is described in the background art. The control target 3 can be applied to a reaction tube 19; the first to third heaters $1_1$ to $1_3$ to the first to third heaters $21_1$ to $21_3$ separately arranged around the reaction tube 19; the first to third temperature sensors $2_1$ to $2_3$ to the first to third temperature sensors $22_1$ to $22_3$ detecting the temperatures of the corresponding zones; and the temperature regulator 4 to a temperature regulator composed of a microcomputer 23.

Figure 3:
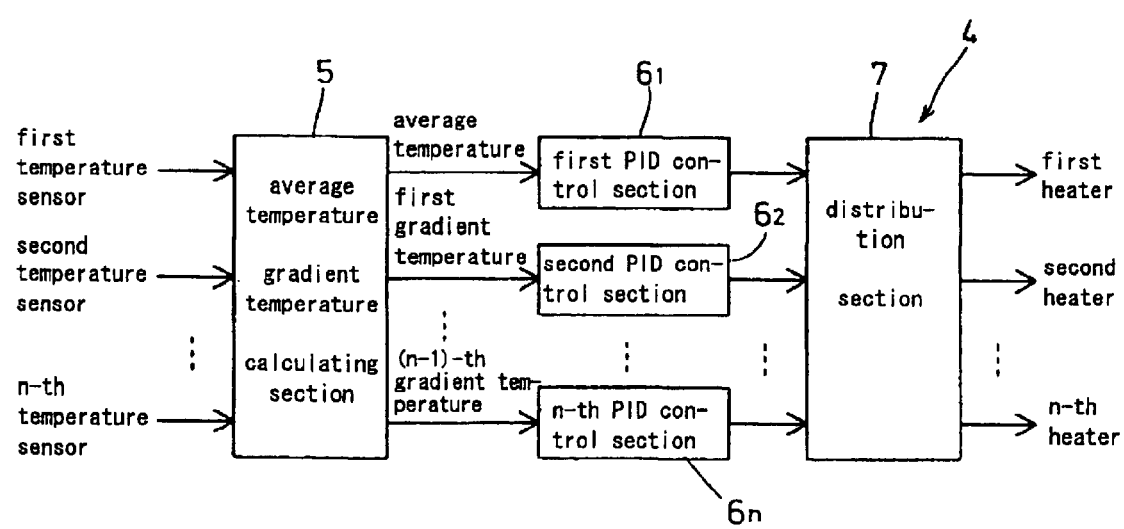
FIG. 3 is a block diagram of a temperature regulator of FIG. 1.

FIG. 3 shows a block diagram of the temperature regulator 4 of FIG. 1, which is composed of an average temperature/gradient temperature calculating means (hereinafter also referred to as the mode converter) 5 as a converting means, PID control means $6_1$ to $6n$, and a distribution means (hereinafter also referred to as the predistorter) 7.

The average temperature/gradient temperature calculating means 5 calculates an average temperature of the temperatures detected by the temperature sensors $2_1$ to $2n$ and gradient temperatures (temperature differences) based on the detected temperatures as described below.

The PID control means $6_1$ to $6n$ are plural temperature control means which receive the average temperatures or the gradient temperatures calculated by the calculating means 5.

The distribution means 7 distributes operation signals (the amount of operation) transmitted from the PID control means $6_1$ to $6n$ to the heaters $1_1$–$1n$ as plural operating means in a predetermined distribution ratio as described below.

The average temperature/gradient temperature calculating means 5, the PID control means $6_1$–$6n$, and the distribution means 7 are composed of a microcomputer or the like.

In the present embodiment, in order to eliminate interference, the average temperature as a representative temperature and plural gradient temperatures calculated by the average temperature/gradient temperature calculating means 5 are used as the amount of control for carrying out temperature control.

The average temperature/gradient temperature calculating means 5 as the converting means converts plural detection temperatures which are detection information from plural temperature sensors $2_1$–$2n$ into information about one average temperature and plural gradient temperatures.

This conversion is done to make the information free of interference, independent, and easy to understand; for example, the following calculation is carried out.

The average temperature/gradient temperature calculating means 5 calculates the average temperature Tav, the first gradient temperature Tt1, the second gradient temperature Tt2, . . . the (n−1)-th gradient temperature $Tt_{n-1}$ according to the following numerical formula.

$$Tav = (S1 + S2 + \ldots + Sn) \div n$$

$$Tt1 = (S1 + S2 + \ldots + S_{n-1}) \div (n-1) - Sn$$

$$Tt2 = (S1 + S2 + \ldots + S_{n-2}) \div (n-2) - S_{n-1}$$

$$Tt_{n-1} = S1 - S2, \text{ wherein}$$

S1: the detection temperature of the first temperature sensor $2_1$;

S2: the detection temperature of the second temperature sensor $2_2$;

Sn: the detection temperature of the n-th temperature sensor 2n;

Tav: the average temperature of the detection temperatures of plural temperature sensors $2_1$ to 2n;

Tt1: the temperature difference (gradient temperature) between the average detection temperature of the temperature sensors $2_1$ to $2_{n-2}$ and the detection temperature of the temperature sensor 2n when the temperature sensors $2_1$ to 2n are divided into the temperature sensors $2_1$ to $2_{n-1}$ and the temperature sensor 2n;

Tt2: the temperature difference (gradient temperature) between the average detection temperature of the temperature sensors $2_1$ to $2_{n-2}$ and the detection temperature of the temperature sensor $2_{n-1}$ when plural temperature sensors $2_1$ to $2_{n-1}$ are divided into the temperature sensors $2_1$ to $2_{n-2}$ and the temperature sensor $2_{n-1}$; and $Tt_{n-1}$; the temperature difference (gradient temperature) between the detection temperature of the temperature sensor $2_1$ and the detection temperature of the temperature sensor $2_2$.

The above numerical formulas can be expressed totally as follows, using a matrix called mode conversion matrix Gm.

[Numerical Formula 1]

$$Gm = \begin{pmatrix} \frac{1}{n} & \frac{1}{n} & \frac{1}{n} & \cdots & \frac{1}{n} \\ \frac{1}{n-1} & \frac{1}{n-1} & \frac{1}{n-1} & \cdots & -1 \\ \frac{1}{n-2} & \frac{1}{n-2} & \frac{1}{n-2} & \cdots & -10 \\ \cdots & \cdots & \cdots & & \\ 1 & -1 & 0 & \cdots & 0 \end{pmatrix}$$

$T = Gm \cdot S$, wherein $T = [Tav \ Tt1 \ Tt2 \ \ldots \ Tt_{n-1}]^T$ $S = [S1 \ S2 \ S3 \ \ldots \ S_n]^T$.

The average temperature Tav and plural gradient temperatures Tt1 to $Tt_{n-1}$ are treated as the amount of control.

The gradient temperature is not restricted to the one used in the present embodiment. For example, as shown in the mode conversion matrix Gm shown below, the temperature difference between the detection temperatures of adjacent temperature sensors or the temperature difference between the average detection temperatures of two groups of plural temperature sensors can be used as the gradient temperature.

[Numerical Formula 2]

$$Gm = \begin{pmatrix} \frac{1}{n} & \frac{1}{n} & \frac{1}{n} & \cdots & \cdots & \cdots & \frac{1}{n} \\ 1 & -1 & 0 & \cdots & \cdots & \cdots & 0 \\ 0 & 1 & -1 & 0 & \cdots & \cdots & 0 \\ \cdots & \cdots & \cdots & \cdots & & & \\ 0 & 0 & \cdots & \cdots & 0 & 1 & -1 \end{pmatrix}$$

The gradient temperature can be either a macro or a micro gradient temperature obtained by calculating the temperature difference between the average detection temperatures of 2 groups of plural temperature sensors, the temperature difference between the average detection temperatures of 4 groups generated by dividing each of the 2 groups into two; the temperature difference between the average detection temperatures of 8 groups generated by dividing each of the 4 groups into two, and so on.

In short, temperature control can be carried out separately between information indicating temperature gradient and information indicating the representative of the temperatures of a control target, e.g., information indicating the average temperatures.

The first PID control means $6_1$ outputs an operation signal to the distribution means 7 so that the average temperature becomes the target average temperature, based on the control deviation of the average temperature transmitted from the average temperature/gradient temperature calculating means 5 and the target average temperature (the target value of the average temperature).

The second PID control means $6_2$ outputs an operation signal to the distribution means 7 so that the first gradient temperature becomes the first target gradient temperature, based on the control deviation of the first gradient temperature transmitted from the average temperature/gradient temperature calculating means 5 and the first target gradient temperature (the target value of the first gradient temperature).

The third PID control means $6_3$ outputs an operation signal to the distribution means 7 so that the second gradient temperature becomes the second target gradient temperature, based on the control deviation of the second gradient temperature transmitted from the average temperature/gradient temperature calculating means 5 and the second target gradient temperature (the target value of the second gradient temperature).

Similarly, the n-th PID control means 6n outputs an operation signal to the distribution means 7 so that the (n−1)-th gradient temperature becomes the (n−1)-th target gradient temperature, based on the control deviation of the (n−1)-th gradient temperature transmitted from the average temperature/gradient temperature calculating means 5 and the (n−1)-th target gradient temperature (the target value of the (n−1)-th gradient temperature).

In this manner, the first PID control means $6_1$ controls the average temperature, and the second to n-th PID control means $6_2$ to $6_n$ control the first to (n−1)-th gradient temperatures.

The following is a description about the distribution means 7.

The distribution means 7 distributes operation signals (the amount of operation) from the PID control means $6_1$ to 6n to the heaters $1_1$ to 1n, respectively. This distribution is carried out so that the control of the average temperature or each gradient temperature by the PID control means $6_1$ to 6n may produce no interference with the control of the other PID control means $6_1$ to 6n.

For example, the above-mentioned distribution is carried out in such a manner that when changing the average temperature, the operation signal of the first PID control means $6_1$ does not change the gradient temperature. The distribution is also carried out in such a manner that when changing the first gradient temperature, the operation signal of the second PID control means $6_2$ does not change the average temperature and the other gradient temperatures. Similarly, the distribution is carried out in such a manner that the operation signal of each PID control means does not affect the control of the other PID control means.

The distribution done by the distribution means 7 will be described further in detail as follows.

In order to make the distribution easier to understand, the case with two channels will be described with reference to FIG. 4 where n=2, that is, two zones, first and second heaters $1_1$, $1_2$, first and second temperature sensors $2_1$, $2_2$, the first PID control means $6_1$ for controlling the average temperature, and the second PID control means $6_2$ for controlling the gradient temperature, which is the difference between the detection temperatures of the temperature sensors $2_1$, $2_2$.

Figure 4:
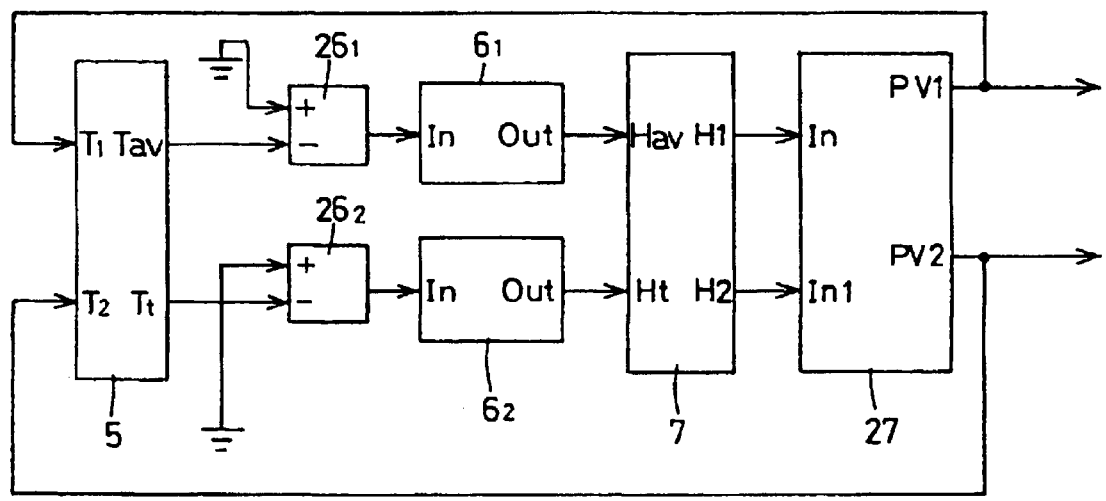
FIG. 4 is a block diagram where there are two temperature sensors, two heaters, and two PID control means.

FIG. 4 shows an example where the distribution is applied to the control target 27 having interference of two inputs and two outputs. The components in FIG. 4 that correspond to those in FIG. 3 are referred to the same reference symbols. Adders $26_1$, $26_2$ calculate control deviation, and are shown as part of the PID control means $6_1$, $6_2$ in FIG. 3.

Figure 5:
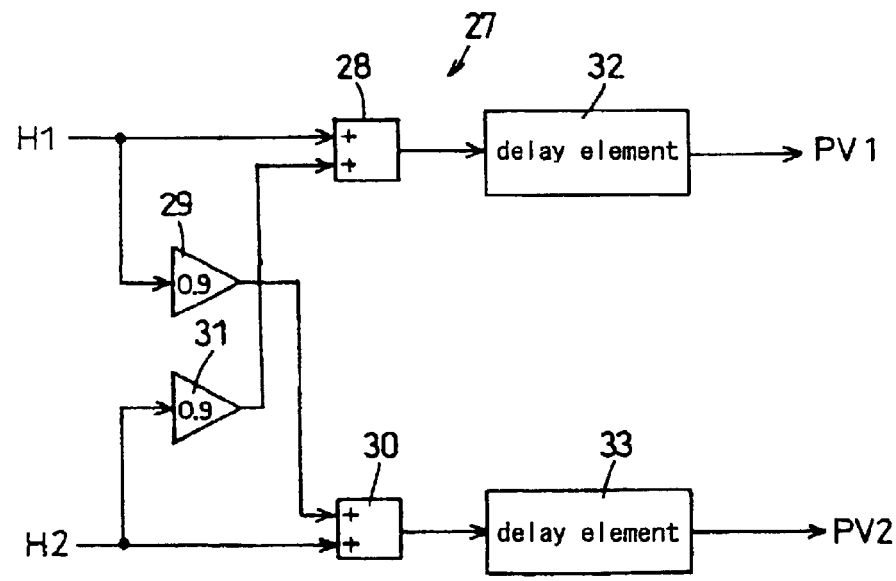
FIG. 5 is a block diagram of the control target of FIG. 4.

This control target 27 has interference of two inputs (H1, H2) and two outputs (PV1, PV2) as shown in FIG. 5. The first amount of operation H1 from the first PID control means $6_1$ is given to the first adder 28 and also attenuated to 0.9 at the first attenuator 29 to be given to the second adder 30, whereas the second amount of operation H2 from the second PID control means $6_2$ is given to the second adder 30 and also attenuated to 0.9 at the second attenuator 31 to be given to the first adder 28. The addition results of the adders 28, 30 are outputted to the first and second delay elements 32, 33, respectively. In this example, each of the amounts of operation H1, H2 is added to the other adder at the rate of 0.9, thereby mutually causing interference.

Figure 6:
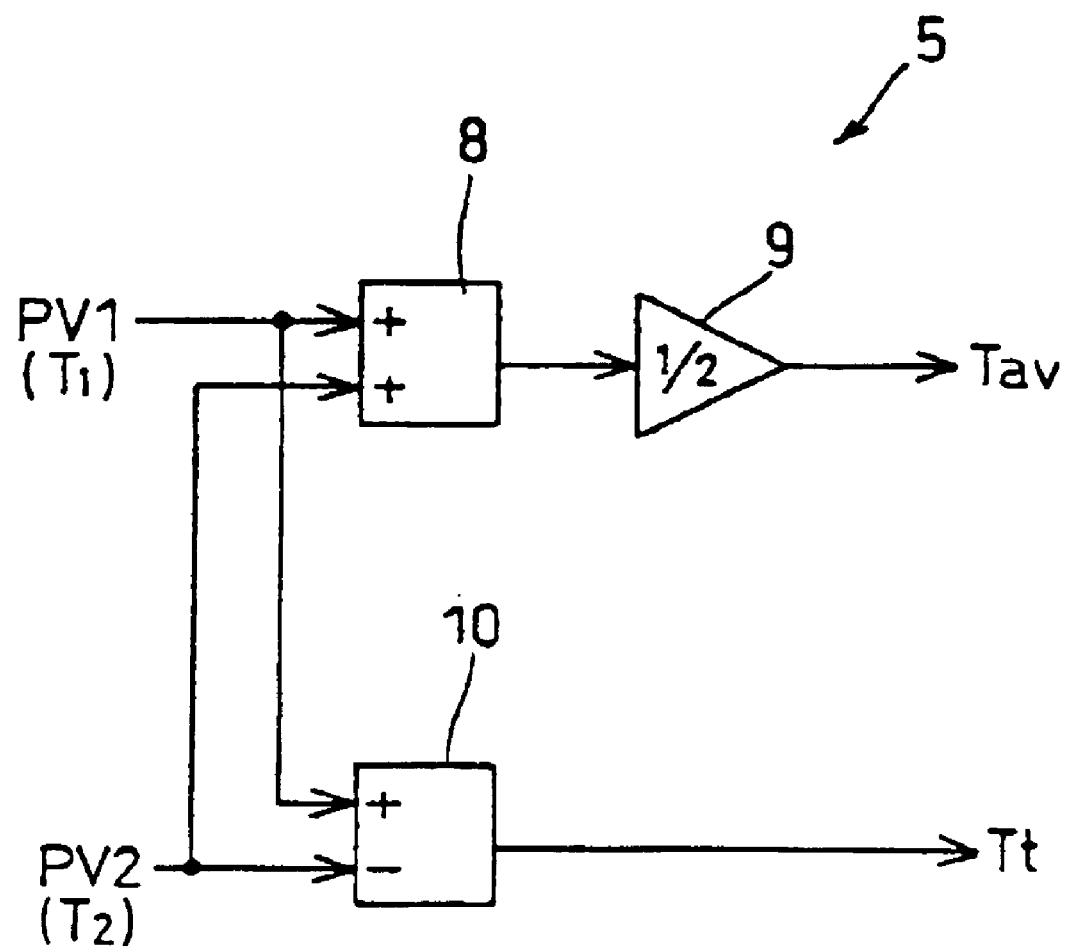
FIG. 6 is a block diagram of the average temperature/gradient temperature calculating means (mode converter) 5 of FIG. 4.

In FIG. 4, the average temperature/gradient temperature calculating means 5 adds feedback amounts PV1, PV2 from the target object 27 that correspond to the detection temperatures $T_1$, $T_2$ of the first and second temperature sensors $2_1$, $2_2$ in the adder 8 as shown in FIG. 6, and attenuates it to ½ in a attnuator 9 so as to output the average temperature Tav, and also performs subtractions between the feedback amounts PV1, PV2 corresponding to the detection temperatures $T_1$, $T_2$ of the temperature sensors $2_1$, $2_2$ in a subtracter 10 so as to output the gradient temperature Tt.

The first PID control means $6_1$ is supplied with the control deviation between the average temperature Tav from the average temperature/gradient temperature calculating means 5 and the target average temperature via the adder $26_1$. The first PID control means $6_1$ then outputs the operation signal (the amount of operation) Hav to the distribution means 7 based on the control deviation so as to make the average temperature the target average temperature.

The second PID control means $6_2$ is supplied with the control deviation between the gradient temperature Tt from the average temperature/gradient temperature calculating means 5 and the target average temperature via the adder $26_2$. The second PID control means 62 then outputs the operation signal (the amount of operation) Ht to the distribution means 7 based on the control deviation so as to make the gradient temperature the target gradient temperature.

The distribution means 7 distributes the operation signals (the amount of operation) Hav, Ht of the PID control means $6_1$, $6_2$ to the heater $1_1$, $1_2$ in the distribution ratio shown below.

Figure 7:
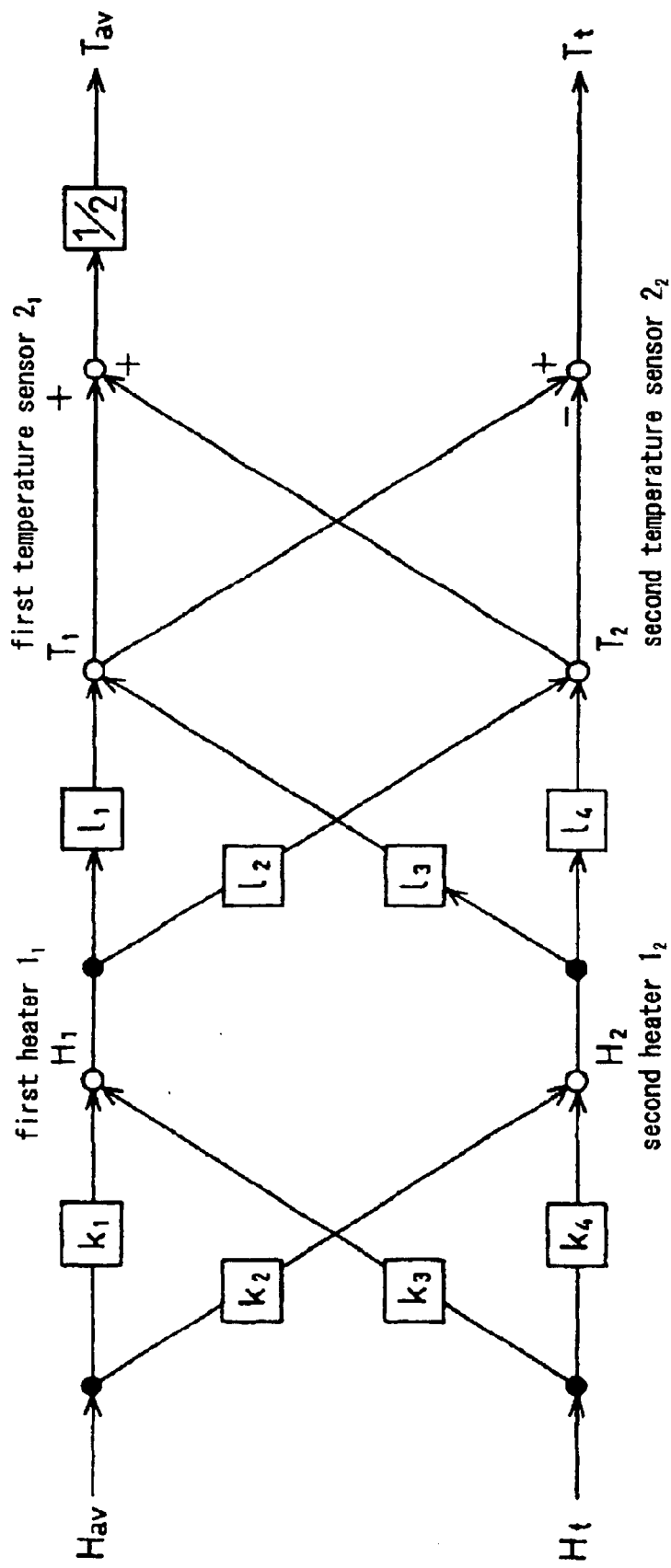
FIG. 7 is a block diagram of the control system of FIG. 4.

FIG. 7 is a block diagram showing the control system in the system shown in FIG. 4. The amount of operation Hav given from the first PID control means $6_1$ which controls the average temperature is distributed to the first and second heaters $1_1$, $1_2$ at interference reduction coefficients (distribution ratio) $k_1$, $k_2$ which are the coefficients to control or reduce interference by the distribution means 7. On the other hand, the amount of operation Ht given from the second PID control means $6_2$ is distributed to the first and second heaters $1_1$, $1_2$ at the interference reduction coefficients (distribution ratio) $k_3$, $k_4$, thereby providing the heaters $1_1$, $1_2$ with the amounts of heat $H_1$, $H_2$.

The heat amount $H_1$ given to the first heater $1_1$ is transferred to the first temperature sensor $2_1$ at the coefficient of transmission (interference coefficient) $1_1$, and also transmitted to the second temperature sensor $2_2$ at the coefficient of transmission (interference coefficient) $1_2$.

In the same manner, the heat amount $H_2$ given to the second heater $1_2$ is transmitted to the first temperature sensor $2_1$ at the coefficient of transmission (interference coefficient) $1_3$, and also transmitted to the second temperature sensor $2_2$ at the coefficient of transmission (interference coefficient) $1_4$.

There is a control loop where the average temperature Tav and the gradient temperature Tt are calculated from the detection temperature $T_1$ of the first temperature sensor $2_1$ and the detection temperature $T_2$ of the second temperature sensor $2_2$ and are entered to the PID control means $6_1$, $6_2$.

From the above structure, the average temperature Tav is expressed as follows:

$$Tav = (T_1 + T_2)/2$$
$$= \{(1_1 \cdot H_1 + 1_3 \cdot H_2) + (1_2 \cdot H_1 + 1_4 \cdot H_2)\}/2$$
$$= \{(1_1 + 1_2)H_1 + (1_3 + 1_4)H_2\}/2$$
$$= \{(1_1 + 1_2)(k_1 \cdot Hav + k_3 \cdot Ht) + (1_3 + 1_4)(k_2 \cdot Hav + k_4 \cdot Ht)\}/2$$

-continued $$= [\{(l_1 + l_2)k_1 + (l_3 + l_4)k_2\}Hav + \{(l_1 + l_2)k_3 + (l_3 + l_4)k_4\}Ht]/2$$

Here, the average temperature Tav is the function only for the amount of operation Hav of the average temperature and makes the term of Ht zero in order to control the influence of the amount of operation Ht of the gradient temperature, that is, in order to achieve interference-reducing.

In other words, $(l_1+l_2) \cdot k_3+(l_{3+l4}) \cdot k_4=0$

As the result, $k_4=-\{(l_1+l_2)/(l_3+l_4)\}k_3$

Similarly, the gradient temperature Tt is expressed as follows.

$$Tt = T_1 - T_2$$
$$= (l_1 \cdot H_1 + l_3 \cdot H_2) - (l_2 \cdot H_1 + l_4 \cdot H_2)$$
$$= (l_1 - l_2)H_1 + (l_3 - l_4)H_2$$
$$= (l_1 - l_2)(k_1 \cdot Hav + k_3 \cdot Ht) + (l_3 - l_4)(k_2 \cdot Hav + k_4 \cdot Ht)$$
$$= \{(l_1 - l_2)k_1 + (l_3 - l_4)k_2\}Hav + \{(l_1 - l_2)k_3 + (l_3 - l_4)k_4\}Ht$$

Here, the gradient temperature Tt is the function only for the amount of operation Ht of the gradient temperature and makes the term of Hav zero in order to control the influence of the amount of operation Hav of the average temperature, that is, in order to achieve interference-reducing.

In other words, $(l_1-l_2)k_1+(l_3-l_4)k_2=0$

As the result, $k_2=-\{(l_1-l_2)/(l_3-l_4)\}k_1$

Thus, in order to control the average temperature without affecting the gradient temperature and to control the gradient temperature without affecting the average temperature, that is, to carry out control with no interference between the average temperature and the gradient temperature, the amounts of operation Hav, Ht from the PID control means $6_1$, $6_2$ can be distributed at the interference reduction coefficients (distribution ratios) $k_1$ to $k_4$.

The interference reduction coefficients (distribution ratios) $k_1$ to $k_4$ can be calculated by finding the coefficients of transmission (interference coefficients) $1_1$, $1_2$ at which the amount of heat of the first heater $1_1$ is transmitted to the first and second temperature sensors $2_1$, $2_2$ and the coefficients of transmission (interference coefficients) $1_3$, $1_4$ at which the amount of heat of the second heater $1_2$ is transmitted to the first and second temperature sensors $2_1$, $2_2$.

Since the interference reduction coefficients (distribution ratios) $k_1$ to $k_4$ can be found from the gain of the PID control only if the ratios between $k_1$ and $k_2$ and between $k_3$ and $k_4$ are known, the absolute values are not always necessary.

The coefficients of transmission (interference coefficients) $1_1$ to $1_4$ can be found as follows: one of the heaters is made to change its values and the other heater is fixed to the constant value, e.g., at the on state or the off state, so as to make the ratio between the amount of change of each temperature sensor to the amount of change of the heater the coefficient of transmission.

For example, the coefficients of transmission $1_1$, $1_2$ can be measured by finding the degree of amplitude in the detection temperatures of the first and second temperature sensors $2_1$, $2_2$ when the first heater $1_1$ is varied at a certain temperature amplitude while putting the second heater $2_2$ in the off state. For example, when the heater is varied at a temperature amplitude of 1, if the temperature sensor has a temperature amplitude of 10, then the coefficient of transmission becomes 10 (=10/1).

The following is a further detailed description about the distribution of the distribution means (predistorter) 7 shown in FIG. 4 using the interference reduction coefficient (distribution ratios). Characteristics of the control target 27 are shown in FIG. 5, and these characteristics indicate that the coefficients of transmission are $1_1=1$, $1_2=0.9$, $1_3=0.9$, $1_4=1$.

Consequently, these coefficients can be substituted in the formula of the interference reduction coefficients as follows.

$$k_4 = -\{(l_1 + l_2)/(l_3 + l_4)\}k_3$$
$$= -\{(1 + 0.9)/(0.9 + 1)\}k_3$$
$$= -k_3$$

Alternatively, $$k_2 = -\{(l_1 - l_2)/(l_3 - l_4)\}k_1$$
$$= -\{(1 - 0.9)/(0.9 - 1)\}k_1$$
$$= k_1$$

Then, the total amount of heat distributed to each heater is designed to be equal to Hav, that is, $k_1+k_2=1$, and the condition of $k_3=1$ is added to make the explanation easy to follow.

As a result, $k_2=k_1=\frac{1}{2}$, and $k_4=-k_3=-1$ are obtained, thereby determining the distribution ratios (interference reduction coefficients).

Figure 8:
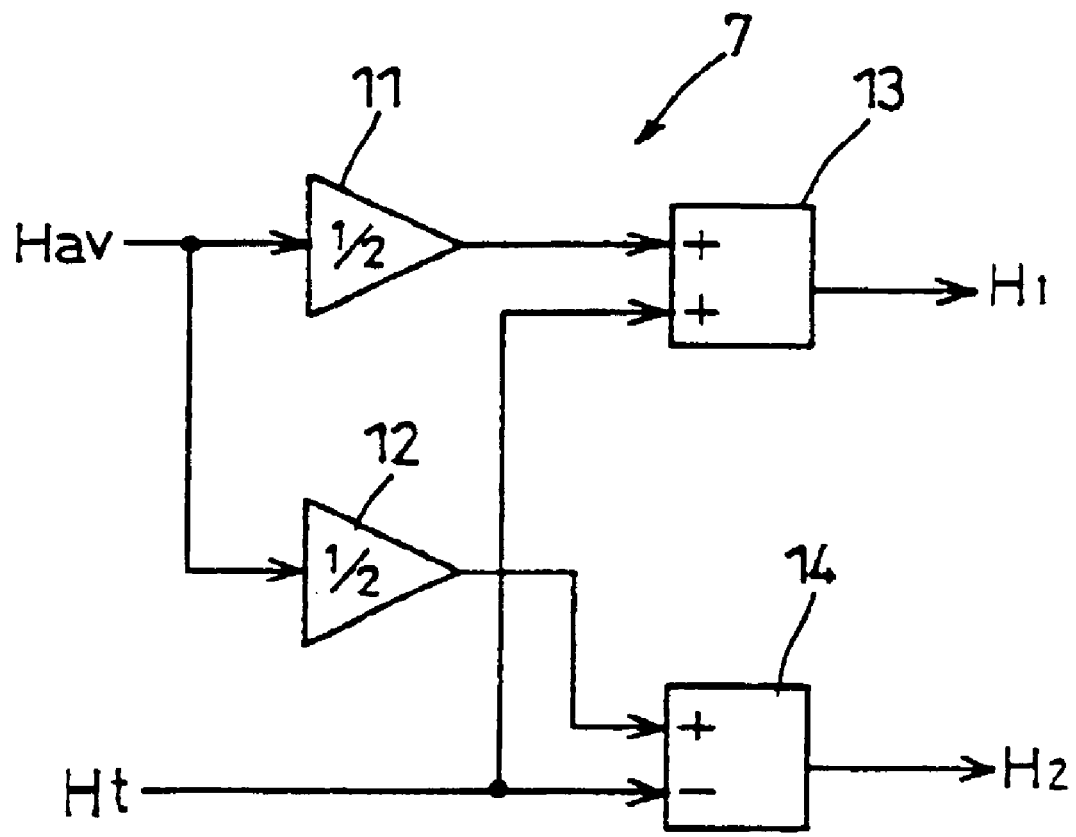
FIG. 8 is a block diagram of the distribution means (predistorter) of FIG. 4.

In other words, as shown in FIG. 8, the amount of operation Hav of the average temperature can be evenly distributed to the heaters $1_1(H_1)$ and $1_2(H_2)$, and the amount of operation Ht of the gradient temperature can be distributed as it is to the first heater $1_1$ ($H_1$) and to the second heater $1_2$ ($H_2$) by changing sign.

The distribution ratios (interference reduction coefficients) can be found as follows.

The matrix (hereinafter also referred to as predistorter) Gc of a distribution ratio (interference reduction coefficient) can be found as a reverse matrix as follows from the above-mentioned mode conversion matrix Gm and the matrix P of the above-mentioned coefficient of transmission (interference coefficient).

$$Gc=(Gm \cdot P)^{-1}$$

When this matrix is applied to the present embodiment, assuming that the matrix P of the coefficient of transmission (interference coefficient) indicating the characteristics of the control target in a time is:

[Numerical Formula 3]

$$P = \begin{pmatrix} l_1 & l_3 \\ l_2 & l_4 \end{pmatrix}$$
$$= \begin{pmatrix} 1 & 0.9 \\ 0.9 & 1 \end{pmatrix}$$

Then, the predistortion matrix Gc which is a matrix of the distribution ratio (interference reduction coefficient) is:

[Numerical Formula 4]

$$Gc = (Gm \cdot P)^{-1}$$

-continued $$= \left[ \begin{pmatrix} \frac{1}{2} & \frac{1}{2} \\ 1 & -1 \end{pmatrix} \times \begin{pmatrix} 1 & 0.9 \\ 0.9 & 1 \end{pmatrix} \right]^{-1}$$

$$= \left[ \begin{pmatrix} 0.95 & 0.95 \\ 0.1 & 0.1 \end{pmatrix} \right]^{-1}$$

$$= \begin{pmatrix} 0.5263 & 5 \\ 0.5263 & -5 \end{pmatrix}$$

The correctness of Gm·P·Gc=I is verified.
[Numerical Formula 5]

$$Gm \cdot P \cdot Gc = \begin{pmatrix} \frac{1}{2} & \frac{1}{2} \\ 1 & -1 \end{pmatrix} \times \begin{pmatrix} 1 & 0.9 \\ 0.9 & 1 \end{pmatrix} \times \begin{pmatrix} 0.5263 & 5 \\ 0.5263 & -5 \end{pmatrix}$$

$$= \begin{pmatrix} 1 & 0 \\ 0 & 1 \end{pmatrix}$$

Although the distribution ratio (interference reduction coefficient) is calculated by using the coefficient of transmission in the present embodiment, as another embodiment of the present invention, the coefficient of transmission can be replaced by a transmission function also indicating frequency characteristics.

The following is a detailed description about the reason why the predistortion matrix Gc which is a matrix of a distribution ratio (interference reduction coefficient) can be found as the reverse matrix of the product of the mode average matrix Gm by the matrix P of the coefficient of transmission (interference coefficient) as described above.

First, with reference to FIG. 9, the well-known interference-reducing control and predistorter will be described as follows. FIG. 9 shows PID control means $6_1$–$6m$, the predistorter 7, the control target 3 with interference, and the control target 3' after interference reducing.

With regard to the interference-reducing control generally known, the design of the control system of the control target 3 with m inputs and m outputs will be considered. It is assumed that the matrix of transmission function is Gp (s). In the system with a number of inputs and outputs like this, the presence of interference causes a change in one input to affect all the m outputs.

This means that a change in an input to move one output results in a change in the outputs which are not intended to move. To avoid this, closely related pairs of inputs and outputs are corresponded one-on-one and when one input is changed, the corresponding output can be changed exclusively. This is called interference-reducing.

If the transmission function matrix Gp (s) of the control target is a diagonal matrix, interference-reducing is already done; however, Gp (s) is not generally a diagonal matrix, so a controller called the predistorter 7 is placed before the control target 3. If the transmission function matrix of the predistorter 7 is referred to as Gc(s), interference-reducing can be achieved by determining the Gc (s) as to make Gp (s) Gc (s) a diagonal matrix. Once diagonalization is achieved, there are m individual one input-to-one output relations, and each one can be controlled by PID control, and has a structure shown in FIG. 9(b).

In order to find Gc under the conditions that Gp(s)Gc(s) become a diagonal matrix (a matrix in which values are aligned straight on the diagonal lines of the matrix and the triangular region has a value of 0), the simplest method is obtained from Gp(s)Gc(s)=I. When both sides are multiplied by Gp(s)$^{-1}$ from the left-hand side, it becomes $$Gp(s)^{-1}Gp(s)Gc(s)=Gp(s)^{-1}.$$

Since Gp(s)$^{-1}$ Gp(s)=I,
Gc(s)=Gp(s)$^{-1}$ is obtained.

As a result, the transmission function matrix Gc(s) of the predistorter 7 can be found by the reverse matrix of the transmission function matrix Gp(s) of the control target 3.

The following is a description based on FIG. 10 about the predistorter (distribution means) 7 of the present invention for controlling gradient temperatures.

The predistorter 7 of the present invention has two roles. The main role is to properly distribute the amount of operation MV of the average and gradient temperatures between the respective channels. The secondary role is the interference-reducing by the well-known interference-reducing control.

In the present invention, the amount of operation MV which is the output of the PID is determined by the average and the gradient because the control is done by the average and the gradient. The distribution of the MV of the average and the gradient between the channels (MV1-MVm) requires a means for distribution before the control target 3, and this is why the predistorter 7 is provided. The interference-reducing is only secondary and is not done positively.

Therefore, it is possible to find the predistorter 7 by omitting the relation between the predistorter 7 and the control target 3 and by making approximations of a control target having no interference. This has pretty effects.

The predistorter Gc(s) of the well-known interference-reducing control is the reverse matrix of the control target Gp(s); on the other hand, in the gradient temperature control of the present invention, the portion of the control target corresponds to Gm(s)Gp(s), so it is found from Gm(s)Gp(s)Gc(s)=I.

Both sides are multiplied by (Gm(s)Gp(s))$^{-1}$ from the left-hand side, which results in (Gm(s)Gp(s))$^{-1}$Gm(s)Gp(s)Gc(s)=(Gm(s)Gp(s))$^{-1}$. Since (Gm(s)Gp(s))$^{-1}$Gm(s)Gp(s)=I, Gc(s)=(Gm(s)Gp(s))$^{-1}$. As a result, the transmission function matrix Gc (s) of the predistorter (distribution means) 7 is found from the reverse matrix of the product of the transmission function matrix Gp(s) of the control target 3 by the transmission function matrix (mode conversion matrix) Gm(s) of the mode converter (average temperature/gradient temperature calculating means) 5.

According to the system shown in FIG. 4 described above, in the distribution means 7, the operation signal (the amount of operation) Hav of the average temperature is attenuated to ½ at each of the attenuators 11, 12, and is distributed to the adder 13 and the subtracter 14, whereas the operation signal (the amount of operation) Ht of the gradient temperature is distributed to the adder 13 and the subtracter 14, and the output $H_1$ of the adder 13 is given to the first heater $1_1$, and the output $H_2$ of the subtracter 14 to the second heater $1_2$ as shown in FIG. 8.

According to the distribution means 7, in the case where the average temperature is changed by the amount of operation Hav of the average temperature, the amount of operation is equally divided between the heaters $1_1$ and $1_2$, which enables the average temperature to be changed exclusively without affecting or interfering with the gradient temperature. In the case where the gradient temperature is changed by the amount of operation Ht of the gradient temperature, the amount of operation is given 1-fold to the heater $1_1$ and is given −1-fold to the heater $1_2$, thereby enabling the gradient temperature to be changed exclusively without changing the total amount of heat to be given to both heaters, or without affecting the average temperature.

Figure 13:
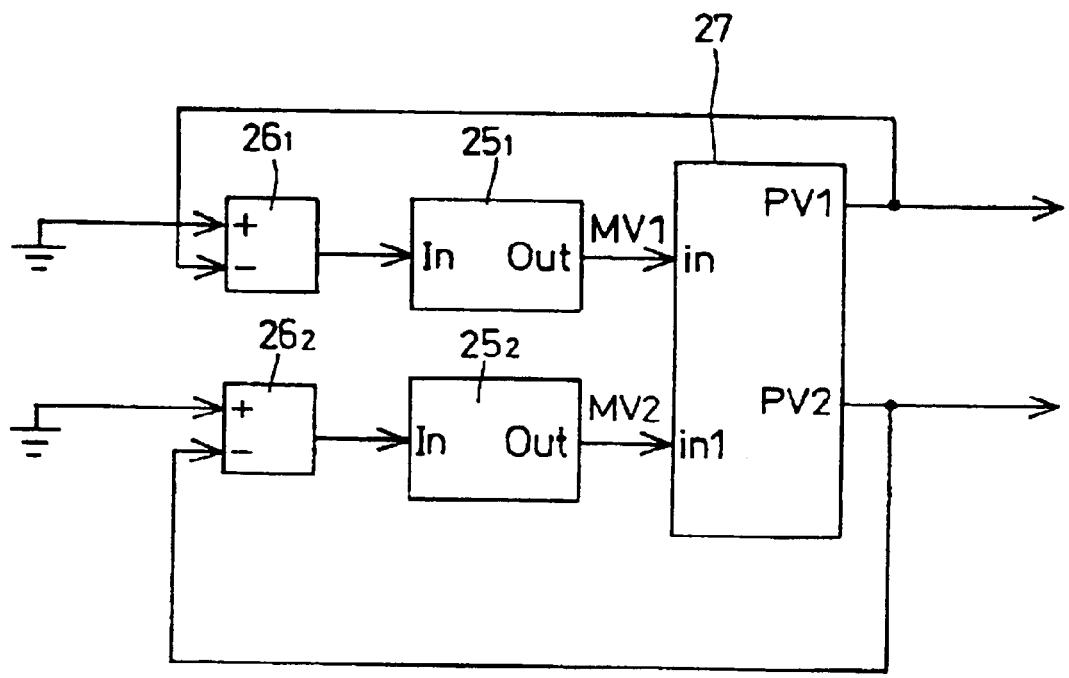
FIG. 13 is a block diagram of the conventional control system.

The following is the results of simulation in the embodiment shown in FIG. 4 and in the prior art example shown in FIG. 13 which includes PID control means $25_1$ and $25_2$.

Figure 11:
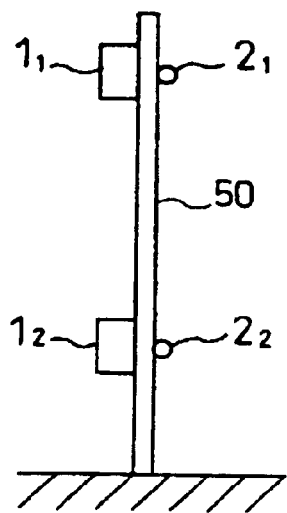
FIG. 11 is a diagram showing a model of the control target.
Figure 12:
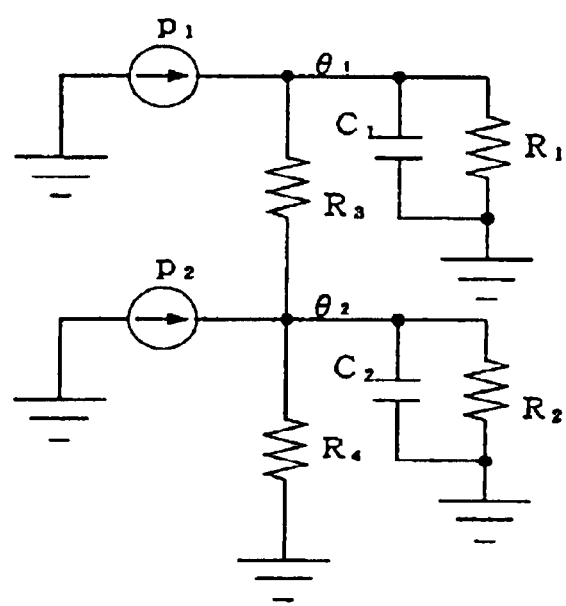
FIG. 12 is an equivalent circuit diagram of the control target.

In this simulation, the following modeling of a control target is carried out. As the simplest example of a heat interference system, the heat treatment apparatus shown in FIG. 11 is taken up where two heaters $1_1$ and $1_2$ and two temperature sensors $2_1$ and $2_2$ are connected by a heat conductor 50. The object of the control is to unify the temperatures at two points at the desired setting temperature. FIG. 12 shows the electrically equivalent circuit of the control target, which includes heat resistances $R_1$ and $R_2$ from the temperature sensors to the ambient air, and heat capacitances $C_1$ and $C_2$ in the vicinity of the temperature sensors.

The input of the control target is the amount of heat of the two heaters; part of the heat amount $p_1$ of the heater $1_1$ goes through the heat conductor 50 to interfere with the temperature $\theta_2$ of the temperature sensor $2_2$ at the heat resistance $R_3$, and in the same manner, part of the heat amount $p_2$ of the heater $1_2$ interferes with the temperature $\theta_1$ of the temperature sensor $2_1$ at the heat resistance $R_3$. On the other hand, part of the heat energy of the heat amount $p_2$ transmits heat at the heat resistance $R_4$ to the main body of the mechanical apparatus in which the heat treatment apparatus is fixed. It must be noted that the heat capacitance of the main body of the mechanical device is so large that it is approximated to agree with the ambient temperature.

The parameters of the equivalent circuit of the control target are; $R_1=R_2=10[° C./W]$, $R_3=1[° C./W]$, $R_4=0.2[° C./W]$, and $C_1=C_2=10[J/° C.]$. The disturbance is applied under the equal conditions between the prior art example and the present embodiment in the form of steps of 100 W.

Figure 14:
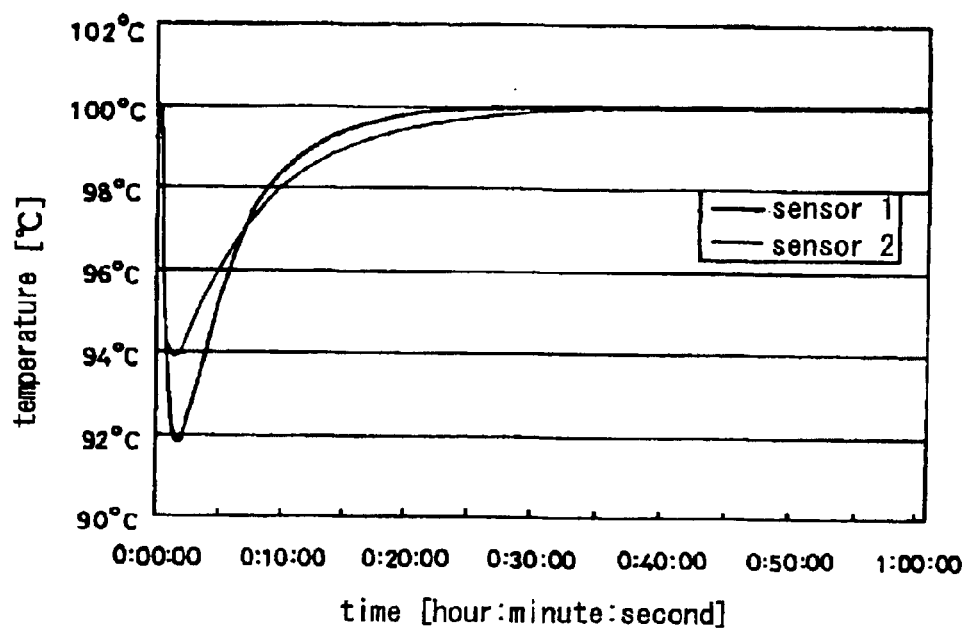
FIG. 14 is a diagram showing the conventional response waveform.
Figure 15:
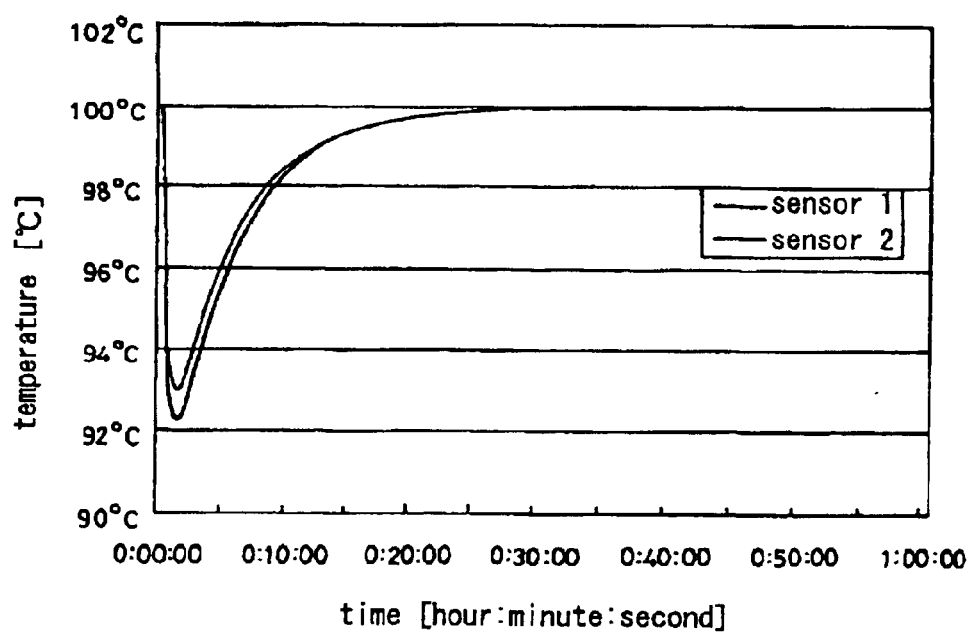
FIG. 15 is a diagram showing the response waveform of the embodiment.

FIG. 14 shows the response waveform of the prior art PID control with the parameters shown in Table 1 below, and FIG. 15 shows the response waveform of the present embodiment with the parameters shown in Table 2 below.

TABLE 1

| symbol | value | unit |
|---|---|---|
| Kp | 10 | W/° C. |
| Ti | 10 | sec |
| Td | 0 | sec |

TABLE 2

| symbol | value | unit |
|---|---|---|
| Kp (average) | 0.83 | W/° C. |
| Kp (gradient) | 10 | W/° C. |
| Ti | 10 | sec |
| Td | 0 | sec |

Comparison between FIGS. 14 and 15 reveals that the temperature difference of 2° C. between the two sensors in the conventional control system is improved to 0.8° C. in the present embodiment.

Such an advantage of the present embodiment is produced by making it possible to set the PID parameters independently between the gradient temperature and the average temperature. In this example, as shown in FIG. 2, the proportional gain Kp in gradient temperature control is set at a higher value than the proportional gain Kp in average temperature control in order to give the convergence of the gradient temperatures priority over the average temperature by making the proportional gains Kp different from each other. As a result, high precision temperature uniformity can be expected regardless of the simple setting of the PID control parameters.

FIGS. 16–19 show the comparison results of the target value response and the disturbance response between the present embodiment and the prior art example. In this case the target value response with no overshoot of the adjustment law of CHR (Chien, Hrones and Reswick) is used for the average temperature control and the disturbance response with an overshoot of 20% is used for the gradient temperature control.

Figure 16:
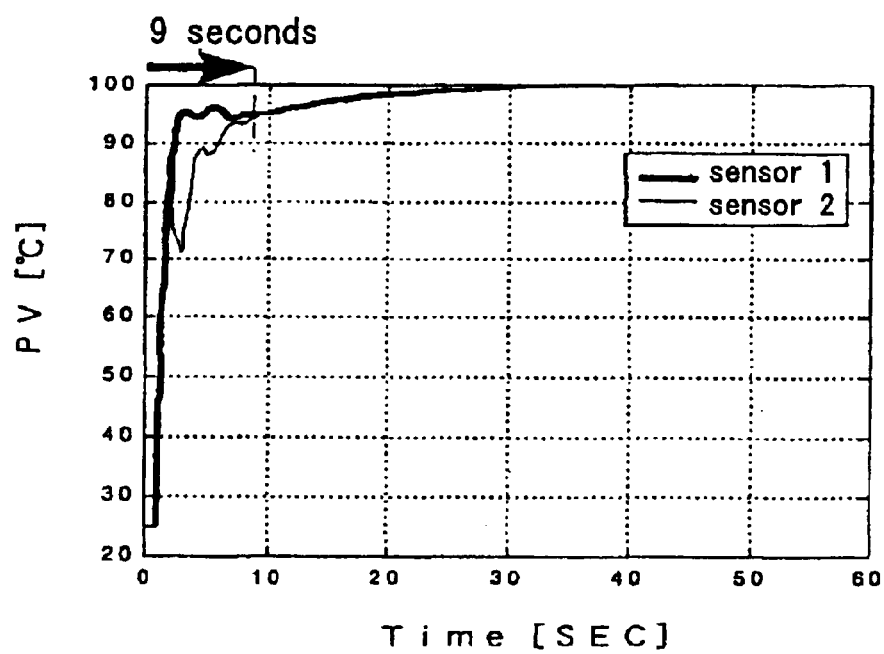
FIG. 16 is a diagram showing the response waveform of the target values of the embodiment.
Figure 17:
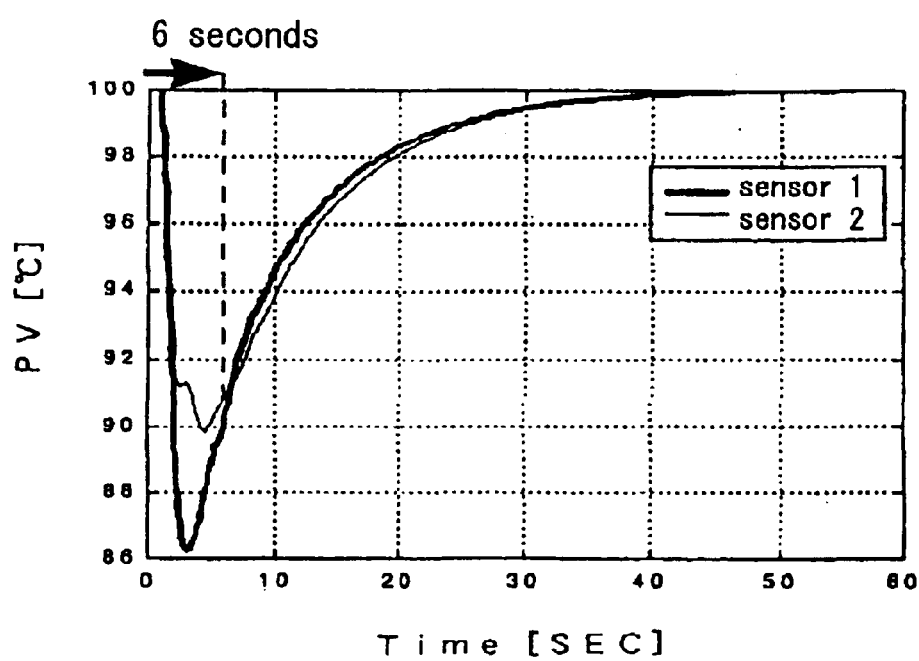
FIG. 17 is a diagram showing the disturbance response waveform of the embodiment.
Figure 18:
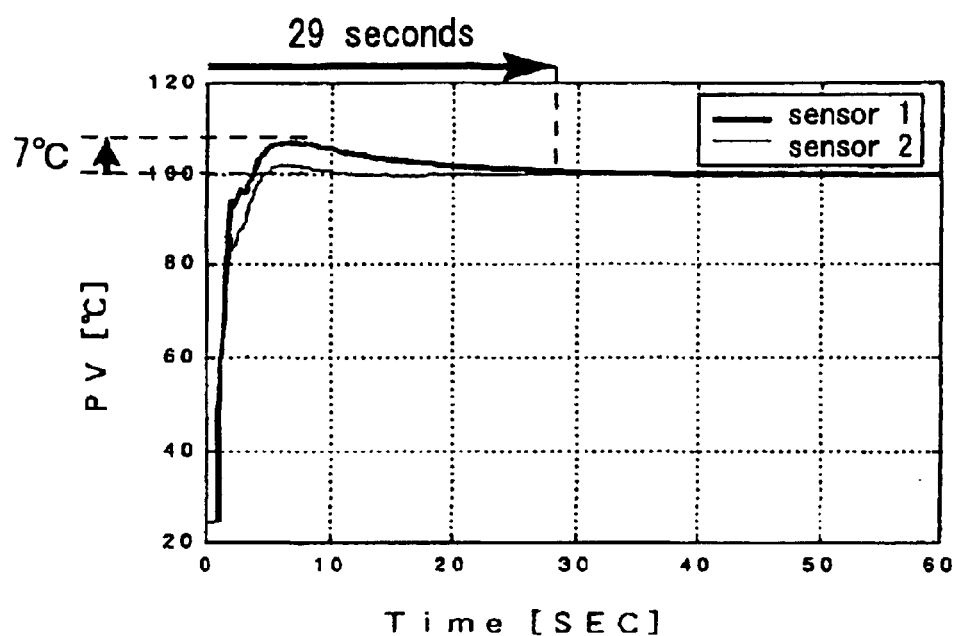
FIG. 18 is a diagram showing the conventional response waveform of the target values.
Figure 19:
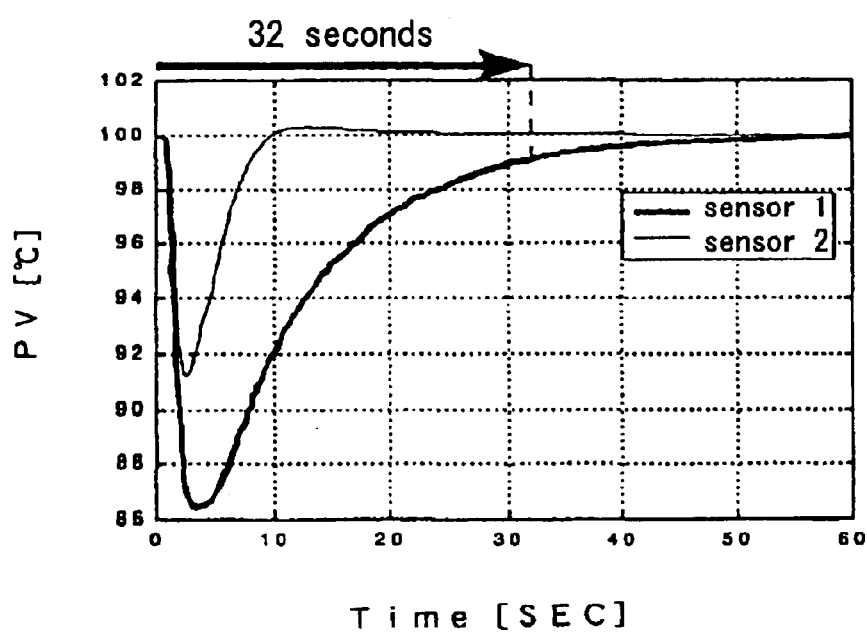
FIG. 19 is a diagram showing the conventional disturbance response waveform.

FIGS. 16 and 17 show the waveforms of the target value response and the disturbance response in the present embodiment, whereas FIGS. 18 and 19 show the waveforms of the target value response and the disturbance response in the prior art example.

In the target value response of the prior art example shown in FIG. 18, the stabilization time is as long as 29 seconds and an overshoot is observed, whereas in the target value response of the present embodiment, the stabilization time is as short as 9 seconds and no overshoot is observed as shown in FIG. 16.

In the disturbance response of the prior art example of FIG. 19, the stabilization time is as long as 32 seconds, and some overshoot is observed. On the other hand, in the disturbance response of the present embodiment, the stabilization time is as short as 6 seconds and no overshoot is seen as shown in FIG. 17.

Since the average temperature control is weak and slow, and the gradient temperature control is strong and fast in this embodiment, the target value response and the disturbance response both have no overshoot and a sufficiently short stabilization time.

Figure 20:
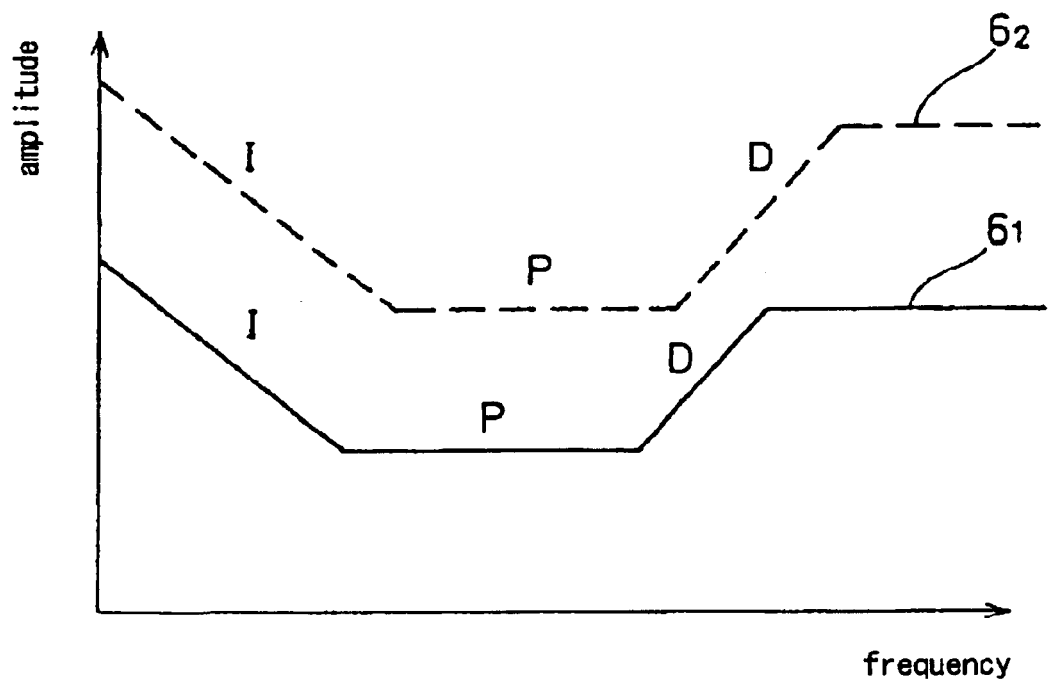
FIG. 20 is an amplitude-frequency plot of each PID control means of the embodiment.

As another embodiment of the present invention, it is possible to set the amplitude of the second PID control means $6_2$ for controlling the gradient temperature larger than the amplitude of the first PID control means $6_1$ for controlling the average temperature as shown in the amplitude-frequency plot of FIG. 20 where the solid line indicates characteristics of the first PID control means $6_1$, and the broken line indicates characteristics of the second PID control means $6_2$.

This structure allows the average temperature to be changed while more powerfully maintaining the state of the gradient temperature, or the state of temperature distribution, in such a case where the target average temperature is changed without changing the target gradient temperature.

Figure 21:
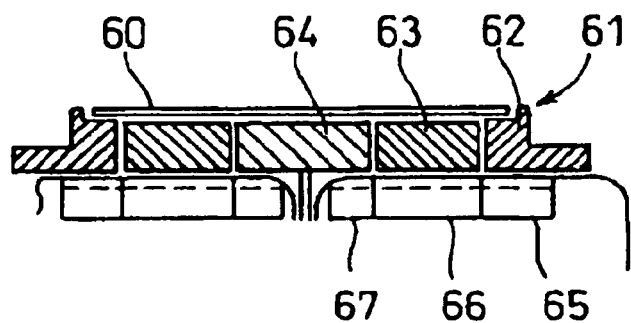
FIG. 21 is a diagram showing a heat-treated plate.

It is particularly effective, for example, in the case where the entire average temperature is raised or lowered while maintaining a temperature distribution inclined in the direction of the diameter in the coaxial heater place 61 on which the wafer 60 of the CVD device of FIG. 21 is mounted. The heat-treated plate 61 heat-processes the wafer 60 mounted thereon, and is divided into coaxial three parts: the outer circular part 62, the intermediate part 63, and the central part 64. These parts have heaters 65 to 67, respectively, to control temperature from zone to zone.

In the case where it is desired to make the outside of the heat-treated plate 61 hotter than the inside, this embodiment enables the desired temperature distribution condition to be obtained easily and more accurately by setting the target gradient temperature.

As further another embodiment of the present invention, the second PID control means $6_2$ for controlling the gradient temperature can be switched between PID control and PD control not containing integral control. Switching the second PID control means $6_2$ for controlling the gradient temperature into the PD control can reduce the amplitude of low-frequencies due to the absence of integral control, thereby increasing stationary deviation. Since the stationary deviation increases when the temperature sensor has a larger offset, information about this stationary deviation can be used to improve the offset of the temperature sensor. Therefore, the second PID control means $6_2$ can be switched to the PD control not including the integral control only when the offset of the temperature sensor is adjusted, and can be returned to the PID control after the completion of the offset adjustment, thereby simplifying the offset adjustment. This offset adjustment can be carried out automatically by directing only start timing with a command.

This offset adjustment will be described in detail as follows.

Figure 22:
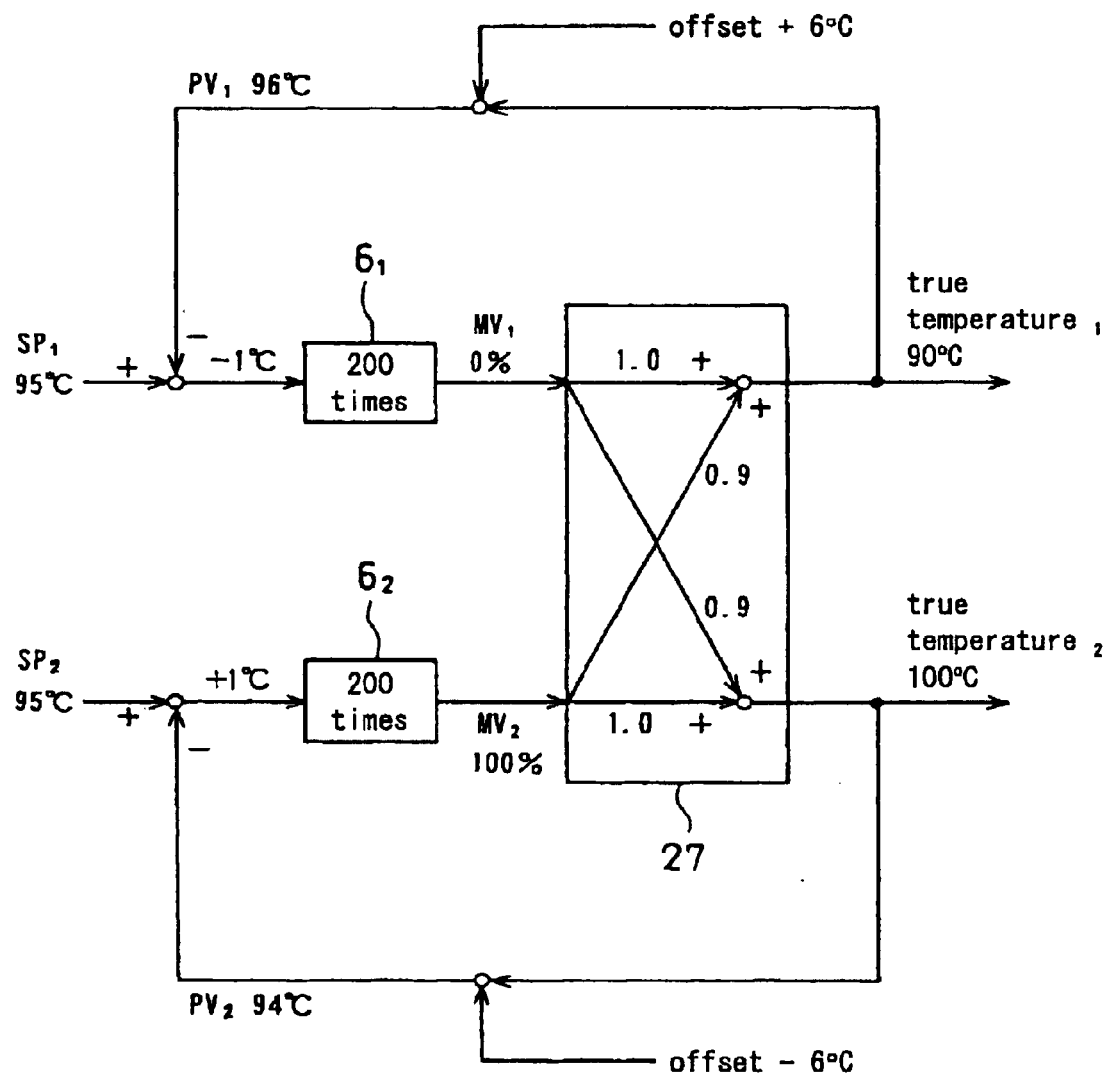
FIG. 22 is a block diagram for explaining the influence of offset on the conventional temperature sensor.

FIG. 22 shows a stationary state in the case where the temperature sensor has an offset and the control target has interference in the prior art structure. The drawing includes first and second PID control means $6_1$, $6_2$, and a control target 27 with interference, which is composed of two zones controlled separately.

In the stationary state, the gain of the integral control is used for definition; the gain is multiplied by, e.g., 200 times, the offset of the first temperature sensor $2_1$ is set at +6° C., the offset of the second temperature sensor $2_2$ is set at −6° C., the amount of operation MV for the heaters is set at 0% ≦MV≦100%, and the coefficient of transmission of the control target 27 is set at 1.0 and 0.9.

In this stationary state, the detection temperature PV1 of the first temperature sensor $2_1$ is 96° C., the target temperature SP1 is 95° C., the control deviation to the first PID control means $6_1$ becomes −1° C., and the gain becomes −200 because it is 200 times; however, the amount of operation MV is 0% or larger, so the first amount of operation MV1 becomes 0%.

On the other hand, the detection temperature PV2 of the second temperature sensor $2_2$ is 94° C., the target temperature SP2 is 95° C., the control deviation to the second PID control means $6_2$ becomes +1° C., and the gain becomes 200 because it is 200 times; however, the amount of operation MV2 is 100% or smaller, so the second amount of operation MV2 becomes 100%.

Therefore, the real temperature of the first zone in the control target 27 becomes 0×1.0+100×0.9=90° C., and the real temperature of the second zone becomes 0×0.9+100×1.0=100° C., thereby being put in stable conditions.

In this stationary state, the detection temperatures PV1 and PV2 are 96° C. and 94° C., respectively, and the difference of 2° C. seems to be small; however, the amounts of operation MV1, MV2 are saturated to 0% and 100%, with the real temperature difference of 10° C. (=100° C. −90° C.), making a high precision temperature control impossible. The above-mentioned temperature is considered to be the temperature difference with respect to room temperature.

Figure 23:
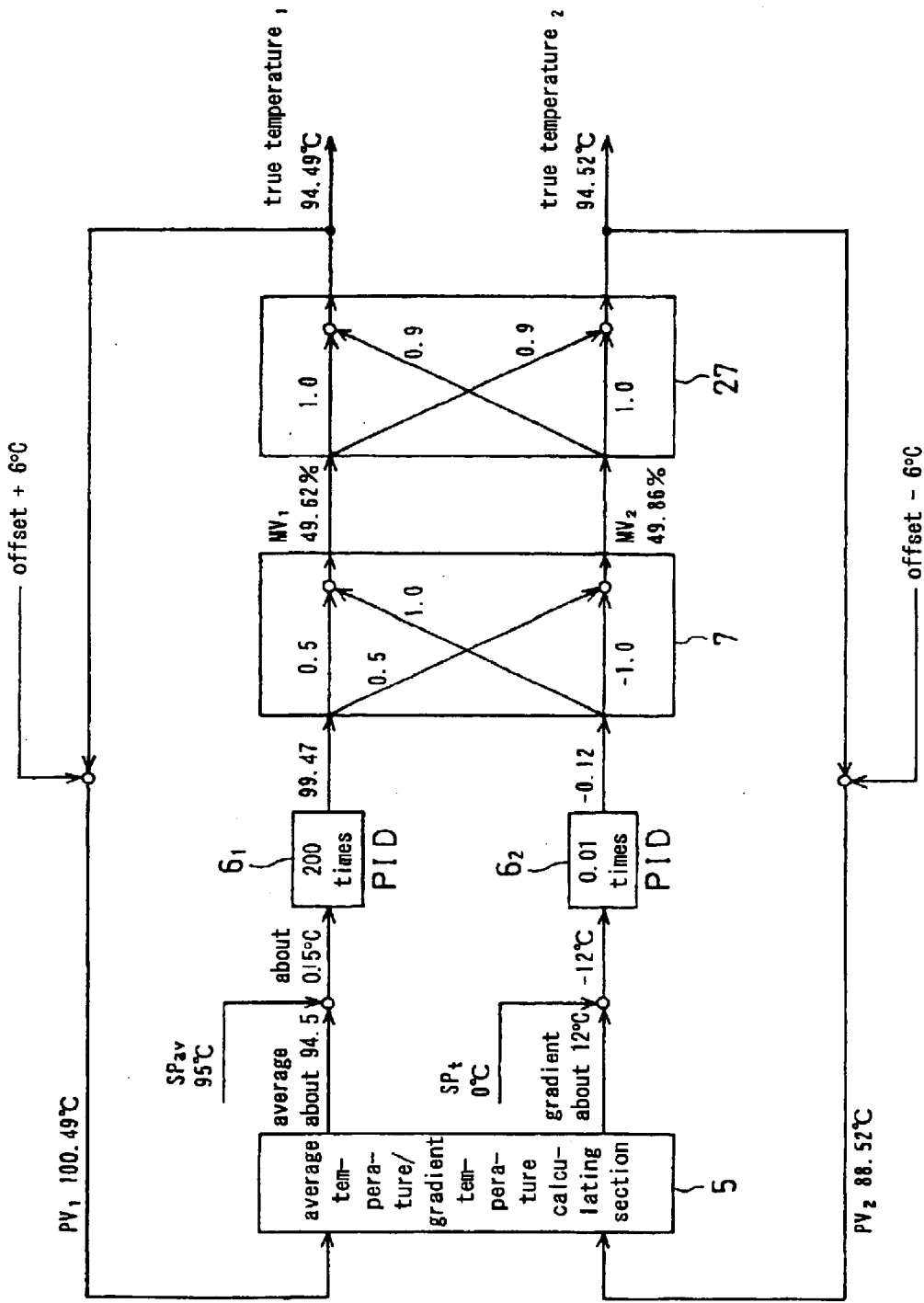
FIG. 23 is a block diagram of the embodiment which corresponds to FIG. 22.

Next, the offset adjustment of the present invention will be described based on FIG. 23 which includes the average temperature/gradient temperature calculating means 5, the first PID control means $6_1$ for controlling the average temperature, and the second PID (PD) control means $6_2$ for controlling the gradient temperature and conducting PD control not containing integral control. FIG. 23 also includes the distribution means 7 and the control target 27 with interference.

In the same manner as the prior art example shown in FIG. 22, the offset of the first temperature sensor $2_1$ is set at +6° C., the offset of the second temperature sensor $2_2$ is set at −6° C., the gain of the first PID control means $6_1$ is set at 200 times, the gain of the second PID (PD) control means $6_2$ not containing integral control is set at 0.01 times, and the coefficient of transmission of the control target 27 is set at 1.0 and 0.9.

In this stationary state, the detection temperature PV1 of the first temperature sensor $2_1$ is 100.49° C., the detection temperature PV2 of the second temperature sensor $2_2$ is 88.52° C., the average temperature is about 94.5° C., and the gradient temperature is about 12° C. which are calculated by the average temperature/gradient temperature calculating means 5.

Since the target average temperature SPav is 95° C., the control deviation to the first PID control means $6_1$ becomes about 0.5° C. Since the gain is 200 times, its output becomes 99.47. On the other hand, since the target gradient temperature SPt is 0° C., the control deviation to the second PID (PD) control means $6_2$ containing no integral control becomes −12° C. Since the gain is 0.01 times, its output becomes −0.12.

Consequently, the first amount of operation MV1 outputted from the distribution means 7 to the first heater $1_1$ becomes 99.47×0.5+(−0.12)×1.0=49.62%, and the second amount of operation MV2 to the second heater $1_2$ becomes 99.47×0.5+(−0.12)×(−1.0)=49.86%.

Therefore, the real temperature of the first zone in the control target 27 becomes 49.62×1.0+49.86×0.9=94.49° C., and the real temperature of the second zone becomes 49.62×0.9+49.86×1.0=94.52° C., thereby being put in stable conditions.

Therefore, in this stationary state, the amounts of operation MV1, MV2 are not saturated and the difference in real temperature is as small as 0.03° C. (=94.52° C.−94.49° C.), which enables temperature control with higher precision than the prior art example shown in FIG. 22.

The difference in offset of the temperature sensors appears in the deviation of the gradient temperature as −12° C. Adding the difference −12° C. as the offset adjustment value of the temperature sensors to the gradient temperature outputted from the average temperature/gradient temperature calculating means 5 enables offset adjustment. Therefore, the PD control can be switched to the PID control after the adjustment of the offsets.

Consequently, the offsets of the temperature sensors are adjusted and the saturation of the amounts of operation MV1, MV2 is resolved while keeping the difference in real temperature small, thereby enabling temperature control with higher precision than the prior art example.

The deviation of the gradient temperature obtained in the present embodiment is close to the offsets of the temperature sensors, but is not equivalent, which requires repeated adjustment.

It is possible to reduce the number of times of offset adjustment by making the gradient temperature control PD control without integration and also by weakening or even eliminating the proportion control.

Figure 24:
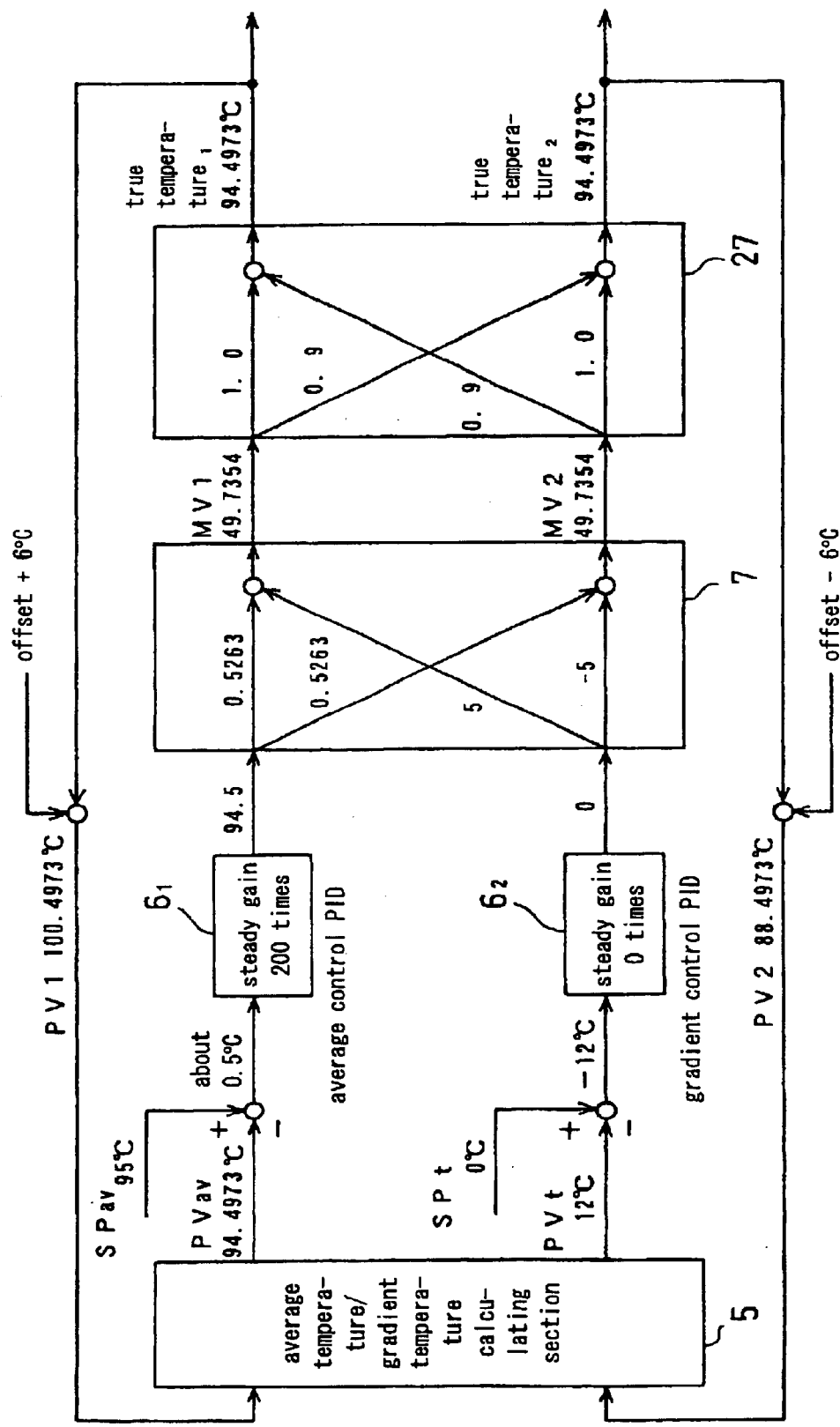
FIG. 24 is a block diagram of another embodiment which corresponds to FIG. 22.

FIG. 24 corresponds to FIG. 23 in the case where the gain of the second PID (PD) control means $6_2$ is O-fold. FIG. 24 is the same as FIG. 23 except that the interference reduction coefficient (distribution ratio) calculated using the above reverse matrix is used.

Reducing the stationary gain of the second PID (PD) control means $6_2$ for controlling the gradient temperature to an extreme degree makes the relative offsets in the temperature sensors appear accurately in the gradient temperature obtained from the average temperature/gradient temperature calculating means 5 and the control deviation of the gradient temperature, thereby enabling the reduction in the number of times of the offset adjustment.

The reason for this simple offset detection can be understood by considering the meaning of the coefficient (the left-end vertical row) which distributes the amount of operation of the average control of the interference reduction coefficient (the matrix coefficient of the predistorter 7). To be more specific, the distribution ratio of the amount of operation of the average control is so determined as to change the average temperature only and not to affect the gradient temperature. The offset is the reason of the difference in spite that the gradient temperature is not supposed to be changed with a chance in the amount of operation of the average control. A loop to cancel this offset is operated to reduce and cut the gain, and the deviation at this moment indicates the offset. In other words, all the sensors have fixed temperatures when controlled by the average control only, so this deviation indicates the offset.

Figure 25:
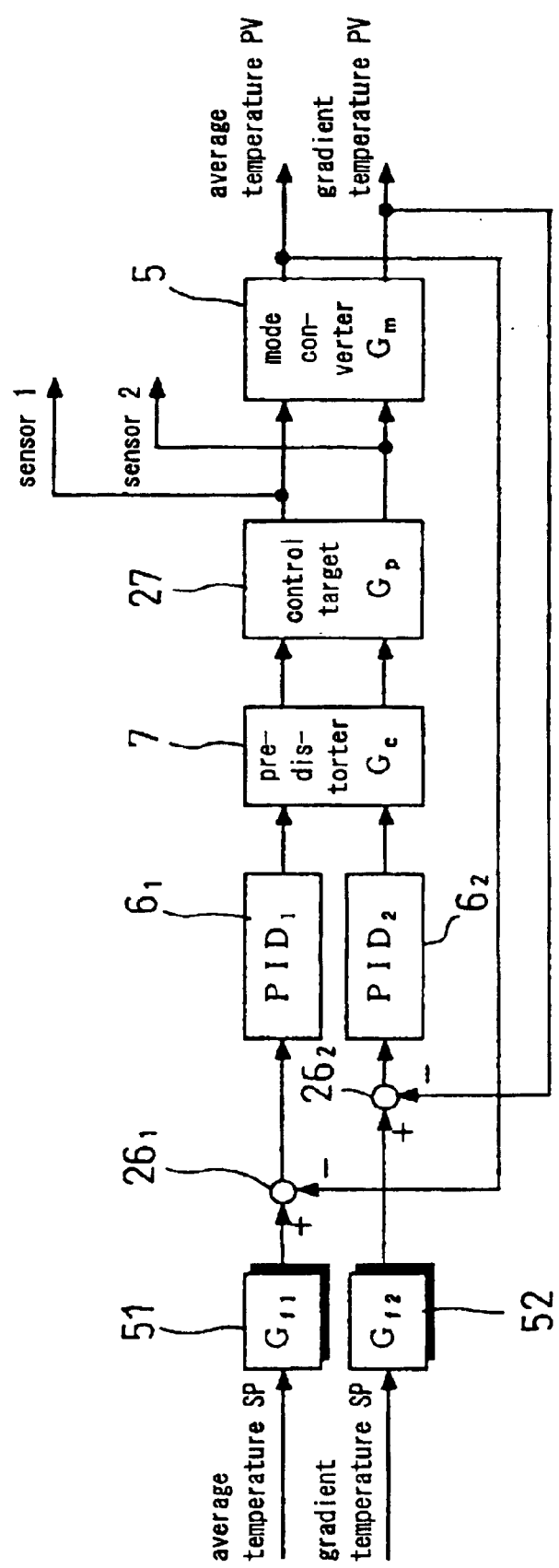
FIG. 25 is a block diagram with a target-value-filter 2 flexibility control.
Figure 26:
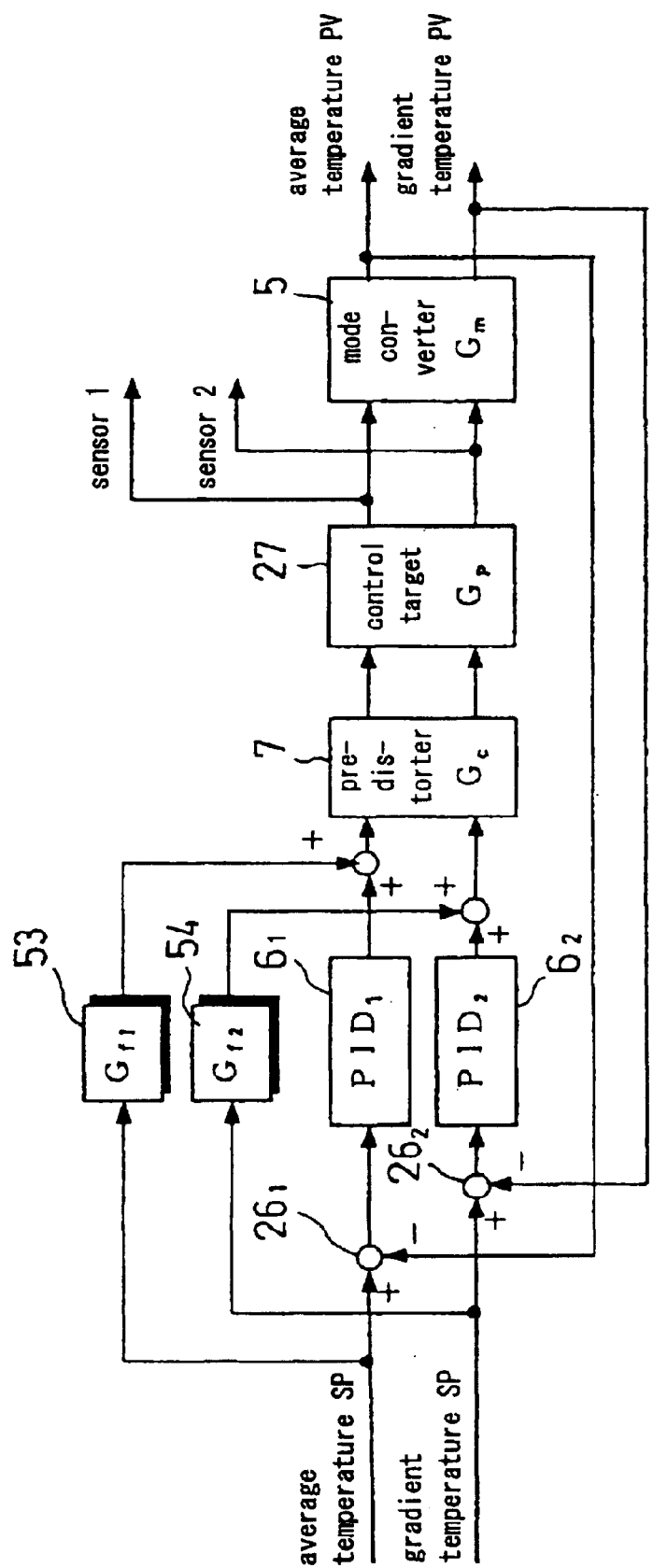
FIG. 26 is a block diagram with a feed-forward 2 flexibility control.

As another embodiment of the present invention, it is possible to combine this control with two-degree-of freedom control with the target value filters 51, 52 shown in FIG. 25, or with feed-forward two-degree-of freedom control having the feed-forward elements 53, 54 shown in FIG. 26. When the PID parameters for the gradient temperature control have strong gains, the target value response can have a smaller overshoot. In FIGS. 25, 26, the components corresponding to those shown in FIG. 4 are referred to the same reference symbols.

The above case deals with the case where n=2 for simplification; however, it is possible to apply this embodiment to the case of three zones, that is, three channels where of n=3 and there are three heaters, three temperature sensors, and three PID control means.

Figure 27:
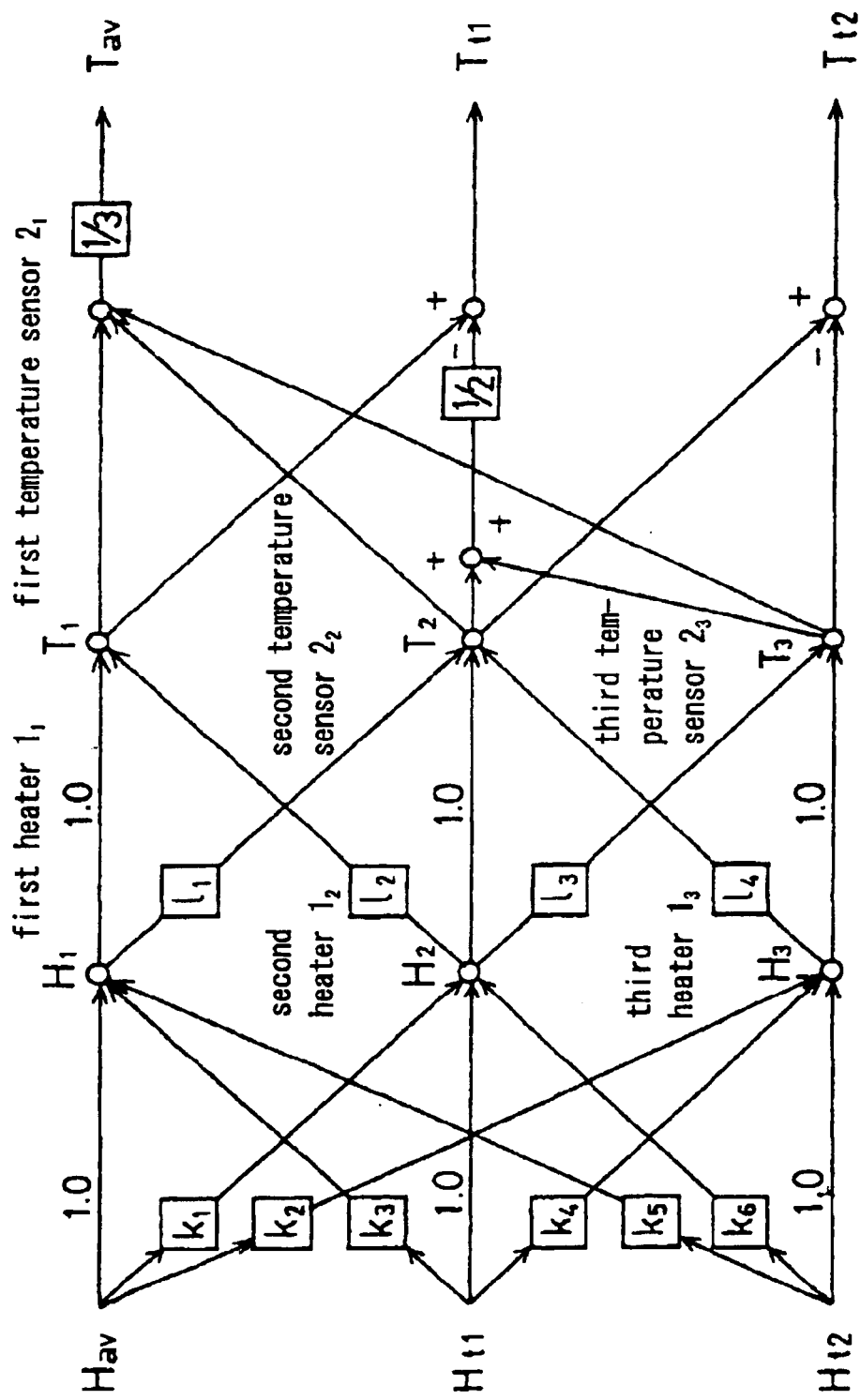
FIG. 27 is a block diagram of the control system having three zones.

To be more specific, as shown in the block diagram of FIG. 27 corresponding to FIG. 7 described above, it is assumed that the first to third heaters $1_1$ to $1_3$ and the first to third temperature sensors $2_1$ to $2_3$ corresponding to the heaters $1_1$ to $1_3$, respectively, are disposed in the first to third zones, respectively, and that the first and second zones are adjacent to each other, and the second and third zones are adjacent to each other. For simplification, it is also assumed that interference is caused only between the adjacent zones, and that the coefficient of transmission (interference coefficient) from the first heater $1_1$ to the second temperature sensor $2_2$ is $1_1$; the coefficient of transmission (interference coefficient) from the second heater $1_2$ to the first and third temperature sensors $2_1$ and $2_3$ is $1_2$ and $1_3$; the coefficient of transmission (interference coefficient) from the third heater $1_3$ to the second temperature sensor $2_2$ is $1_4$, and the coefficient of transmission (interference coefficient) from a heater to the corresponding temperature sensor, e.g. from the first heater $1_1$ to the first temperature sensor $2_1$, is 1.0.

It is also assumed about the interference reduction coefficient (distribution ratio) to eliminate interference that the interference reduction coefficients (distribution ratio) for distributing the amount of operation Hav of the first PID control means $6_1$ for controlling the average temperature between the second and third heaters $1_2$, $1_3$ are made $k_1$, $k_2$; the interference reduction coefficients (distribution ratio) for distributing the amounts of operation $Ht_1$ of the second PID control means $6_2$ for controlling the first gradient temperature $Tt_1$ between the first and third heaters $1_1$, $1_3$ are made $k_3$, $k_4$; the interference reduction coefficients (distribution ratio) for distributing the amount of operation Ht2 of the third PID control means $6_3$ for controlling the second gradient temperature $Tt_2$ between the first and second heaters $1_1$, $1_2$ are made $k_5$, $k_6$, and the coefficient of transmission from a PID control means to the corresponding heater, e.g. from the first PID control means $6_1$ to the first heater $1_1$ is made 1.0. In this example, the first gradient temperature $Tt_1$ indicates the difference between the average detection temperature of the detection temperatures $T_2$, $T_3$ of the second and third temperature sensors $2_2$, $2_3$ and the detection temperature $T_1$ of the first temperature sensor $2_1$, and the second gradient temperature $Tt_2$ indicates the difference between the detection temperature $T_2$ of the second temperature sensor $2_2$ and the detection temperature $T_3$ of the third temperature sensor $2_3$.

In this case, the average temperature Tav can be expressed as follows:

$$Tav = (T_1 + T_2 + T_3)/3$$

$$= \{(H_1 + 1_2 \cdot H_2) \div (1_1 \cdot H_1 + H_2 + 1_4 \cdot H_3) + (1_3 \cdot H_2 + H_3)\}/3$$

$$= \{(1+1_1)H_1 + (1+1_2+1_3)H_2 + (1+1_4)H_3\}/3$$

$$= \{(1+1_1)(Hav + k_3 \cdot Ht_1 + k_5 \cdot Ht_2) +$$

$$(1+1_2+1_3)(k_1 \cdot Hav + Ht_1 + k_6 \cdot Ht_2) +$$

$$(1+1_4)(k_2 \cdot Hav + k_4 \cdot Ht_1 + Ht_2)\}/3$$

$$= [\{(1+1_1) + (1+1_2+1_3)k_1 + (1+1_4)k_2\}Hav +$$

$$\{(1+1_1)k_3 \div (1+1_2+1_3) + (1+1_4)k_4\}Ht_1 +$$

$$\{(1+1_1)k_5 + (1+1_2+1_3)k_6 + (1+1_4)\}Ht_2]/3$$

Here, the average temperature Tav is a function only for the amount of operation Hav of the average temperature, and makes the terms of $Ht_1$, $Ht_2$ zero in order to eliminate the influence of the amounts of operation $Ht_1$, $Ht_2$ of the gradient temperatures, or in order to achieve interference-reducing.

In other words, $(1+1_1)k_3+(1+1_2+1_3)+(1+1_4)k_4=0$ $(1+1_1)k_5+(1+1_2+1_3)k_6+(1+1_4)=0$ These equations can be simplified as follows;

$1a+1b \cdot k_3+1c \cdot k_4=0$     [1]

$1d+1e \cdot k_5+1f \cdot k_6=0$     [2]

In the same manner, the following equations can be obtained about the first gradient temperature $Tt_1$ from the function only for the amount of operation $Ht_1$ of the first gradient temperature under the conditions of no influence of the amount of operation Hav of the average temperature and the amount of operation $Ht_2$ of the second gradient temperature.

$1g+1h \cdot k_1+1i \cdot k_2=0$     [3]

$1j+1_k \cdot k_5+1_1 \cdot k_6=0$     [4]

In the same manner, the following equations can be obtained about the second gradient temperature $Tt_2$.

$1m+1n \cdot k_1+1o \cdot k_2=0$     [5]

$1p+1q \cdot k_3+1r \cdot k_4=0$     [6]

Since the coefficients of transmission $1_1$ to $1_4$, that is, $1a$ to $1r$ can be found in the same manner as the case of n=2, the above equations [1] to [6] with the interference reduction coefficients $k_1$ to $k_6$ as unknowns can be obtained. Solving these equations can find the interference reduction coefficients (distribution ratios) $k_1$ to $k_6$ for the distribution in the distribution means.

For example, the following is a solution using determinants.

[Numerical Formula 6]

$$\begin{pmatrix} l_a \\ l_d \\ l_g \\ l_j \\ l_m \\ l_p \end{pmatrix} + \begin{pmatrix} 0 & 0 & l_b & l_c & 0 & 0 \\ 0 & 0 & 0 & 0 & l_e & l_f \\ l_h & l_i & 0 & 0 & 0 & 0 \\ 0 & 0 & 0 & 0 & l_k & l_t \\ l_n & l_o & 0 & 0 & 0 & 0 \\ 0 & 0 & l_q & l_r & 0 & 0 \end{pmatrix} \begin{pmatrix} k_1 \\ k_2 \\ k_3 \\ k_4 \\ k_5 \\ k_6 \end{pmatrix} = 0$$

[Numerical Formula 7]

$$\begin{pmatrix} k_1 \\ k_2 \\ k_3 \\ k_4 \\ k_5 \\ k_6 \end{pmatrix} = -\begin{pmatrix} 0 & 0 & l_b & l_c & 0 & 0 \\ 0 & 0 & 0 & 0 & l_e & l_f \\ l_h & l_i & 0 & 0 & 0 & 0 \\ 0 & 0 & 0 & 0 & l_k & l_t \\ l_n & l_o & 0 & 0 & 0 & 0 \\ 0 & 0 & l_q & l_r & 0 & 0 \end{pmatrix}^{-1} \begin{pmatrix} l_a \\ l_d \\ l_g \\ l_j \\ l_m \\ l_p \end{pmatrix} = 0$$

As described hereinbefore, the present invention can be applied to the control system where n=3 or larger, as well.

The predistortion matrix Gc, which is a matrix of the distribution ratio (efficient of interference-reducing), can be also found from the mode conversion matrix Gm and the matrix P of the efficient of transmission (interference efficient) including the interference reduction coefficient between a PID control means and the corresponding heater, such as from the first PID control means $6_1$ to the first heater $1_1$. It is assumed that the matrix P of the coefficient of transmission (interference coefficient) which is a characteristic of the control target at a time is expressed as follows:

[Numerical Formula 8]

$$P = \begin{pmatrix} 1 & l_2 & 0 \\ l_1 & 1 & l_3 \\ 0 & l_4 & 1 \end{pmatrix}$$

wherein $l_1 = l_2 = l_3 = l_4 = 0.9$.

Then, an equation can be obtained as follows:

[Numerical Formula 9]

$$P = \begin{pmatrix} 1 & 0.9 & 0 \\ 0.9 & 1 & 0.9 \\ 0 & 0.9 & 1 \end{pmatrix}$$

The predistortion matrix Gc is as follows:

[Numerical Formula 10]

$$Gc = (Gm \cdot P)^{-1}$$

$$= \left( \begin{pmatrix} \frac{1}{3} & \frac{1}{3} & \frac{1}{3} \\ 1 & -1 & 0 \\ 0 & 1 & -1 \end{pmatrix} \times \begin{pmatrix} 1 & 0.9 & 0 \\ 0.9 & 1 & 0.9 \\ 0 & 0.9 & 1 \end{pmatrix} \right)^{-1}$$

$$= \begin{pmatrix} 0.6333 & 0.9333 & 0.6333 \\ 0.1 & -0.1 & -0.9 \\ 0.9 & 0.1 & -0.1 \end{pmatrix}^{-1}$$

$$= \begin{pmatrix} -0.1613 & -0.2527 & -1.2527 \\ 1.2903 & 1.0215 & -1.0215 \\ -0.1613 & -1.0227 & 0.2527 \end{pmatrix}$$

The correctness of Gm·P·Gc=I is verified.

[Numerical Formula 11]

$$Gm \cdot P \cdot Gc = \begin{pmatrix} \frac{1}{3} & \frac{1}{3} & \frac{1}{3} \\ 1 & -1 & 0 \\ 0 & 1 & -1 \end{pmatrix} \times \begin{pmatrix} 1 & 0.9 & 0 \\ 0.9 & 1 & 0.9 \\ 0 & 0.9 & 1 \end{pmatrix} \times$$

$$\begin{pmatrix} -0.1613 & -0.2527 & -1.2527 \\ 1.2903 & 1.0215 & -1.0215 \\ -0.1613 & -1.0227 & 0.2527 \end{pmatrix}$$

$$= \begin{pmatrix} 1 & 0 & 0 \\ 0 & 1 & 0 \\ 0 & 0 & 1 \end{pmatrix}$$

The mode conversion matrix Gm for calculating the average temperature and the gradient temperature can be changed according to the structure of the control target or the purpose of the control. Some examples are shown as follows.

Figure 28A:
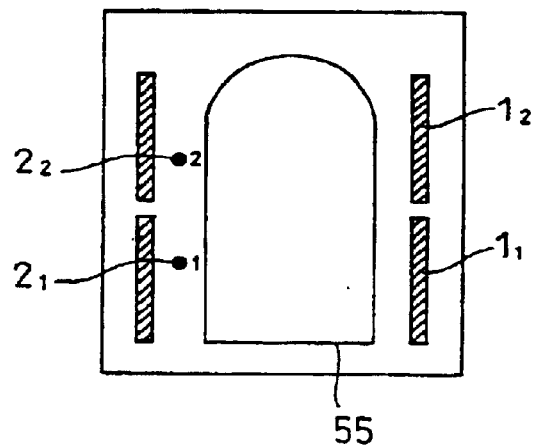
FIGS. 28A and 28B are diagrams showing a control target.
Figure 28B:
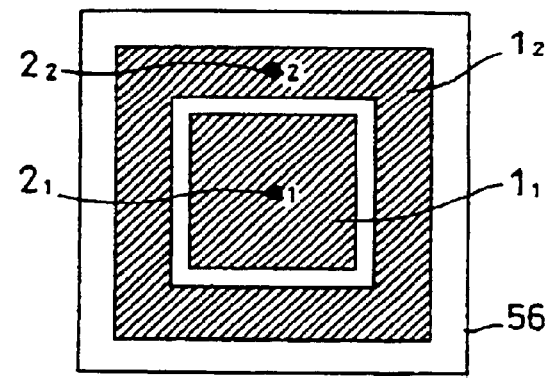

For example, when a vacuum chamber 55 divided into two zones in the heat treatment apparatus is temperature-controlled with two heaters $1_1$, $1_2$ and two temperature sensors $2_1$, $2_2$, which enclose the vacuum chamber 55 as shown in FIG. 28(a) or when the rectangle heat-treated plate 56 shown in FIG. 28(b) is temperature-controlled with two heaters $1_1$, $1_2$ and two temperature sensors $2_1$, $2_2$, the following mode conversion matrix Gm can be used by focusing attention on the interference between adjacent sensors.

[Numerical Formula 12]

$$Gm = \begin{pmatrix} 1/2 & 1/2 \\ 1 & -1 \end{pmatrix}$$

Figure 29A:
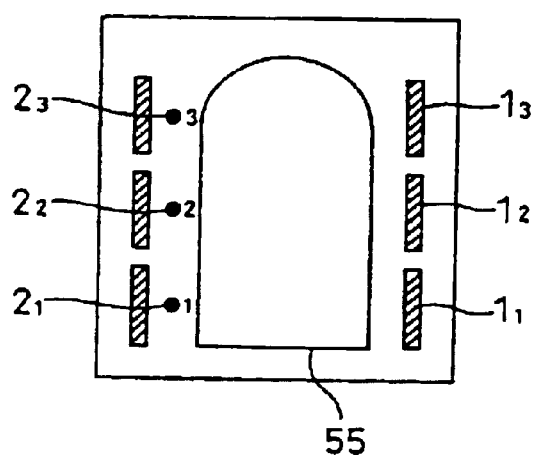
FIGS. 29A and 29B are diagrams showing another control target.
Figure 29B:
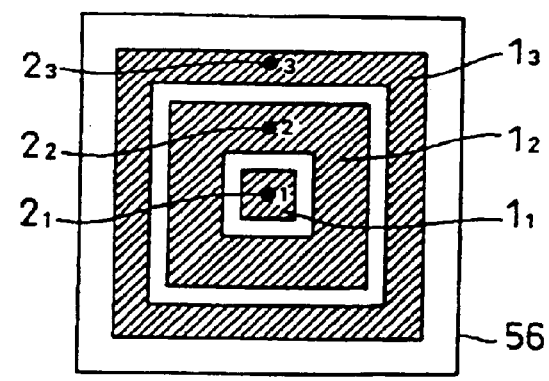

When the vacuum chamber 55 is temperature-controlled by being divided into three zones and using three heaters $1_1$, $1_2$, $1_3$ and three temperature sensors $2_1$, $2_2$, $2_3$ as shown in FIG. 29, or when the rectangular heat-treated plate 56 shown in FIG. 29(b) is temperature-controlled using three heaters $1_1$, $1_2$, $1_3$ and three temperature sensors $2_1$, $2_2$, $2_3$, the following mode conversion matrix Gm can be used by focusing attention on the interference between adjacent sensors.

[Numerical Formula 13]

$$G_m = \begin{pmatrix} 1/3 & 1/3 & 1/3 \\ 1 & -1 & 0 \\ 0 & 1 & -1 \end{pmatrix}$$

or

[Numerical Formula 14]

$$G_m = \begin{pmatrix} 1/3 & 1/3 & 1/3 \\ 1 & -1/2 & -1/2 \\ 0 & 1 & -1 \end{pmatrix}$$

Figure 30:
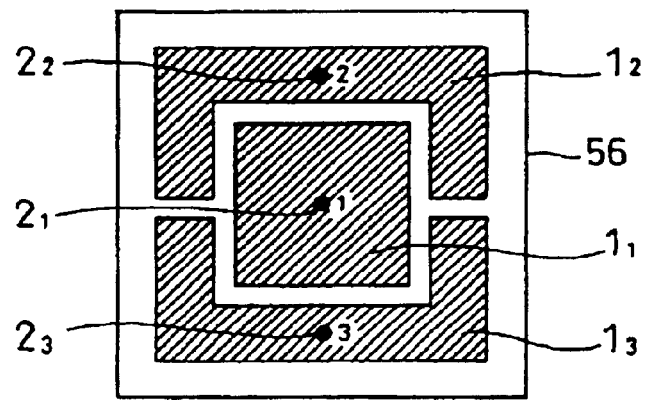
FIG. 30 is a diagram showing further another control target.

In the case of the rectangle heat-treated plate 56 shown in FIG. 30 where there are an inner zone and an outer zone, which are further divided into two zones, and are also heaters $1_1$, $1_2$, $1_3$ arranged in the respective zones, the following mode conversion matrix Gm can be used by focusing attention on the interference between adjacent sensors.

[Numerical Formula 15]

$$G_m = \begin{pmatrix} 1/3 & 1/3 & 1/3 \\ 1 & -1 & 0 \\ 0 & 1 & -1 \end{pmatrix}$$

or

[Numerical Formula 16]

$$G_m = \begin{pmatrix} 1/3 & 1/3 & 1/3 \\ 1 & -1/2 & -1/2 \\ 0 & 1 & -1 \end{pmatrix}$$

Figure 31:
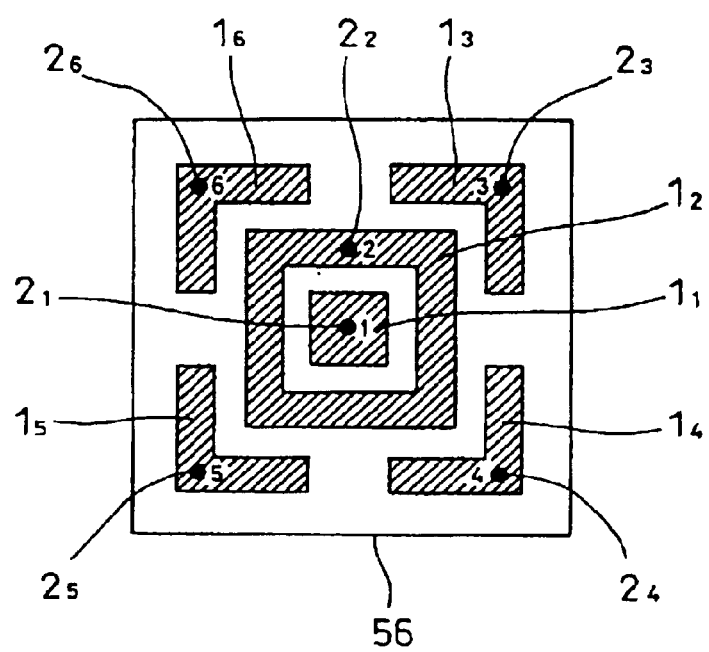
FIG. 31 is a diagram showing further another control target.

In the case of the rectangle heat-treated plate 56 shown in FIG. 31 where there are six separate zones provided with the respective heaters $1_1$ to $1_6$, the following mode conversion matrix Gm can be used by focusing attention on the interference between adjacent sensors.

[Numerical Formula 17]

$$Gm = \begin{pmatrix} \frac{1}{6} & \frac{1}{6} & \frac{1}{6} & \frac{1}{6} & \frac{1}{6} & \frac{1}{6} \\ 1 & -1 & 0 & 0 & 0 & 0 \\ 0 & 1 & -1 & 0 & 0 & 0 \\ 0 & 1 & 0 & -1 & 0 & 0 \\ 0 & 1 & 0 & 0 & -1 & 0 \\ 0 & 1 & 0 & 0 & 0 & -1 \end{pmatrix}$$

Figure 32:
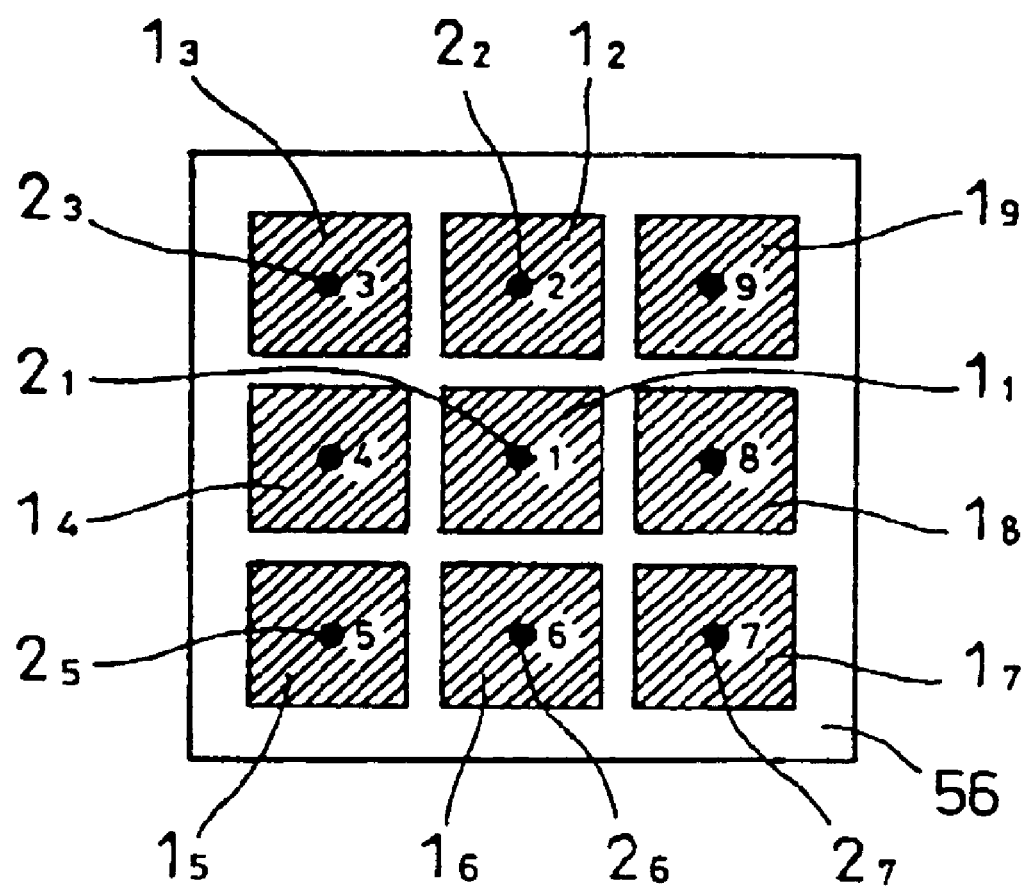
FIG. 32 is a diagram showing further another control target.

In the case of the rectangle heat-treated plate 56 shown in FIG. 32 where there are nine separate lattice zones provided with the respective heaters $1_1$ to $1_9$, the following mode conversion matrix Gm can be used by focusing attention on the interference between adjacent sensors.

[Numerical Formula 18]

$$Gm = \begin{pmatrix} 1/9 & 1/9 & 1/9 & 1/9 & 1/9 & 1/9 & 1/9 & 1/9 & 1/9 \\ 1 & -1 & 0 & 0 & 0 & 0 & 0 & 0 & 0 \\ 1 & 0 & -1 & 0 & 0 & 0 & 0 & 0 & 0 \\ 1 & 0 & 0 & -1 & 0 & 0 & 0 & 0 & 0 \\ 1 & 0 & 0 & 0 & -1 & 0 & 0 & 0 & 0 \\ 1 & 0 & 0 & 0 & 0 & -1 & 0 & 0 & 0 \\ 1 & 0 & 0 & 0 & 0 & 0 & -1 & 0 & 0 \\ 1 & 0 & 0 & 0 & 0 & 0 & 0 & -1 & 0 \\ 1 & 0 & 0 & 0 & 0 & 0 & 0 & 0 & -1 \end{pmatrix}$$

or

[Numerical Formula 19]

$$Gm = \begin{pmatrix} 1/9 & 1/9 & 1/9 & 1/9 & 1/9 & 1/9 & 1/9 & 1/9 & 1/9 \\ 1 & -1/8 & -1/8 & -1/8 & -1/8 & -1/8 & -1/8 & -1/8 & -1/8 \\ 0 & 1/4 & 1/4 & 1/4 & 1/4 & -1/4 & -1/4 & -1/4 & -1/4 \\ 0 & 1/2 & 1/2 & -1/2 & -1/2 & 0 & 0 & 0 & 0 \\ 0 & 0 & 0 & 0 & 0 & 1/2 & 1/2 & -1/2 & -1/2 \\ 0 & 1 & -1 & 0 & 0 & 0 & 0 & 0 & 0 \\ 0 & 0 & 0 & 1 & -1 & 0 & 0 & 0 & 0 \\ 0 & 0 & 0 & 0 & 0 & 1 & -1 & 0 & 0 \\ 0 & 0 & 0 & 0 & 0 & 0 & 0 & 1 & -1 \end{pmatrix}$$

It goes without saying that the heat-treated plate 56 can be other than a rectangle; it can be coaxial or of other shape as in the prior art example shown in FIG. 21.

As mentioned above, the predistortion matrix Gc, which is the matrix of distribution ratio (interference reduction coefficient) can be found as the reverse matrix of the product of the mode conversion matrix Gm by the matrix P of the coefficient of transmission (interference coefficient).

Therefore, finding the predistorter Gc needs to know the matrix P of the coefficient of transmission (interference coefficient).

Since the coefficient of transmission can be replaced by a transmission function which also indicates frequency characteristics, a specific method for measuring the matrix P as a transmission function (interference coefficient) will be described as follows.

Figure 33:
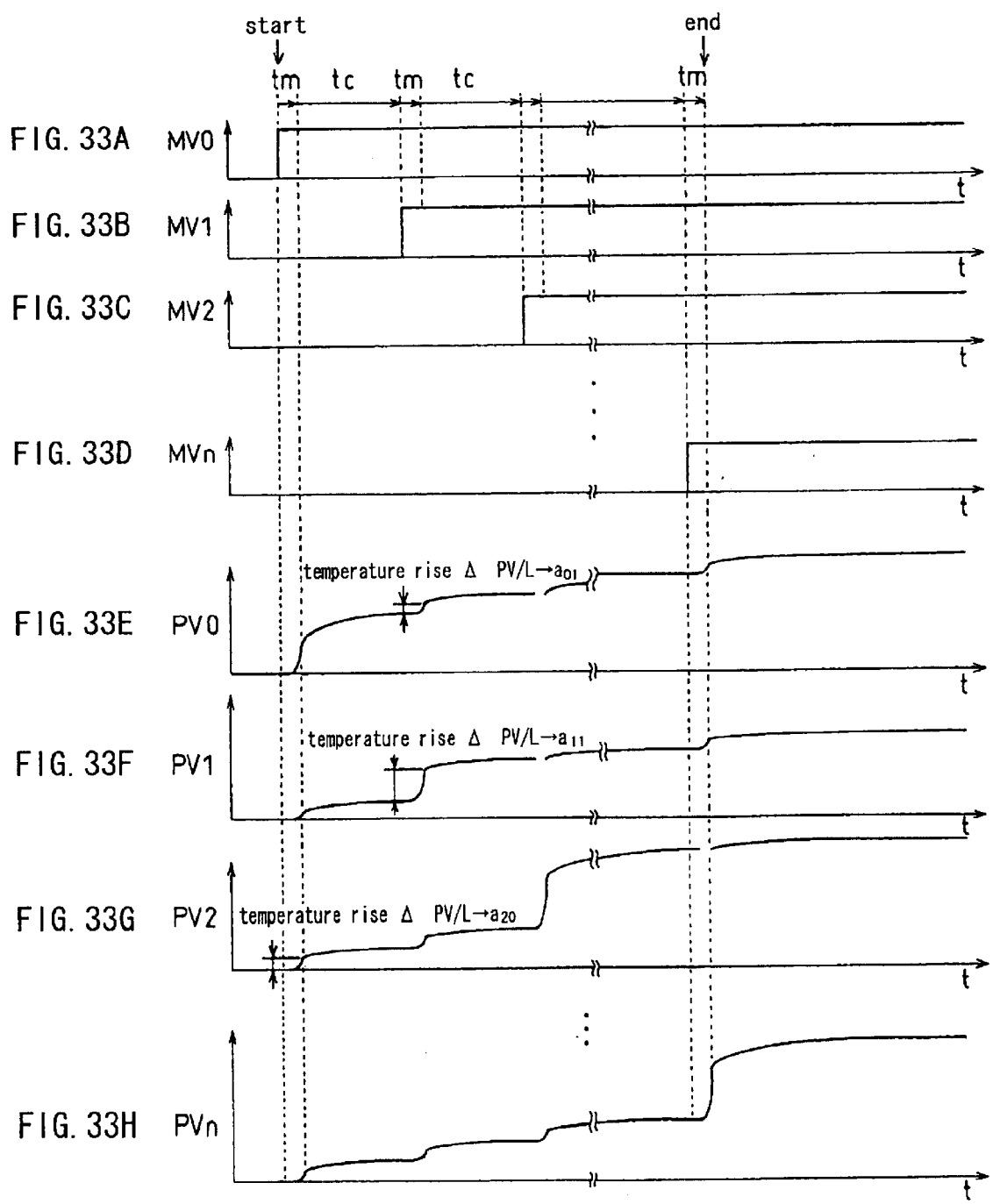
FIG. 33A–33H are diagrams for explaining a method for measuring the matrix P of an interference coefficient using step response.

FIG. 33 is a diagram showing changes in the amount of operation MV and the amount of feedback PV to explain the method for measuring the matrix P of the interference coefficient using the step response of an embodiment of the present invention.

Figure 34:
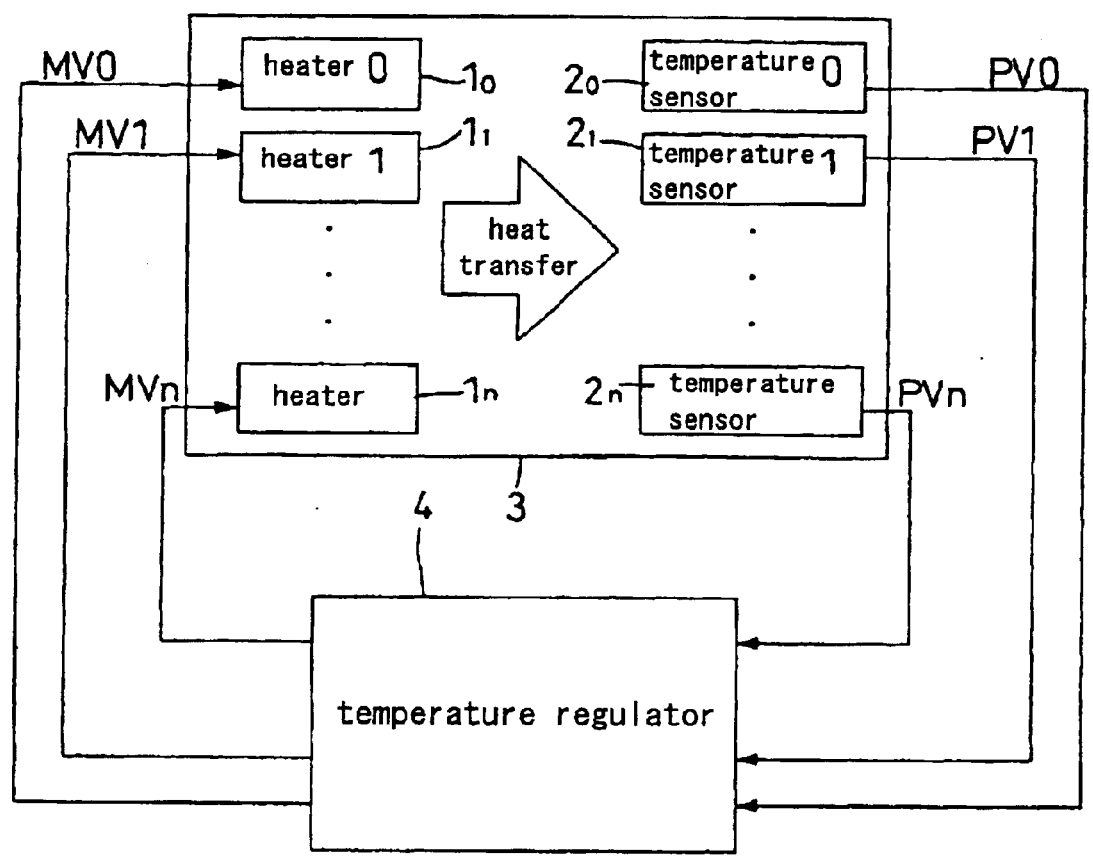
FIG. 34 is a rough block diagram of the temperature control system which corresponds to FIG. 33.
Figure 35:
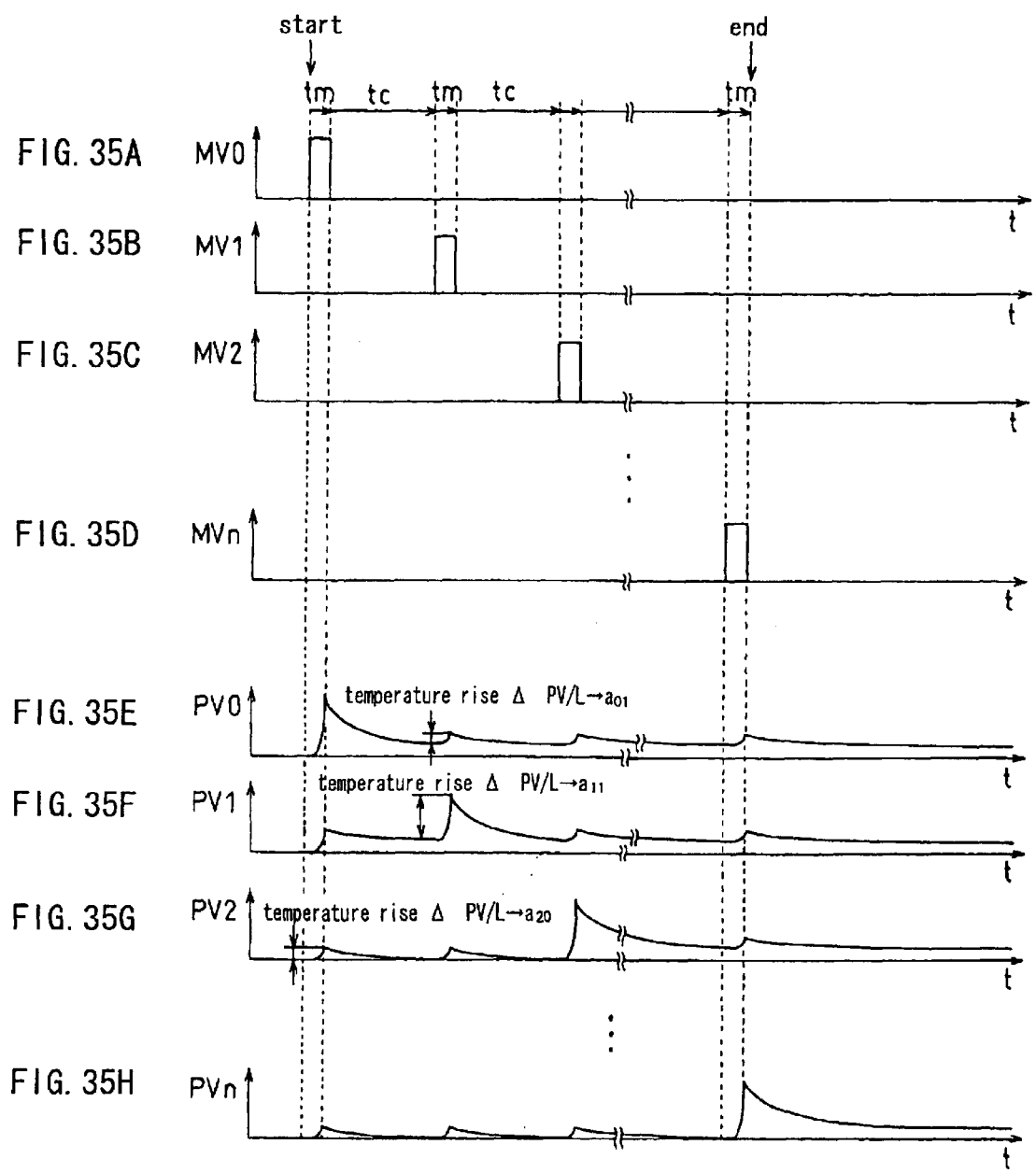
FIG. 35A and 35H are a diagrams of another embodiment which corresponds to FIG. 33.

For example, in the temperature control system shown in FIG. 34, that is, the system comprising heaters $1_0$ to $1n$ for heating the control target 3; temperature sensors $2_0$ to $2n$, which correspond to the heaters $1_0$ to $1n$, respectively, for detecting temperatures of the control target 3; and a temperature regulator 4 of the present invention for controlling temperatures of the control target 3 by operating the heaters $1_0$ to $1n$ via an unillustrated electromagnetic switch based on the detection outputs of the temperature sensors $2_0$ to $2n$, the heaters $1_0$ to $1n$ are supplied in turn with the amounts of operation MV0, MV1 ... MVn in a step-like manner as shown in FIG. 33(a)–(d), and the value ΔPV/L obtained by dividing the temperature rise value ΔPV with respect to the temperature immediately before the rise after a certain time tm by a unit time L is set as $a_{00}$ to $a_{nn}$ of the matrix P of the interference coefficient (transmission function) shown below, based on the detection temperatures PV0, PV1, ... PVn which are the amounts of feedback from the temperature sensors $2_0$ to $2n$ shown in FIGS. 33(e)–(h). In further another embodiment of the present invention, the value is not divided by the unit time L. The structure shown in FIG. 34 is the same as the structure shown in FIG. 1 although the heaters and the temperature sensors are referred to with different reference symbols for the purpose of clarifying the correspondence between these components and the elements $a_{00}$ to $a_{nn}$ of the matrix P of the coefficient of interference (transmission function) shown below.

[Numerical Formula 20]

$$P = \begin{pmatrix} a_{00} & a_{01} & a_{02} & a_{03} & a_{04} & \ldots & a_{0n} \\ a_{10} & a_{11} & a_{12} & a_{13} & a_{14} & \ldots & a_{1n} \\ a_{20} & & & & & & \\ \vdots & & & & & & \vdots \\ a_{n0} & & & & & \ldots & a_{nn} \end{pmatrix}$$

For example, when the 0-th heater $1_0$ is provided with the amount of operation MV0 having the step-like form as shown in FIG. 33(a), the temperature rise value $\Delta PV/L$ per unit time based on the detection temperature PV0 of the 0-th temperature sensor $2_0$ shown in FIG. 33(e) is made $a_{00}$. The temperature rise value $\Delta PV/L$ per unit time based on the detection temperature PV1 of the first temperature sensor $2_1$ shown in FIG. 33(f) is made $a_{10}$; and the temperature rise value $\Delta PV/L$ per unit time based on the detection temperature PV2 of the second temperature sensor $2_2$ shown in FIG. 33(g) is made $a_{20}$. The temperature rise value $\Delta PV/L$ per unit time based on the detection temperature PVn of the n-th temperature sensor $2n$ shown in FIG. 33(h) is made $a_{n0}$. In the same manner, when the first heater $1_1$ is provided with the amount of operation MV1 having a step-like form as shown in FIG. 33(b), the temperature rise value $\Delta PV/L$ per unit time based on the detection temperature PV0 of the 0-th temperature sensor 20 shown in FIG. 33(e) is made $a_{01}$. The temperature rise value $\Delta PV/L$ per unit time based on the temperature PV1 of the first temperature sensor $2_1$ shown in FIG. 33(f) is made $a_{11}$; the temperature rise value $\Delta PV/L$ per unit time based on the detection temperature PV2 of the second temperature sensor $2_2$ shown in FIG. 33(g) is made $a_{21}$; and the temperature rise value $\Delta PV/L$ per unit time based on the detection temperature PVn of the n-th temperature sensor $2n$ shown in FIG. 33(h) is made $a_{n1}$.

Similarly, when the n-th heater is provided with the amount of operation MVn having a step-like form as shown in FIG. 33(d), the temperature rise value $\Delta PV/L$ per unit time based on the detection temperature PV0 of the 0-th temperature sensor $2_0$ shown in FIG. 33(e) is made $a_{0n}$; the temperature rise value $\Delta PV/L$ per unit time based on the detection temperature PV1 of the first temperature sensor $2_1$ shown in FIG. 33(f) is made $a_{1n}$; that the temperature rise value $\Delta PV/L$ per unit time based on the detection temperature PV2 of the second temperature sensor $2_2$ shown in FIG. 33(g) is made $a_{2n}$; and the temperature rise value $\Delta PV/L$ per unit time based on the detection temperature PVn of the n-th temperature sensor $2n$ shown in FIG. 33(h) is made $a_{nn}$. In FIG. 33, tc indicates a certain period of time taken until changes in the detection temperature PV is stabilized with respect to changes in the amount of operation MV.

As described hereinbefore, the matrix P of the coefficient of interference (transmission function) is found by sequentially measuring the degree of influence on the detection temperature of the temperature sensors, when a heater is supplied with the amount of operation in the step-like form. The measurement of the matrix P of the coefficient of interference (transmission function) is automatically carried out when the temperature control system is booted. The predistortion matrix Gc which is a matrix of the distribution ratio (interference reduction coefficient) is found from the matrix P of the coefficient of interference (transmission function) and the mode conversion matrix Gm previously set. The above-mentioned gradient temperature control with no interference is carried out by the distribution of the amount of operation based on this predistortion matrix Gc.

In the present embodiment, in finding the matrix P of the coefficient of interference (transmission function), the PID control means $6_0$ to $6n$ composing the temperature regulator 4 merely output the amount of operation in the step-like form in sequence without carrying out the PID control. Therefore, it is possible to find not only the matrix P of the interference coefficient but also the parameters for the PID control of the PID control means $6_0$ to $6n$.

In the present embodiment, the supply of the amount of movement MV having the step-like form causes a temperature rise. To solve this, it is possible to provide the amounts of operation MV0-MVn in turn in the form of a pulse having a fixed width as shown in FIGS. 35(a)–(d), which eliminates the temperature rise so that the coefficient of interference can be measured at room temperature. The other structure is equal to the structure of the embodiment shown in FIG. 33.

It must be noted that the interference coefficients in the heaters having low interference can be measured at the same time. For example, when the 0-th heater $1_0$ and the n-th heater in are too far from each other to interfere with, the amounts of operation MV0, NVn can be concurrently given to the 0-th heater $1_0$ and the n-th heater $1n$. In this case, PVn with respect to MV0 is made 0, and PV0 with respect to MVn is made 0. Like this, between heaters with a low interference, the coefficients of interference can be measured at the same time, thereby saving the measurement time.

Figure 36:
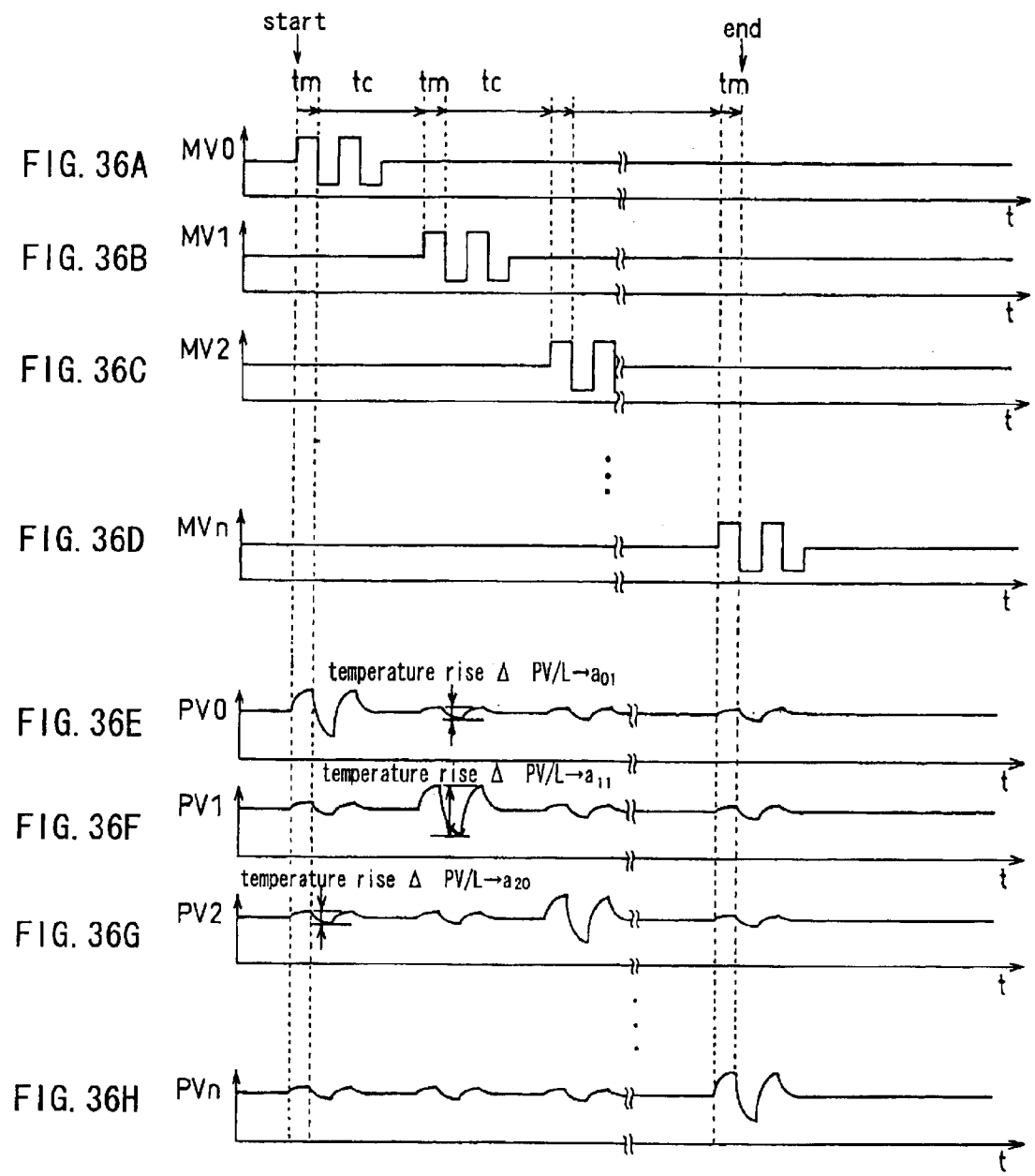
FIG. 36A and 36H are a diagram for explaining a method for measuring the matrix P of an interference coefficient using limit cycle.

FIG. 36, which corresponds to FIG. 33, explains a method for measuring the matrix P of the coefficient of interference (transmission function) by making use of the limit cycle of another embodiment of the present invention.

For example, the temperature is once set at room temperature, and the amounts of operation MV0–MVn given to the heaters $1_0$–$1n$ are varied in turns to the plus side and to the minus side, thereby calculating the values $\Delta PV/L$ by dividing the maximum amplitude $\Delta PV$ of the detection temperatures PV0–PVn by the unit time and the obtained values are made $a_{00}$ to $a_{n0}$ of the matrix P of the coefficient of interference (transmission function). The other features of the structure are equal to the above step response.

When this limit cycle is applied, the amount of operation MV is changed to the plus side and to the minus side, which enables the matrix P of the coefficient of interference (transmission function) to be measured while the temperature is kept at the actual operation temperature, thereby obtaining the interference coefficient with higher precision.

In each of the aforementioned embodiments, each PID control means makes the average temperature the target average temperature (the target value of the average temperature) or the gradient temperature the target gradient temperature (the target value of the gradient temperature), and the target average temperature and the target gradient temperature are set by the user; however, the setting of these temperatures is not easily understood by the user who used to set the target temperature channel by channel.

Figure 37:
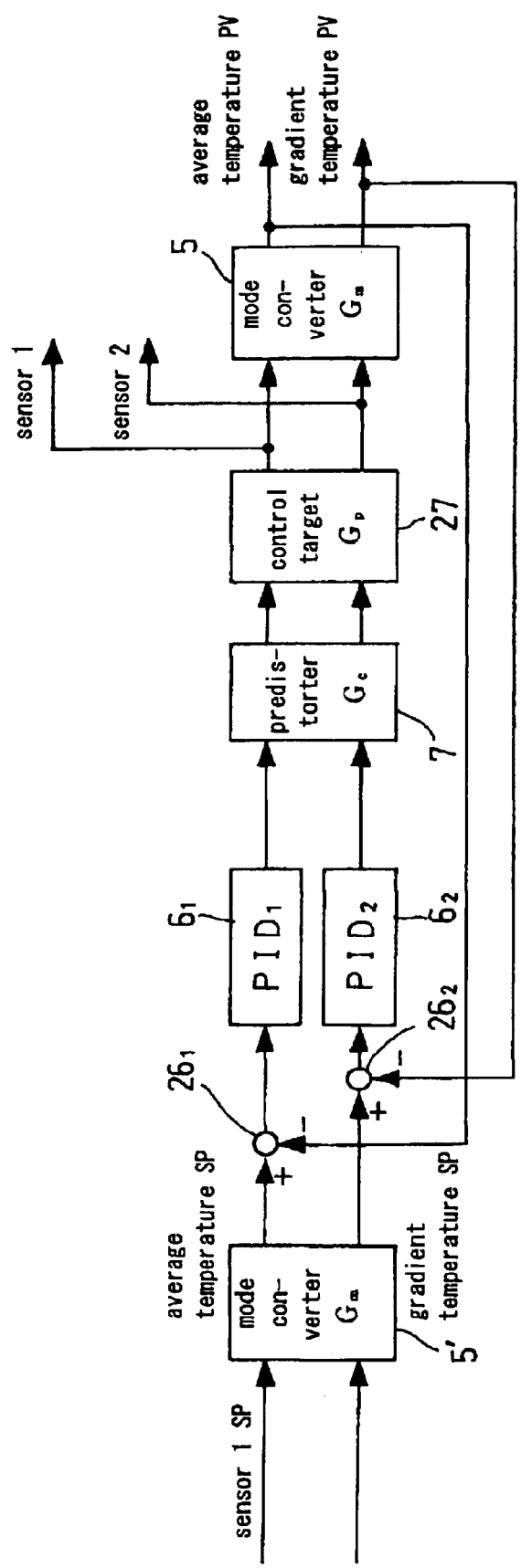
FIG. 37 is a block diagram of another embodiment.

Therefore, it is possible as shown in FIG. 37 to provide a mode converter 5' for calculating the target average temperature and the target gradient temperature from the target temperature SP in each channel. In FIG. 37 the components corresponding to those in FIG. 4 are referred to with the same reference symbols. The mode converter 5' has the same structure as the mode converter 5 which calculates the average temperature and the gradient temperature from the detection temperature of the temperature sensor in each channel, which is the amount of feedback from the control target 27.

Adding the mode converter 5' enables the user to set the target temperature SP for each channel in the same manner as in the conventional system, without taking the average temperature or the gradient temperature into consideration.

Figure 38:
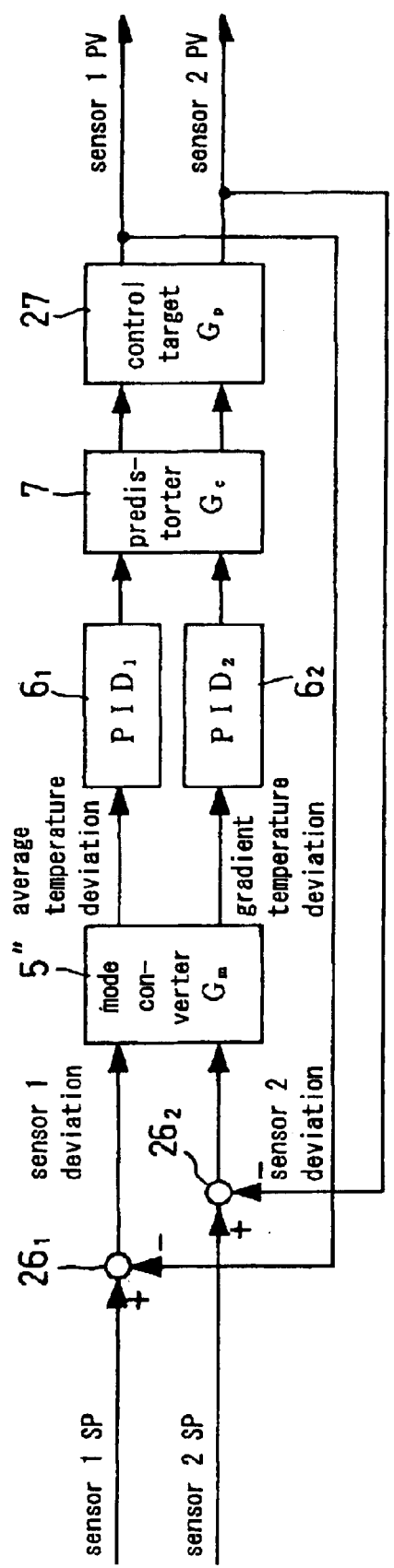
FIG. 38 is a block diagram of further another embodiment.

As further another embodiment of the present invention, it is possible to provide a mode converter 5" shown in FIG. 38 as a converting means for finding the temperature deviation between the detection temperature PV of the temperature sensor in each channel, which is the amount of feedback from the control target 27 and the target temperature SP, and for calculating an average temperature deviation and a gradient temperature deviation, which are the control deviations from the temperature deviation in each channel. The mode converter 5" has the same structure as the mode converter 5 for calculating the average temperature and the gradient temperature from the detection temperature of the temperature in each channel, which is the amount of feedback from the control target 27.

According to this embodiment, the user can set the target temperature for each channel in the same manner as in the conventional system without taking the average temperature and the gradient temperature into consideration, and also can manage with the single mode converter 5", thereby reducing the memory capacity and simplifying the process.

To be more specific, in each of the aforementioned embodiments, the mode converters 5 and 5' convert detection temperatures of plural temperature sensors into the average temperatures and the gradient temperatures. In contrast, the mode converter 5" of the present embodiment converts the temperature deviation between the detection temperatures of plural temperature sensors and the target temperature into the average temperature deviation, which is the deviation between the detected average temperatures and the target average temperatures, and also into the gradient temperature deviation which is the deviation between the detected gradient temperatures and the target gradient temperature.

In other words, in each of the aforementioned embodiments, the control deviation is found after the detection temperature is converted into the average temperature and the gradient temperature, whereas in the present embodiment, the temperature deviation between the detection temperature and the target temperature is found and converted into the average temperature deviation and the gradient temperature deviation which are the control deviations.

Figure 39:
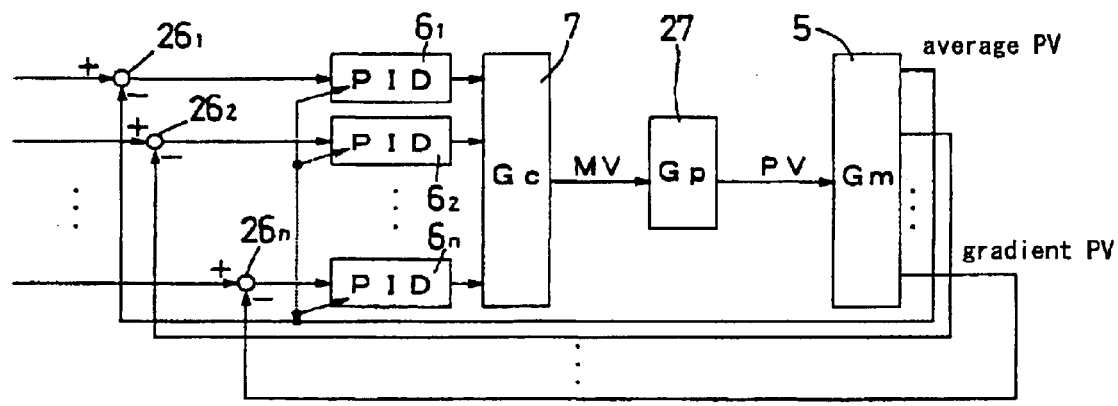
FIG. 39 is a block diagram of further another embodiment.

FIG. 39 shows the structure of further another embodiment of the present invention, and the components corresponding to those in the aforementioned embodiments are referred to with the same reference symbols.

In general, a heater increases its resistance value with increasing temperature, which causes a decrease in current flow, thereby decreasing the gain of the control loop and the time constant. If nothing is done against this, hunching or an overshoot will occur. To avoid this problem, in the conventional system, the setting of control parameters is modified in accordance with the temperature to be controlled; however, such an operation for modified setting is troublesome.

Therefore, in the present embodiment the PID parameters of the PID control means 6₁ to 6n are corrected according to the average temperatures based on the detection temperatures of the plural temperature sensors which are the amount of feedback PV from the control target 27.

Figure 40:
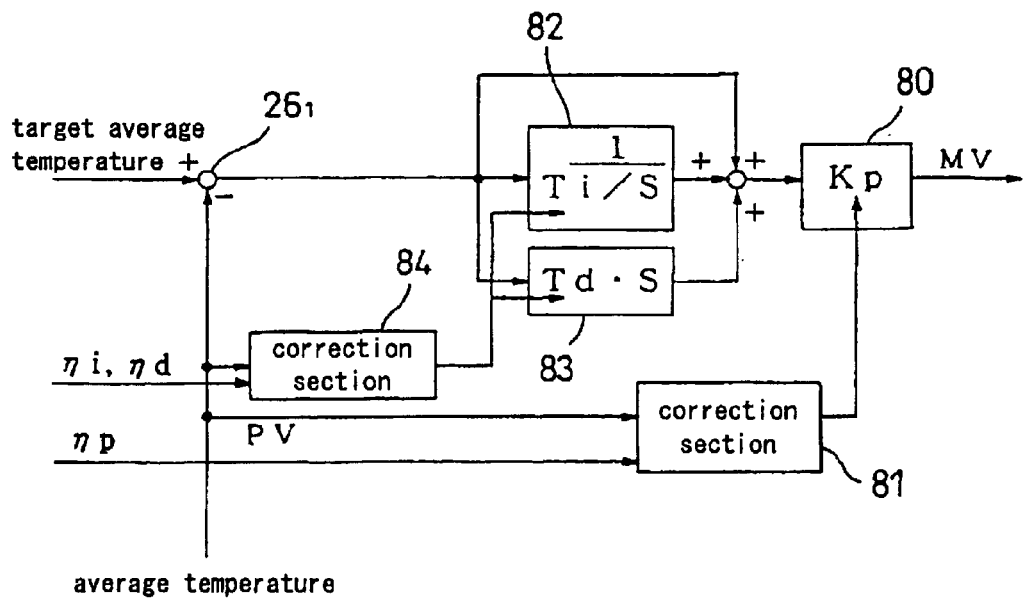
FIG. 40 is a block diagram of the PID control means of FIG. 39.

FIG. 40 is a block diagram showing the inside of the PID control means 6₁ shown in FIG. 39.

In the present embodiment, the proportion gain Kp of the proportion element 80 is corrected by the correcting means 81, based on the average temperature obtained from the mode converter 5 so as to compensate a gain change due to changes in the resistance value of the heater caused by a temperature change. On the other hand, the integral time Ti of the integral element 82 and the differential time Td of the differential element 83 are corrected by the correcting means 84 so as to compensate changes in the time constant due to a temperature change.

Figure 41:
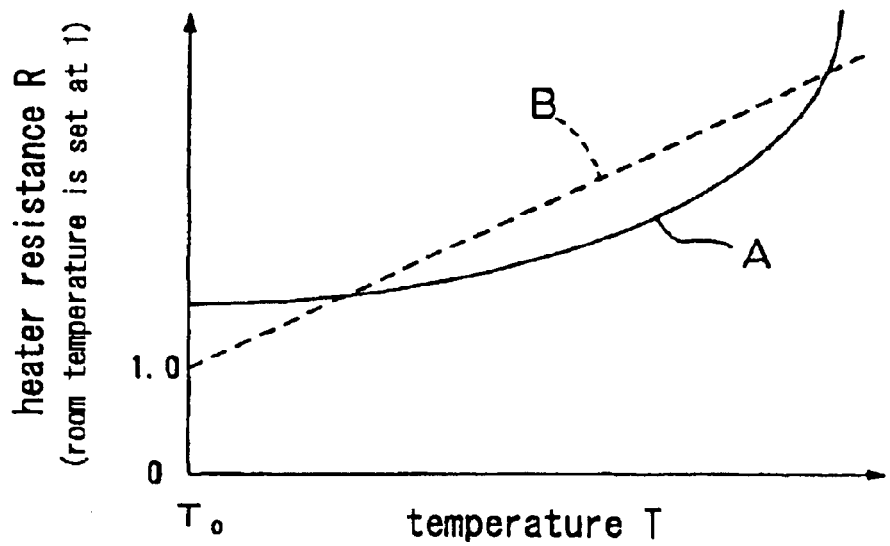
FIG. 41 is a plot showing the relation between temperature and heater resistance value.

The correction by the correcting means 81, 84 will be described in detail as follows. Since the heater changes its resistance value with temperature as indicated by the solid line A shown in FIG. 41, the gain of the control loop changes. For example, an equation of an approximate straight line indicated by the broken line B can be expressed as follows:

$R/R_0 = \eta p (T-T_0)+1.0$ wherein $R_0$ is a resistance value at the reference temperature $T_0$ like room temperature, and $\eta p$ is the coefficient of temperature.

Since the voltage V to be applied on the heater is constant, the current flowing into the heater changes with chances in the resistance value of the heater. Even if the heater is driven with the same pulse width, the electric power P changes as follows with temperature.

$$P/P_0 = (V^2/R)/(V^2/R_0)$$
$$= R_0/R$$
$$= 1/\{\eta p(T-T_0)+1.0\}$$

Thus the gain G of the control loop changes with temperature as follows:

$$G/G_0 = P/P_0$$
$$= 1/\{\eta p(T-T_0)+1.0\},$$

wherein $P_0$ and $G_0$ indicate power and gain at the reference temperature $T_0$.

As apparent from the above equations, an increase in the resistance value R of the heater with increasing temperature causes the gain to decrease.

Therefore, in this embodiment, the correction value of the proportion gain Kp is calculated according to the following primary approximate expression based on the average temperature and the coefficient of temperature $\eta p$ set in advance, thereby correcting the proportion gain of the proportion element 80 by the correcting means 81.

$Kp=\{\eta p(PV-PV_0)+1\}Kp_0$ wherein $PV_0$ indicates reference temperature like room temperature, and $Kp_0$ indicates a proportion gain at the reference temperature.

Figure 42:
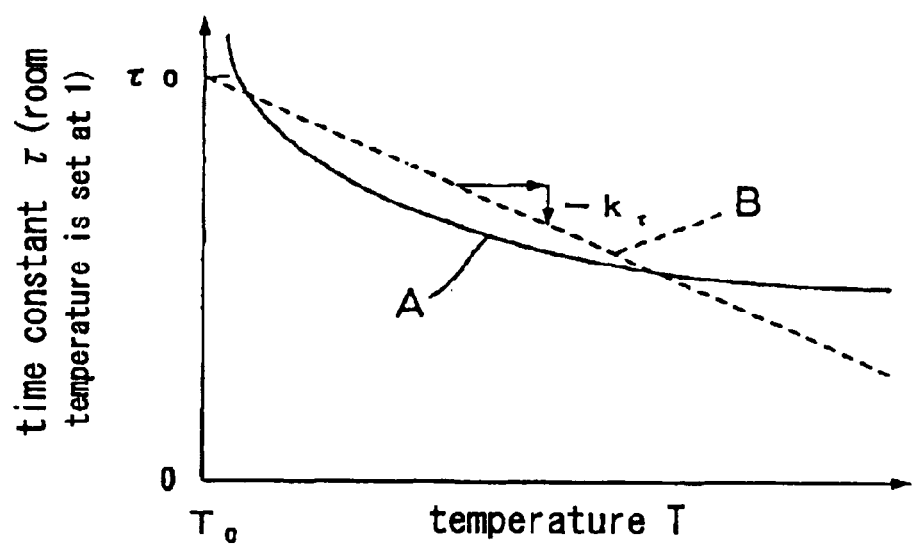
FIG. 42 is a plot showing the relation between temperature and time constant.

The time constant τ changes with temperature as indicated by the solid line in FIG. 42. With respect to the actual change indicated by the solid line A, the following expression of the approximate straight line indicated by the broken line B can be considered.

$\tau/\tau_0 = -k_\tau(T-T_0)+1.0$ wherein $\tau_0$ indicates a time constant at the reference temperature $T_0$, and $-k_\tau$ is a slant of the approximate expression.

In the same manner as the change in the time constant τ with respect to a temperature change is approximated by a straight line, the integral time Ti and the differential time Td of the PID parameter corresponding to the time constant τ can be approximated by a straight line as follows:

$Ti=\{\eta i(PV-PV_0)+1\}Ti_0$ $Td=\{\eta d(PV-PV_0)+1\} Td_0$ wherein $Ti_0$ and $Td_0$ indicate integral time and differential time at the reference temperature $T_0$, and $\eta i$ and $\eta d$ indicate the coefficients of temperature.

The coefficients of temperature ηi and ηd can be calculated by previously measuring a dead time by the step response.

Therefore, in the present embodiment, as shown in FIG. 40, the correction values of the integral time Ti and the differential time Td are calculated by the correcting means 84 according to the primary approximate expression, thereby correcting the integral time Ti and the differential time Td of the integral element 82 and the differential element 83, respectively, based on the average temperature obtained from the detection temperatures of the temperature sensors and the coefficients of temperature ηi and ηd previously set.

Since the proportion gain Kp, the integral time Ti, and the differential time Td are corrected in accordance with the average temperature based on the detection temperatures as described above, changes in the gain due to temperature are compensated and changes in the time constant τ due to temperature are also compensated. As a result, unlike in the conventional example, it becomes possible to control the occurrence of hunting or an overshoot without modifying the setting of the PID parameters according to the temperature to be controlled.

In this embodiment, the proportion gain Kp, the integral time Ti, and the differential time Td are corrected in accordance with the average temperature based on the detection temperatures as described above; however, as further another embodiment of the present invention, the target average temperature can be used for the correction.

Since the target average temperature is usually equal to the average temperature based on the detection temperature except for a transient condition, the use of the target average temperature which is a fixed value can greatly reduce the burden of process, as compared with the case where the average temperature changing every moment is used.

In this embodiment, the proportion gain Kp, the integral time Ti, and the differential time Td are all corrected; however, as further another embodiment of the present invention, at least one of the proportion gain Kp, the integral time Ti, and the differential time Td can be corrected.

FIG. 40 depicts the PID control means $6_1$ for controlling the average temperature; the PID control means $6_2$ to $6n$ for controlling the gradient temperatures also correct the proportion gain Kp, the integral time Ti, and the differential time Td based on the average temperatures obtained from the mode converter 5.

The aforementioned embodiments perform a primary straight line approximation; however, the present invention can use secondary or higher approximate expressions. The following is an example of the secondary approximate expression about the time constant τ.

$$\tau/\tau_0 = Ka(T-T_0)^2 + kb(T-T_0) + kc$$

The three parameters (ka, kb, kc) are found as follows. Assuming that $\tau/\tau_0$ with respect to the temperature values $(T_1, T_2, T_3)$ of three points of data in the characteristics curve of the approximating original control target are $(\tau_1/\tau_0, \tau_2/\tau_0, \tau_3/\tau_0)$, the following three equations are obtained.

$$\tau_1/\tau_0 = Ka(T_1-T_0)^2 + kb(T_1-T_0) + kc$$

$$\tau_2/\tau_0 = Ka(T_2-T_0)^2 + kb(T_2-T_0) + kc$$

$$\tau_3/\tau_0 = Ka(T_3-T_0)^2 + kb(T_3-T_0) + kc$$

From these three equations, the three variables are found mathematically, and consequently, the three parameters (ka, kb, kc) are determined.

An n-th degree approximate expression can be found from the data of changes in the time constant $\tau/\tau_0$ with respect to the temperatures in n+1 points.

With a plural number of degrees, the obtained approximate expression can agree with the change curve of the control target, which brings about the effect of realizing correction with higher precision.

Figure 43:
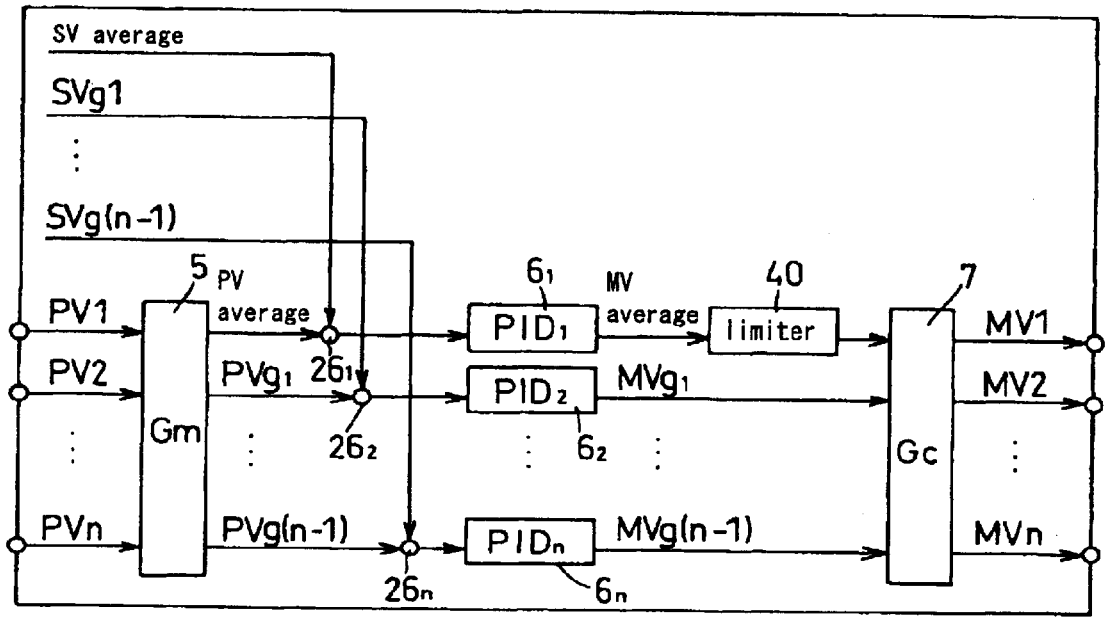
FIG. 43 is a block diagram of further another embodiment.

FIG. 43 is a block diagram of the temperature regulator of further another embodiment of the present invention, where the components corresponding to those in FIG. 3 are referred to with the same reference symbols. In FIG. 43, the adders $26_1$ to $26_n$ for outputting the control deviation between the target average temperature SV or the target gradient temperatures SVg1 to SVg(n−1) and the average temperature PV or the gradient temperatures PVg1 to PVg(n−1) calculated by the average temperature/gradient temperature calculating means (mode converter) 5 are shown outside the PID control means $6_1$ to $6_n$.

In this embodiment, the limiter 40 is provided as a limiting means for limiting the amount of operation (operation signal) from the PID control means $6_1$ for controlling the average temperature. By doing so, the performance to control unification of temperature (gradient temperature=0) can be improved, when disturbance large enough to saturate the amount of operation is applied as the whole device, for example, when the wafer mounted on the heat-treated plate controlling the temperature absorbs the heat of the heat-treated plate, thereby dropping its temperature suddenly.

The reason for this will be detailed as follows. When a wafer is mounted on a heat-treated plate, which controls temperature at a constant level, the wafer absorbs the heat of the heat-treated plate. Such a mounting of the wafer is regarded as disturbance, and when the amount of operation is saturated at the time of disturbance response, the average temperature control and the gradient temperature control are traded off.

Figure 44:
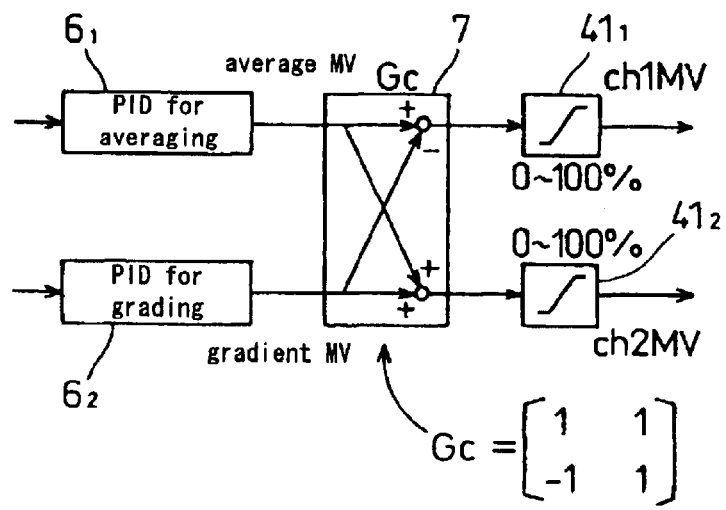
FIG. 44 is a block diagram for explaining the amount of operation.

For the preparation of explanation, as a two input-output system, a pair of amounts of operation MV will be described with reference to FIG. 44. The signal outputted from the average PID controller $6_1$ is the average MV, and the signal outputted from the gradient PID controller $6_2$ is the gradient MV. The average MV and the gradient MV pass through the predistorter (distribution means) 7, the saturation limiters $41_1$ and $41_2$, and become ch1MV and ch2MV, respectively. The predistorter 7 is composed of 1 and −1 for simplification as shown in FIG. 44. Consequently, ch1MV=average MV-gradient MV and ch2MV=average MV-gradient MV are obtained. Each MV is limited between 0% and 100% for each channel because an output of 0% or below and 100% or over is impossible.

Figure 45:
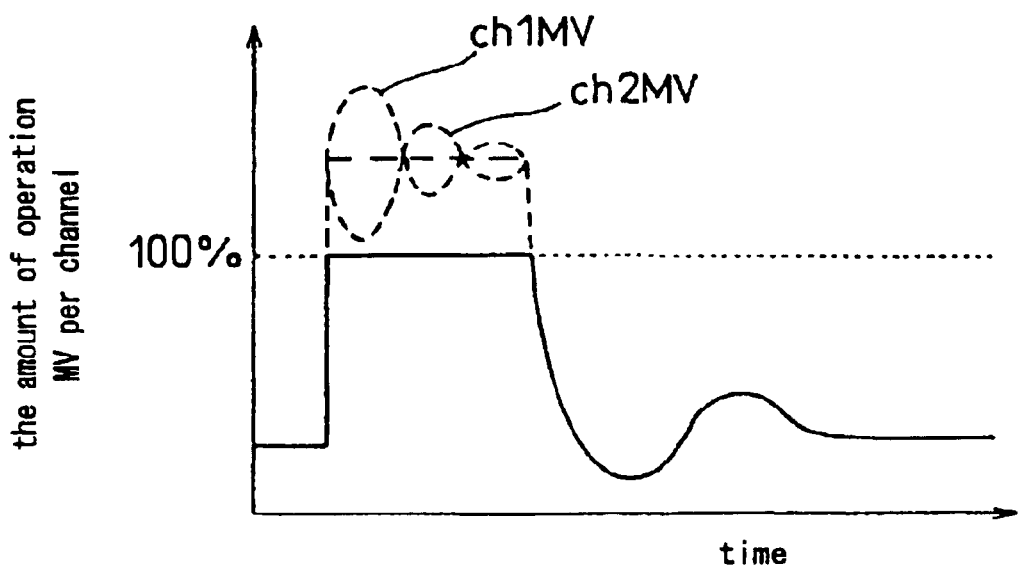
FIG. 45 is a plot showing changes in the amount of operation when gradient temperature control does not work.

As shown in FIG. 45, the cause of the trade-off is that when the average MV is already saturated to 100%, even if the gradient MV outputs a value for making the temperature difference zero, it is buried in the saturation of the MV for each channel, without functioning.

Figure 46:
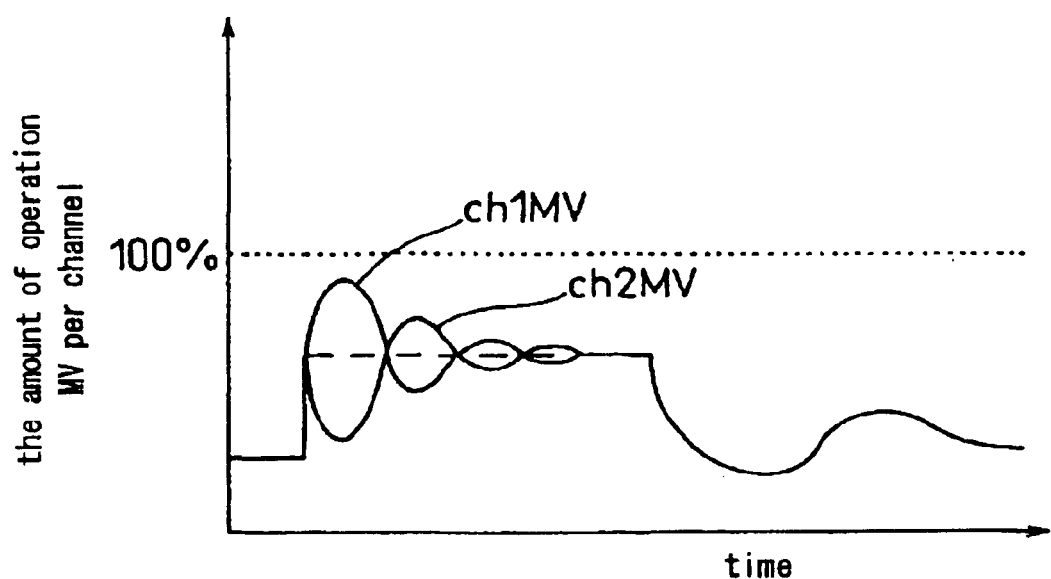
FIG. 46 is a plot showing changes in the amount of operation when gradient temperature control works.

In contrast, when it is desired that the gradient MV make the temperature difference as the amount of control zero, as shown in FIG. 46 the limit value of the average MV can be used to prevent the MV for each channel from saturating at the average MV. By doing so, the value of the gradient MV is reflected on the MV for each channel, and the temperature difference is quickly converted to zero. In short, uniformizing control works well. Instead, the MV for each channel becomes smaller than 100%, which prolongs the converting time of the mean temperatures. This is called a trade-off.

Therefore, in this embodiment, as shown in FIG. 43, the limiter 40 controls an upper limit of the amount of operation in the average temperature control. Therefore, when there is so large disturbance as saturate the amount of operation from the PID control means $6_1$ to $6_{n-1}$, the gradient temperature control appears without hiding in the saturation of the amount of operation for each channel, realizing a uniform operation.

Figure 47:
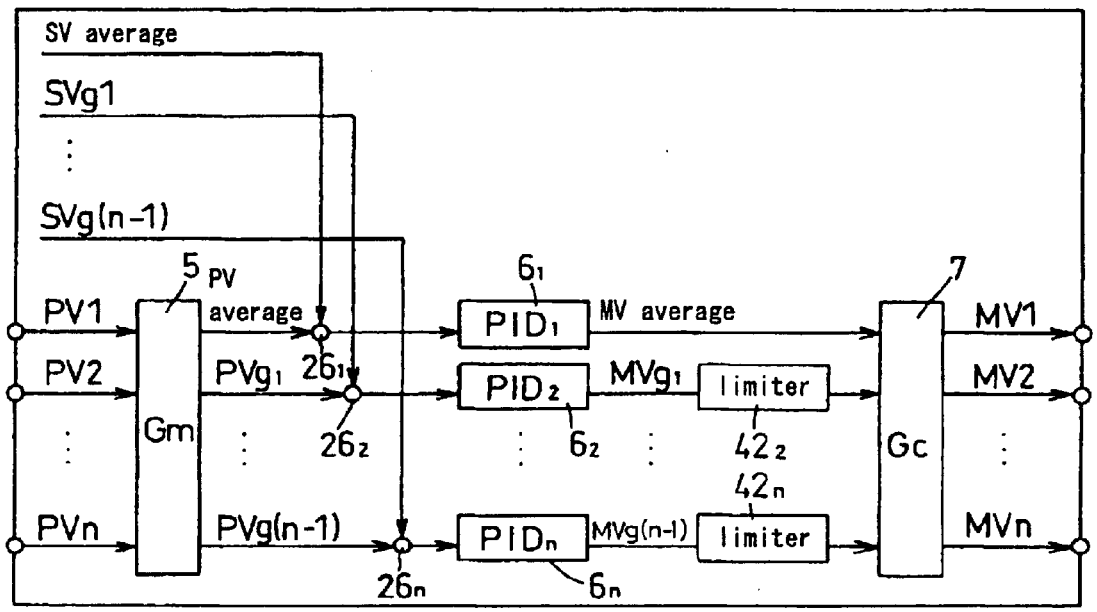
FIG. 47 is a block diagram of further another embodiment.

FIG. 47 is a block diagram showing another embodiment of the present invention, where the components corresponding to those in the aforementioned embodiments are referred to with the same reference symbols.

In this embodiment, limiters $42_2$ to $42_n$ are provided to limit the amount of operation not of the average temperature control but of the gradient temperature control.

In this embodiment, when partially unbalanced disturbance is applied, for example, when a low-temperature object gets in contact with part of the heat-treated plate, if a higher priority is given to the gradient temperature control, then the disturbance becomes more influential, thereby suppressing the amount of operation of the gradient temperature control and quickening the conversion of the average temperature.

Figure 48:
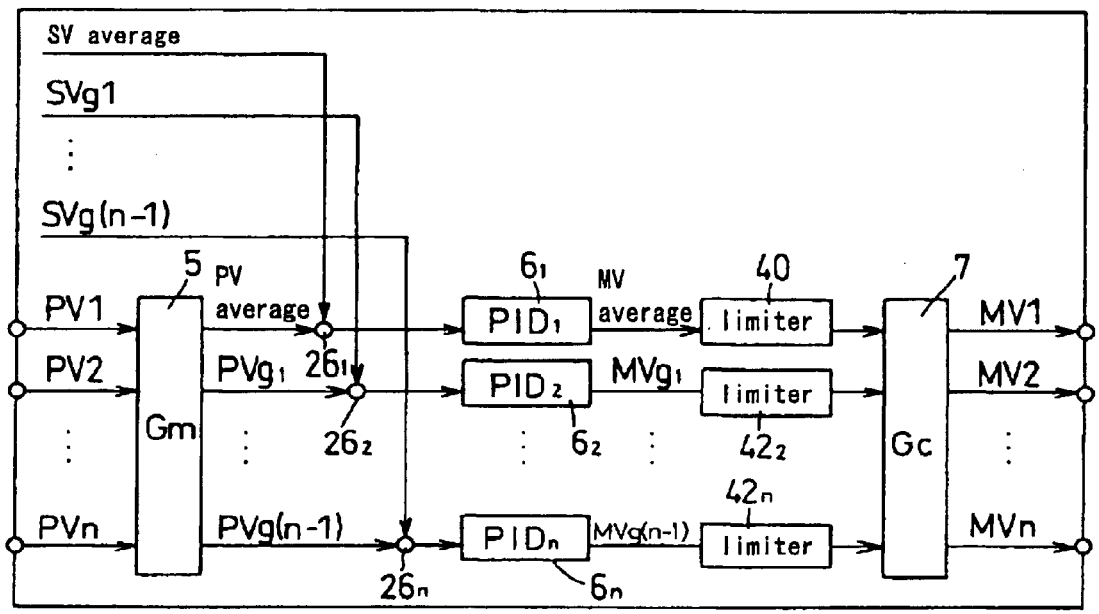
FIG. 48 is a block diagram of further another embodiment.

As further another embodiment of the present invention, as shown in FIG. 48, it is possible to provide limiters $40, 42_2$ to $42_n$ for limiting the amount of operation in both the average temperature control and the gradient temperature control.

In the aforementioned embodiments, the limiters are used to set the upper limit of the amount of operation; however, as further another embodiment of the present invention, a lower limit or both the upper and lower limits may be restricted.

Further another embodiment, it is possible to make the limit values of the limiters be variable.

Figure 49:
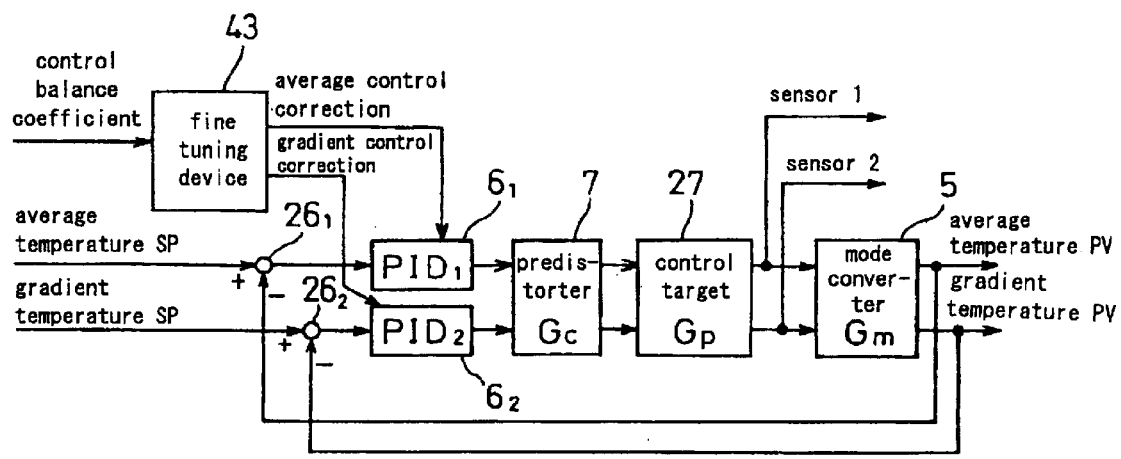
FIG. 49 is a block diagram of further another embodiment.

FIG. 49 is a block diagram of the temperature regulator of another embodiment of the present invention, where the components corresponding to those in FIG. 4 are referred to with the same reference symbols.

This embodiment has a fine tuning device 43 for fine tuning a balance between the average temperature control and the gradient temperature control, and the user sets the coefficient of control balance to the fine tuning device 43 by communications or other methods. As a result, the fine tuning device 43 outputs an average temperature control correction value and a gradient temperature control correction value according to the coefficient of control balance, and modifies the parameters of the PID control means $6_1, 6_2$ with the correction values. The parameters to be modified can be a limit value of the later-described limiter for limiting the control parameter or the amount of operation of PID.

The coefficient of control balance sets the gradient temperature control strong and fast, whereas the average temperature control weak and slow, or the gradient temperature control weak and slow, whereas the average temperature control strong and fast. Since the optimum conditions of the intensity change according to the use or the characteristics of the control target, the user modifies the coefficient of control balance according to the change, thereby performing fine tuning of the control requirements in accordance with the use or the characteristics of the control target.

As an example of tuning for strong control, the proportion gain or the limit value is increased. As an example of tuning for weak control, the proportion gain or the limit value is decreased. As an example of tuning for fast control, an integrated time constant or a differential time constant is decreased, whereas an example of tuning for late control, an integrated time constant or a differential time constant is increased.

Thus, in this embodiment, the user sets the coefficient of control balance according to the use or the characteristics of the control target, and the corresponding PID control parameters are calculated by the fine tuning device 43, thereby modifying the corresponding control parameters of the PID control means $6_1, 6_2$. Therefore, calculation process by the fine tuning device 43 is determined by the parameters and the coefficient of control balance to be modified.

FIG. 49 describes the case of n=2; however, the case of n=3 or larger can be dealt as well. The modification of the parameters using the coefficient of control balance can be carried out for at least one of the plural PID control means.

Figure 50:
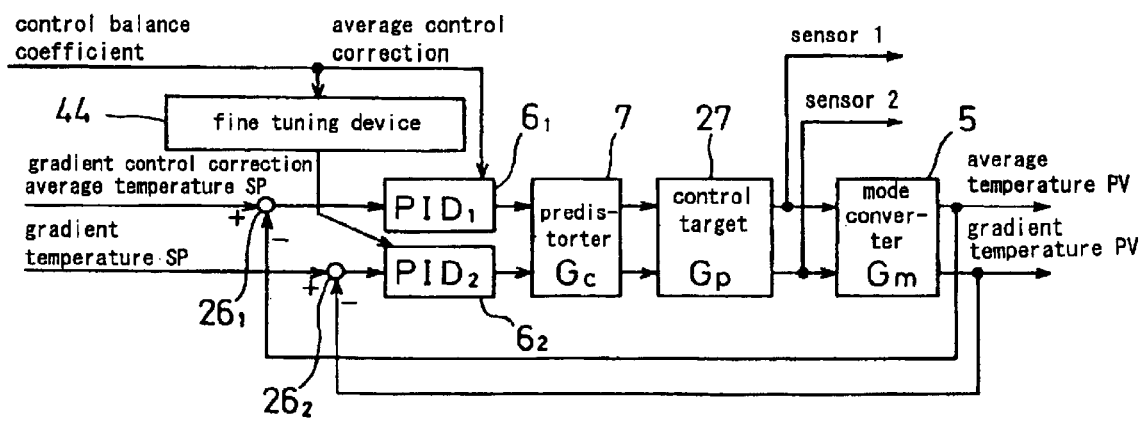
FIG. 50 is a block diagram of further another embodiment.

As another embodiment of the present invention, as shown in FIG. 50, the coefficient of control balance is made equal to the average temperature control correction value, according to which the fine tuning device 44 determines the gradient temperature control correction value. Thus, the parameters of the gradient temperature control are modified based on the parameters of the average temperature control. On the other hand, the parameters of the average temperature control may be modified based on the parameters of the gradient temperature control.

The gradient temperature control and the average temperature control may become requirements of a trade-off as will be described later. For example, it is optimum that when one parameter of the gradient temperature control is intensified, the parameters of the average temperature control are weakened, or the parameters of the average temperature control are weakened to improve the characteristics of the gradient temperature control.

As described hereinbefore, when auto tuning by the fine tuning devices 43, 44 are insufficient, even a user ignorant of the principal can make the requirements of the PID control means closer to the optimum conditions by determining which of the gradient temperature control and the average temperature control should be given a higher priority, thereby making the device extremely user-friendly.

The following is a description of the trade-off of the PID parameters.

The average amount of operation and the gradient amount of operation are multiplied by a coefficient in the predistorter, and then added to each other to become the amount of operation for each channel, thereby transmitting to the control target. However, the amount of operation at that moment is limited between 0% and 100%. In some cases, a narrower range is set.

As a whole, the amount of operation has a range of 100%. There is no problem unless a large amount of operation is outputted from the average side or the gradient side. However, when a large amount of operation is outputted from both sides, it becomes impossible to fill all due to the limit of 100%. This is how a trade-off occurs.

A means for tuning a tradeoff is to balance the PID parameters. For example, when the gradient has a larger proportion gain than the average, the gradient has a larger amount of operation than the average. Therefore, when the amounts of operation of the gradient and the average are combined and saturated in the predistorter, the gradient is given a higher priority during the control.

Consequently, which of the gradient control and the average control should have a higher priority is determined using the coefficient of balance, thereby realizing the tuning or design of desired performance.

Figure 51:
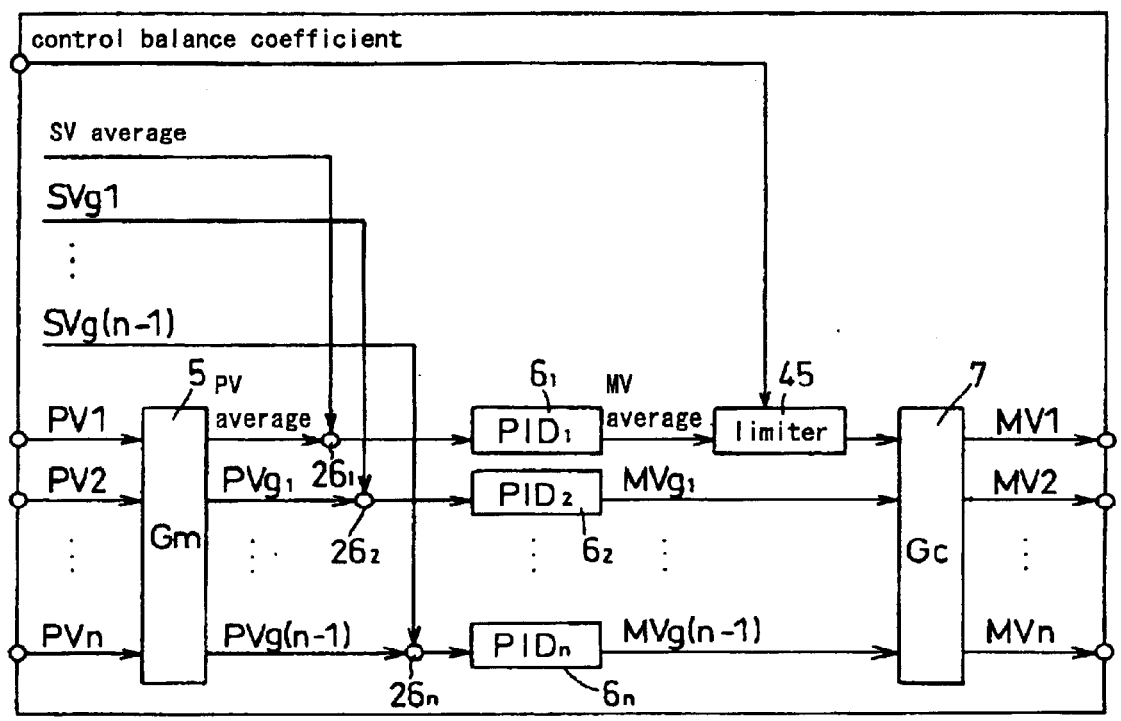
FIG. 51 is a block diagram of further another embodiment.

FIG. 51 is a block diagram of the temperature regulator showing a further specific embodiment of the present invention, and is basically identical with the diagram shown in FIG. 43.

In the embodiments shown in FIGS. 49 and 50, the PID control parameters are tuned according to the coefficient of control balance; in the present embodiment, the upper limit of the limiter 45 for limiting the amount of operation of the PID control means $6_1$ of the average temperature control is changed by the coefficient of control balance.

In this embodiment, as shown in FIG. 51, the limiter 45 limits the amount of operation of the average temperature control. Therefore, when there is disturbance large enough to saturate the amount of operation from the PID control means $6_1$ to $6_n$, the gradient temperature control appears without hiding in the saturation of the amount of operation for each channel, thereby realizing uniform operation.

In this case, increasing the upper limit value of the amount of operation of the average temperature control in the limiter 45 by the setting of the coefficient of control balance performs a control based on average control priority (quick response priority) whereas decreasing the upper limit value restricts the average and performs a control based on gradient control priority (uniformity priority).

Figure 52:
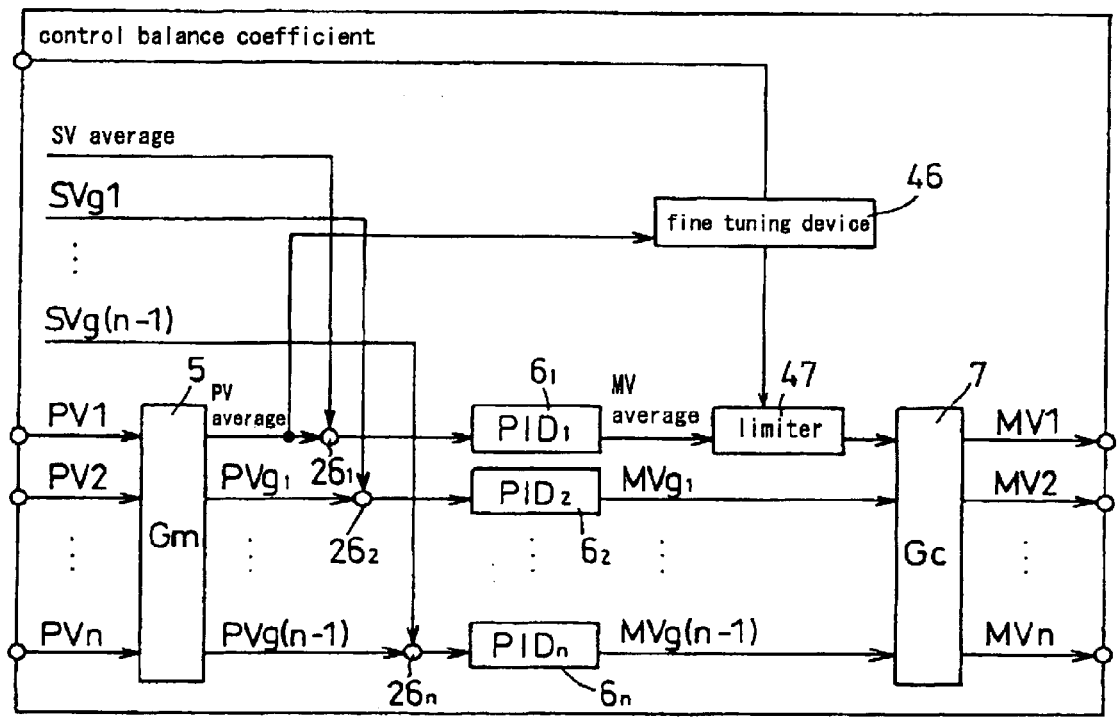
FIG. 52 is a block diagram of further another embodiment.

FIG. 52 is a block diagram of another embodiment of the present invention where the components corresponding to those in the aforementioned embodiments are referred to with the same reference symbols.

In this embodiment, the fine tuning device 46 calculates the upper limit of the amount of operation in the average temperature control, based on the coefficient of control balance and the detected average temperature.

This embodiment is effective when the temperature is high and the upper limit is desired to increase. At high temperature, more amount of heat is lost by heat treatment. For example, when a wafer is mounted on a high-temperature heat-treated plate, more amount of heat is absorbed in the wafer. In other words, disturbance becomes larger and the average temperature becomes likely to saturate. When the amount of operation in the average temperature control is small due to saturation, it takes time to resume the average temperature. In order to avoid this, the upper limit of the amount of operation in the average temperature control is desired to increase at high temperature, and this embodiment is effective in such a case. To be more specific, the fine tuning device 46 so operates as to increase the upper limit of the limiter 47 at high temperature, based on the coefficient of control balance and the average temperature (PV average) from the average temperature/gradient temperature control means (mode converter) 5.

For example, (PV average-room temperature)×the coefficient of control balance+limit value is made a new limit value, and the limit value is set to become 100% at room temperature, and the coefficient of control balance indicates (average control priority) at the plus side, and indicates uniformity priority (gradient control priority) at the minus side.

Figure 53:
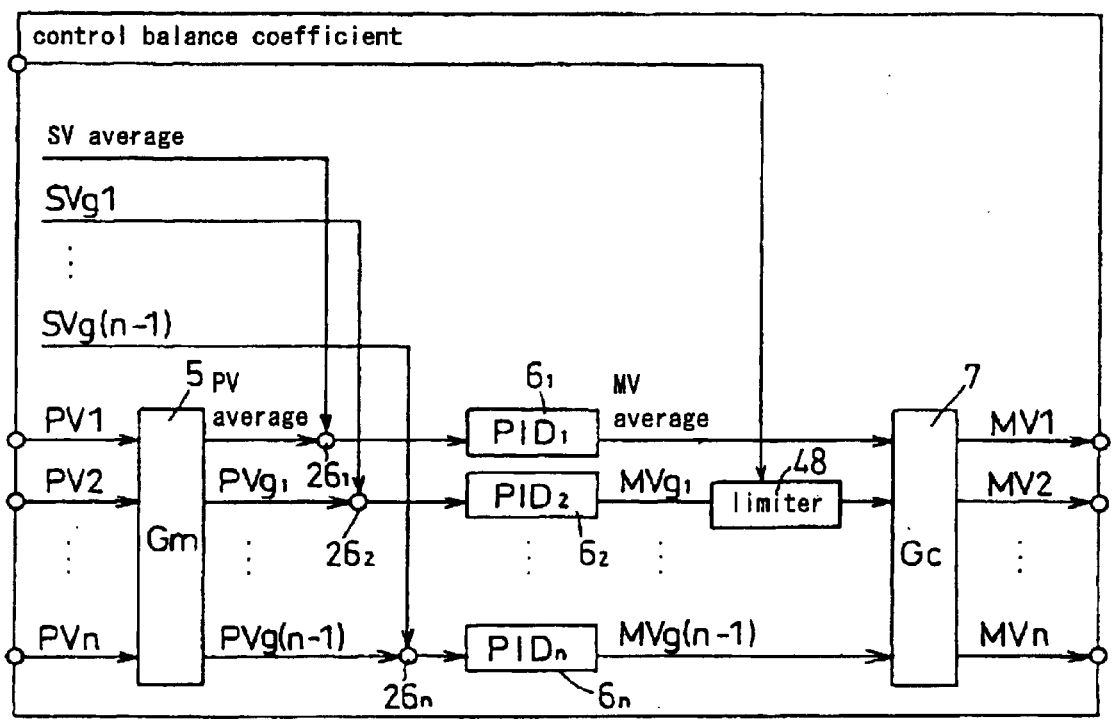
FIG. 53 is a block diagram of further another embodiment.

As further another embodiment of the present invention, as shown in FIG. 53, it is possible to limit the upper limit value of at least one limiter 48 for limiting the amount of control in the gradient temperature control using the coefficient of control balance, thereby limiting the gradient temperature control and giving a higher priority to the average temperature control.

It is also possible to change the limit values of both the limiter in the average temperature control and the limiter in the gradient temperature control, or to change the parameters of the PID control as well.

As further another embodiment of the present invention, it is possible to switch the coefficient of control balance automatically. For example, the coefficient of control balance is switched when the wafer is mounted on the heat-treated plate.

It goes without saying that the present invention can be applied not only to uniformizing control where the gradient temperature is zero but also to the control with temperature gradation where the gradient temperature has a certain value.

Figure 54:
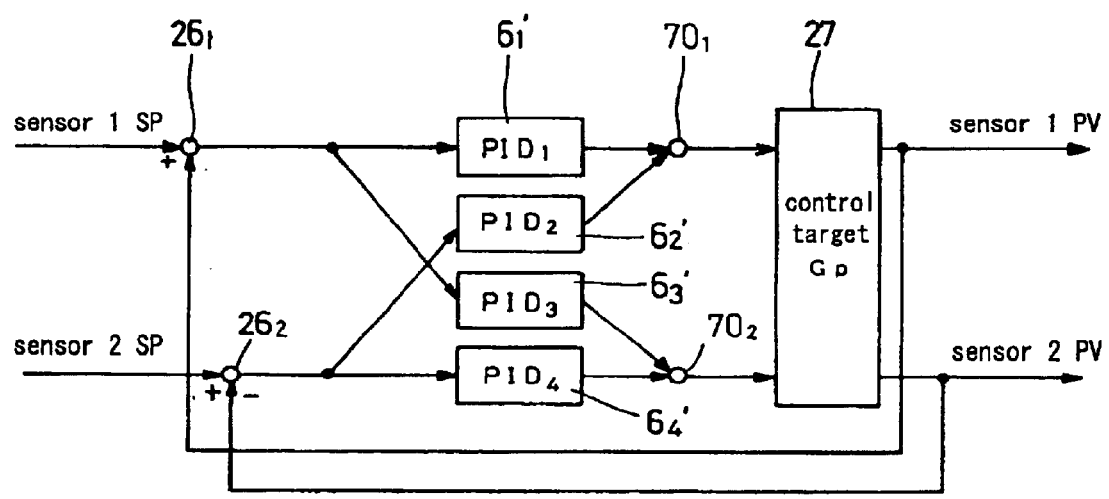
FIG. 54 is a block diagram of further another embodiment.

FIG. 54 is a structural diagram of the temperature control system having the temperature regulator of another embodiment of the present invention. The temperature regulator of the present embodiment has the same functions as the temperature regulator shown in FIG. 38, and performs interference-reducing control based on the average temperature and the gradient temperature.

In other words, the temperature regulator of the present embodiment is formed by replacing the mode converter 5″, the first and second PID control means $6_1$, $6_2$, and the predistorter (distribution means) 7 shown in FIG. 38 by the adders $70_1$, $70_2$, and the first to fourth PID control means $6_1'$ to $6_4'$.

The processes in the mode converter 5″, the first and second PID control means $6_1$, $6_2$, and the predistorter (distribution means) 7 in FIG. 38 can be expressed in Gc×$G_{PID}$×Gm using the mode conversion matrix Gm corresponding to the mode converter 5″, the matrix $G_{PID}$ corresponding to the first and second PID control means $6_1$, $6_2$, and the predistortion matrix Gc corresponding to the predistorter 7. This expression can be expressed as follows by being replaced by the adders $70_1$, $70_2$ and the first to fourth PID control means $6_1'$ to $6_4'$ shown in FIG. 54.

[Numerical Formula 21]

$$PID_1 \sim PID_4 = \begin{pmatrix} PID_1 & PID_2 \\ PID_3 & PID_4 \end{pmatrix}$$

$$= G_c \times G_{PID} \times G_m$$

$$= G_c \times \begin{pmatrix} k_{P1}\left(1 + \frac{1}{T_{11}} + T_{D1}\right) & 0 \\ 0 & k_{P2}\left(1 + \frac{1}{T_{12}} + T_{D2}\right) \end{pmatrix} \times G_m$$

The mode conversion matrix Gm and the predistortion matrix Gc can be found as described above, and the PID parameters of the first and second PID control means $6_1$, $6_2$ shown in FIG. 38 can be found by auto tuning. Therefore, solving the above matrix equations can find each PID parameter of the first to fourth PID control means $6_1'$ to $6_4'$, making it possible to achieve the mode converter 5″, the first and second PID control means $6_1$, $6_2$, and the predistorter (distribution means) 7 of the temperature regulator in FIG. 38 using the adders $40_1$, $40_2$ and the first to fourth PID control means $6_1'$ to $6_4'$ so as to realize a control based on the average temperature and the gradient temperature and to reduce interference.

In the structure shown in FIG. 54, the reason why the gradient temperature control shown in FIG. 38 can be achieved will be described in detail.

Figure 55:
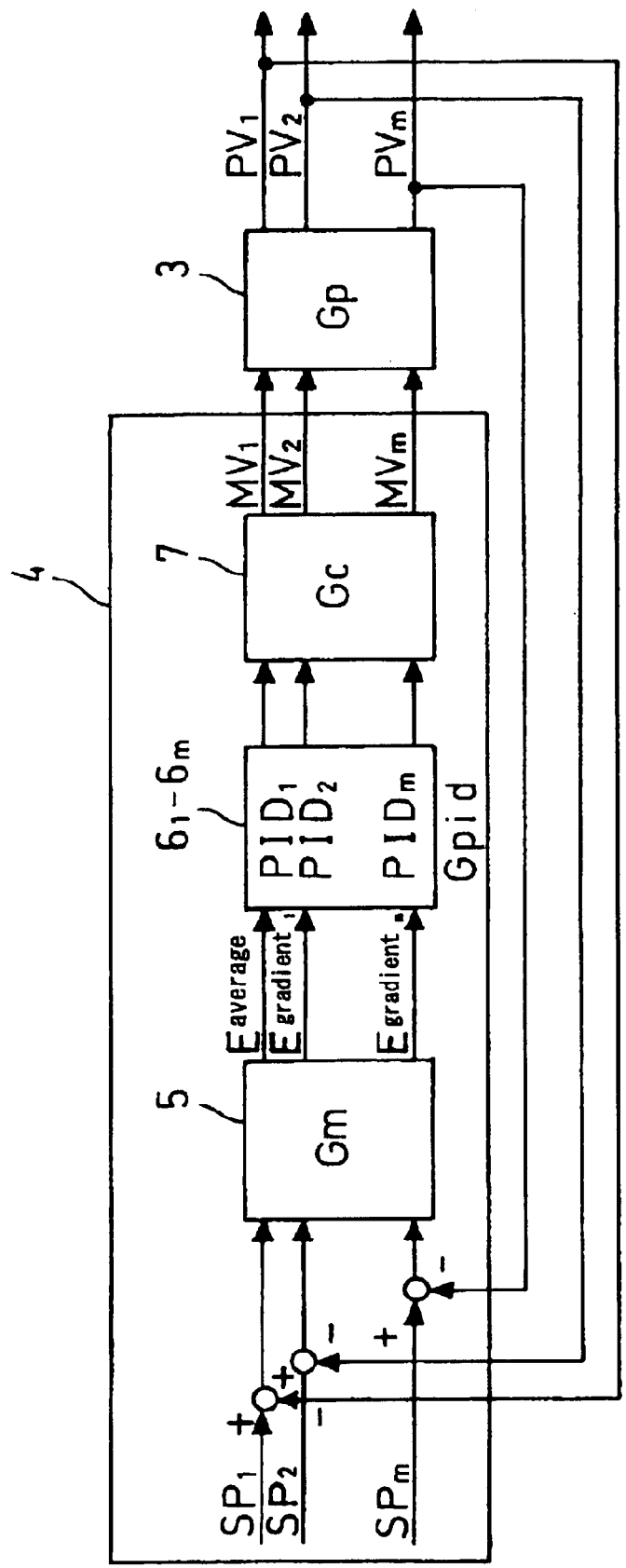
FIG. 55 is a block diagram of gradient temperature control.

FIG. 55 is a block diagram of the gradient temperature control corresponding to the one shown in FIG. 38; the temperature regulator 4 is composed of the mode converter 5, the PID controllers $6_1$ to $6m$ and the predistorter 7. This temperature regulator Gtc can be expressed as follows using the predistorter Gc, the PID controller Gpid, and the mode converter Gm:

Gtc=GcGpidGm

For simplification, Gc, Gpid, and Gm are made a matrix of 2×2 wherein m=2. Gpid is an only diagonal matrix.

[Numerical Formula 22]

$$G_c = \begin{pmatrix} G_{Cn} & G_{C12} \\ G_{C21} & G_{C22} \end{pmatrix}$$

$$Gpid = \begin{pmatrix} G_{Pid_1} & 0 \\ 0 & G_{Pid_1} \end{pmatrix}$$

$$Gm = \begin{pmatrix} G_{m_{11}} & G_{m_{12}} \\ G_{m_{21}} & G_{m_{22}} \end{pmatrix}$$

It should be noted that Gpid has a frequency characteristic where a gain changes with frequency due to differentiation and integration, whereas Gc and Gm are coefficients having no frequency characteristics.

The above equations can be substituted into the equation of the temperature regulator Gtc as follows:

[Numerical Formula 23]

$$Gtc = \begin{pmatrix} G_{tc_{11}} & G_{tc_{12}} \\ G_{tc_{21}} & G_{tc_{22}} \end{pmatrix}$$

$Gtc_{11} = Gc_{11}Gpid_1Gm_{11} + Gc_{12}Gpid_2Gm_{21}$ $Gtc_{12} = Gc_{11}Gpid_1Gm_{12} + Gc_{12}Gpid_2Gm_{22}$ $Gtc_{21} = Gc_{21}Gpid_1Gm_{11} + Gc_{22}Gpid_2Gm_{21}$ $Gtc_{22} = Gc_{21}Gpid_1Gm_{12} + Gc_{22}Gpid_2Gm_{22}$ The equation of a component $Gtc_{11}$ is focused attention thereon and turns out to be a combination of two PID controllers. The ratio for the synthesis is determined by Gt and Gm. The other components are also composed of two PID controllers.

$$Gtc_{11} = Gc_{11}Gm_{11}Gpid_1 + Gc_{12}Gm_{21}Gpid_2$$
$$= K1Gpid_1 + K2Gpid_2 \text{ wherein}$$

k1 to k4 are constants not related to frequency and have the following values:

$k1 = Gc_{11}Gm_{11}$ $k2 = Gc_{12}Gm_{21}$

When two PID controllers are added at a certain ratio, the results become PID controllers in the following manner:

The frequency characteristics (hereinafter referred to as transmission function) of the PID controller Gpid(s) can be expressed using "s" of Laplace Transform as follows:

Gpid(s)=Kp(1+1/(Ti·s)+Td·s) wherein Kp, Ti, and Td represent proportional gain, integral time, and differential time, respectively. Although inexact differential or preceding differential are included in actual equations, they are omitted in the following equations for simplification.

One transmission function $Gtc_{11}(s)$ in the PID controller matrix shown in FIG. 56 corresponding to FIG. 54 will become as follows.

$$Gtc_{11}(s) = k1Gpid_1 + k2Gpid_2$$
$$= k1Kp_1(1 + 1/(Ti_1 \cdot s) + Td_1 \cdot s) + k2Kp_2(1 + 1/(Ti_2 \cdot s + Td_2 \cdot s)$$
$$= (k1Kp_1 + k2Kp_2) + (k1Kp_1Ti_2 + k2Kp_2Ti_1)/(Ti_1Ti_2) \cdot (1/s) +$$
$$(k1Kp_1Td_1 + k2Kp_2Td_2) \cdot s$$
$$= Kpn_{11}(1 + 1/(Tin_{11} \cdot s) + (Tdn_{11} \cdot s) \text{ wherein}$$

$Kpn_{11} = k1Kp_1 + k2Kp_2$ $Tin_{11} = Kpn_{11}(Ti_1Ti_2)/(k1Kp_1Ti_2 + k2Kp_2Ti_1)$ $Tdn_{11} = (k1Kp_1Td_1 + k2Kp_2Td_2)/Kpn_{11}$

Figure 56:
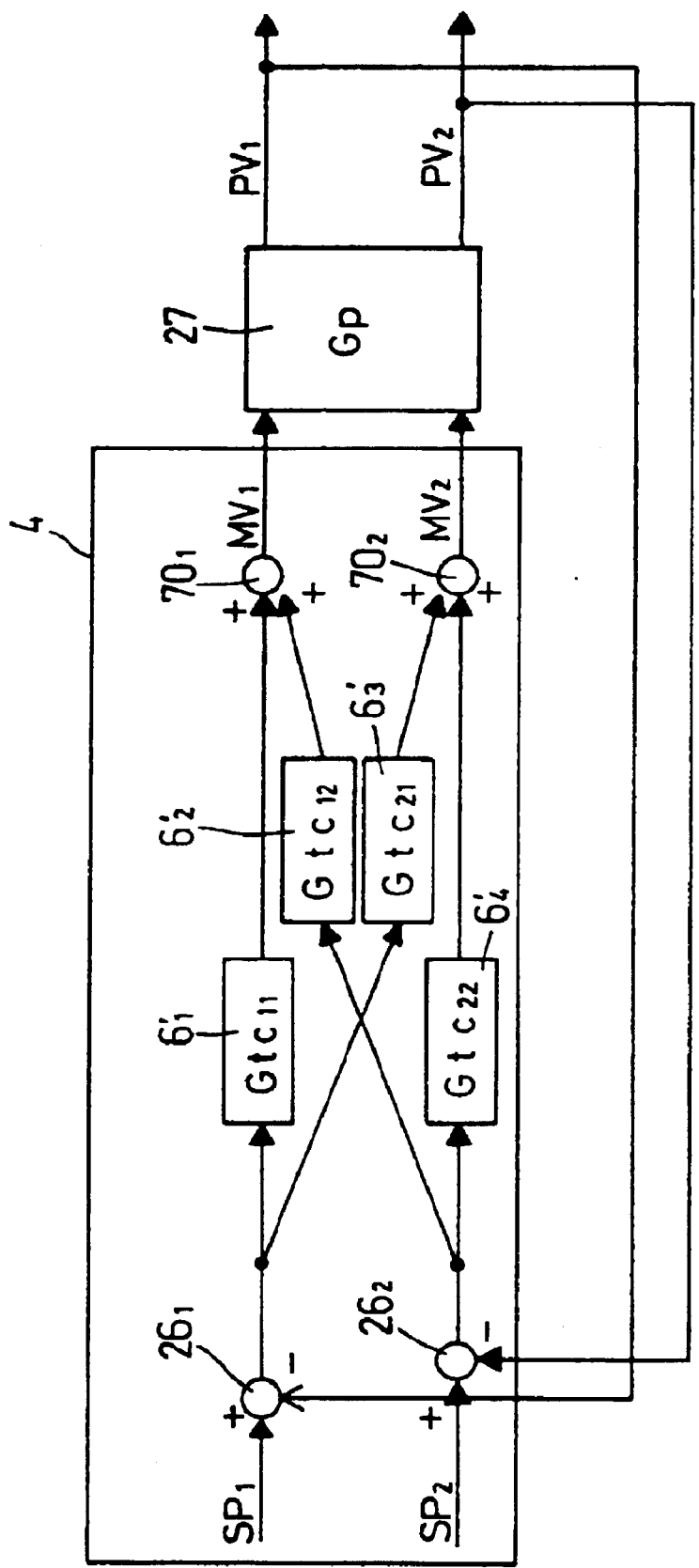
FIG. 56 is a block diagram corresponding to FIG. 54.

Therefore, the PID parameters in the temperature regulator of FIG. 56 can be obtained from this equation. In other words, the PID parameters in the gradient temperature control of FIG. 38 can be converted into the PID in the gradient temperature control shown in FIG. 54 using the above equation.

As described hereinbefore, combining four PID controllers by multiplying a certain ratio results in PID controllers. The equations to find the PID parameters are also shown above.

According to these equations, the same effects as the gradient temperature control can be exerted by a combination of PID controllers.

Although Gc and Gm are shown in fixed frequency characteristics in this case, it is possible to obtain the same effects from the same equations about Gc and Gm in a transmission function having non-fixed frequency characteristics. In this case, "s" which is the PID controller is not second-order but third-order or higher and complex; however, higher control can be achieved.

The relation between the PID controllers in FIG. 38 and the PID controllers in FIG. 54 is concluded as follows.

The entire PID controllers Gtc(s) of FIG. 54 are as follows.

[Numerical Formula 24]

$$Gtc(s) = \begin{pmatrix} G_{tc_{11}(s)} & G_{tc_{12}(s)} \\ G_{tc_{21}(s)} & G_{tc_{22}(s)} \end{pmatrix}$$

$Gtc_{11}(s) = Kpn_{11}(1+1/(Tin_{11} \cdot s) + Tdn_{11} \cdot s)$ $Gtc_{12}(s) = Kpn_{12}(1+1/(Tin_{12} \cdot s) + Tdn_{12} \cdot s)$ $Gtc_{21}(s) = Kpn_{21}(1+1/(Tin_{21} \cdot s) + Tdn_{21} \cdot s)$ $Gtc_{22}(s) = Kpn_{22}(1+1/(Tin_{22} \cdot s) + Tdn_{22} \cdot s)$ FIG. 54 has the above four PID controllers.

$Kpn_{11} = k1Kp_1 + k2Kp_2$ $Tin_{11} = Kpn_{11}(Ti_1Ti_2)/(k1Kp_1Ti_2 + k2Kp_2Ti_1)$ $Tdn_{11} = (k1Kp_1Td_1 + k2Kp_2Td_2)/Kpn_{11}$ $Kpn_{12} = k3Kp_1 + k4KP_2$ $Tin_{12} = Kpn_{12}(Ti_1Ti_2)/(k3Kp_1Ti_2 + k4Kp_2Ti_1)$ $Tdn_{12} = (k3Kp_1Td_1 + k4Kp_2Td_2)/Kpn_{12}$ $Kpn_{21} = k5Kp_1 + k6Kp_2$ $Tin_{21} = Kpn_{21}(Ti_1Ti_2)/(k5Kp_1Ti_2 + k6Kp_2Ti_1)$ $Tdn_{21} = (k5Kp_1Td_1 + k6Kp_2Td_2)/Kpn_{21}$ $Kpn_{22} = k7Kp_1 + k8Kp_2$ $Tin_{22} = Kpn_{22}(Ti_1 Ti_2)/(k7 Kp_1 Ti_2 + k8 Kp_2 Ti_1)$ $Tdn_{22} = (k7 Kp_1 Td_1 + k8 Kp_2 Td_2)/Kpn_{22}$ $k1 = Gc_{11} = Gm_{11}$ $k2 = Gc_{12} = Gm_{21}$ $k3 = Gc_{11} = Gm_{12}$ $k4 = Gc_{12} = Gm_{22}$ $k5 = Gc_{21} = Gm_{11}$ $k6 = Gc_{22} = Gm_{21}$ $k7 = Gc_{21} = Gm_{12}$ $k8 = Gc_{22} = Gm_{22}$, wherein $Kp_1$: the proportion band of the original PID controller $6_1$ of FIG. 38

$Ti_1$: the integral time of the original PID controller $6_1$ of FIG. 38

$Td_1$: the differential time of the original PID controller $6_1$ of FIG. 38

$Kp_1$: the proportional band of the original PID controller $6_2$ of FIG. 38

$Ti_2$: the integral time of the original PID controller $6_2$ of FIG. 38

$Td_2$: the differential time of the original PID controller $6_2$ of FIG. 38

According to these equations, the same effects as the gradient temperature control can be achieved by a combination of the PID controllers.

Figure 57:
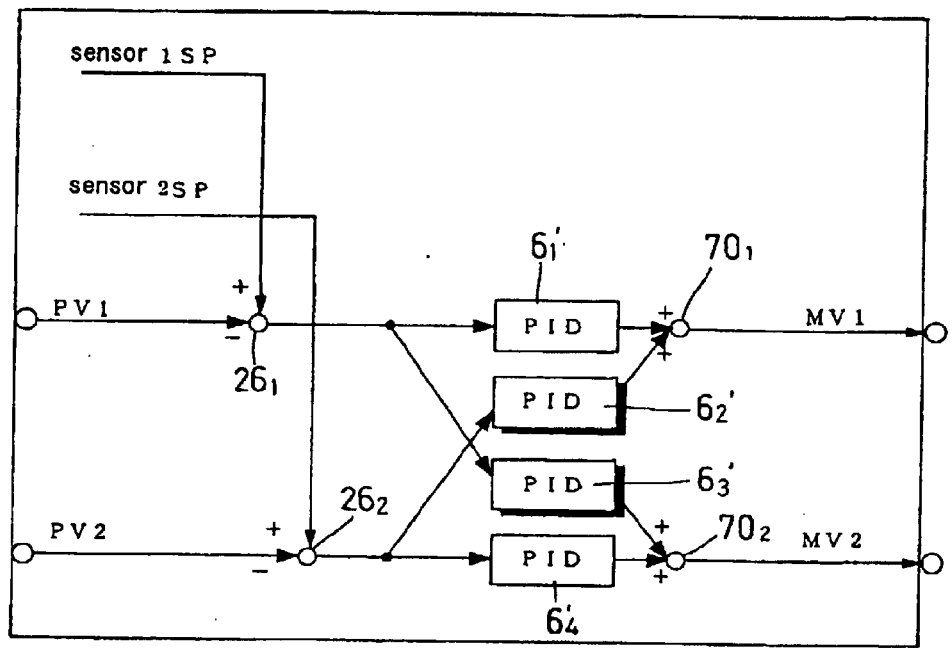
FIG. 57 is a block diagram of an embodiment.

Therefore, in the temperature regulator of the present invention shown in FIG. 57, the operator can calculate the PID parameters of the first to fourth PID control means $6_1'$ to $6_4'$ and set them, based on the above matrix equations.

According to the present embodiment, more PID control means are needed, but the mode converter 5" and the predistorter 7 become unnecessary.

In FIG. 57, the first and the fourth PID control means $6_1'$ and $6_4'$ are the same as the conventional PID control means corresponding to the channels through which operation signals are outputted to the first and second heaters, based on the temperature deviations corresponding to the detection temperatures PV1, PV2 of the first and second temperature sensors. In contrast, the second PID control means $6_2'$ outputs an operation signal to the first heater, based on the temperature deviation corresponding to the detection temperature PV2 of the second temperature sensor, and the third PID control means $6_3'$ outputs an operation signal to the second heater, based on the temperature deviation corresponding to the detection temperature PV1 of the first temperature sensor. In other words, the second PID control means $6_2'$ operates so that the control by the fourth PID control means $6_4'$ does not affect or less affects the control of the first PID control means $6_1'$; and the third PID control means $6_3'$ operates so that the control by the first PID control means $6_1'$ does not affect or less affects the control of the fourth PID control means $6_4'$, thereby operating as a interference-reducing control means.

The present invention can be composed not only of a temperature regulator having multi-point inputs and outputs as shown in FIG. 57, but also of a combination of plural temperature regulators of single-point temperature control.

Figure 58:
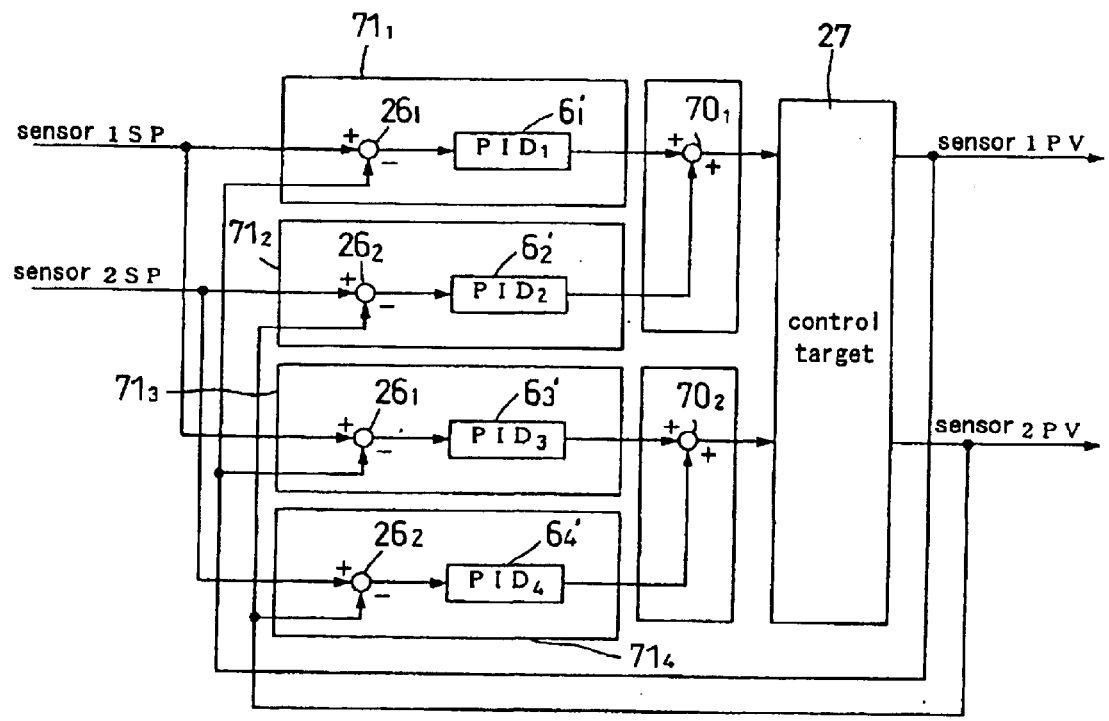
FIG. 58 is a block diagram of another embodiment.

FIG. 58 shows an example having a combination of four temperature regulators $71_1$ to $71_4$ of single-point control, and its functions are the same as the temperature regulator of FIG. 57. It goes without saying that the adder $70_1$ for adding the amount of operation of the first and second PID control means $6_1'$ and $6_2'$ and the adder $70_2$ for adding the amount of operation of the third and fourth PID control means $6_3'$ and $6_4'$ can be built into the first to fourth temperature regulators $71_1$ to $71_4$, e.g., into the first and fourth temperature regulators $71_1$ and $71_4$.

As described above, the temperature regulators $71_1$ and $71_4$ of single-point control can be combined to be manufactured at lower cost.

Figure 59:
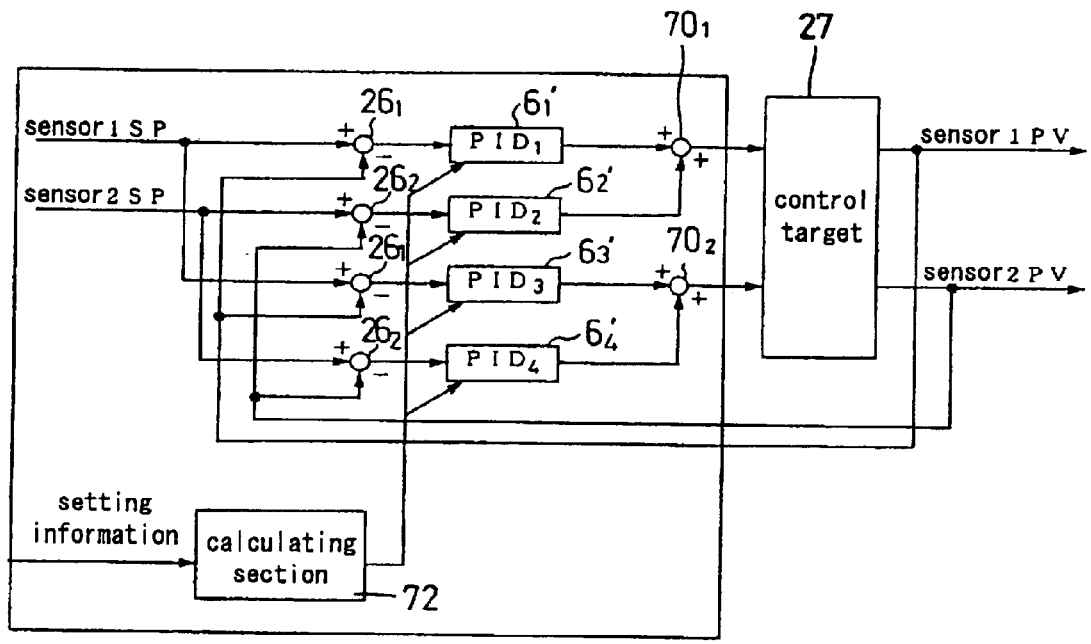
FIG. 59 is a block diagram of further another embodiment.

FIG. 59 is a block diagram of further another embodiment of the present invention where the components corresponding to those in FIG. 57 are referred to with the same reference symbols.

In this embodiment, the operator sets the mode conversion matrix Gm, the predistortion matrix Gc, the proportion gain kp, the integral time constant Ti, and the differential time constant $T_D$ which are the PID parameters of the first and second PID control means $6_1$ and $6_2$ of FIG. 38, which makes the PID parameters of the first to fourth PID control means $6_1'$ to $6_4'$ be automatically calculated and set by the calculating means 72. Thus, the operator becomes free from troublesome calculation or the setting of PID parameters.

In this embodiment, four PID control means $6_1'$ to $6_4'$ are provided for a 2-channel temperature control. However, some effects can be obtained by providing at least one PID control means, that is, three PID control means.

Figure 60:
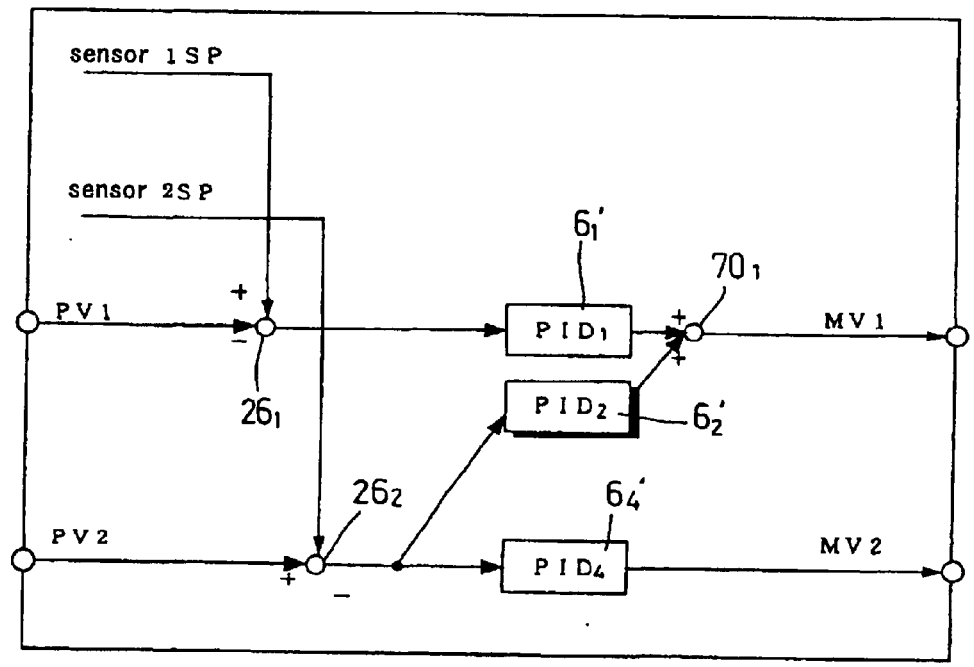
FIG. 60 is a block diagram of further another embodiment.

For example, when the PID parameters of the two PID control means $6_2'$ to $6_3'$ for interference-reducing are calculated, if one gain is large and the other gain is nearly zero, the other PID control means can be omitted and three PID control means $6_2'$, $6_3'$ and $6_4'$ can be employed as shown in FIG. 60.

The above embodiment deals with a two-channel case; however, the present invention can be applied to a case having three or more channels. For example, as shown in FIG. 61, the case of three channels can be composed of adders $70_1$ to $70_3$ and the first to ninth PID control means $6_1'$ to $6_9'$.

In this case, the PID parameters of the PID control means $6_1'$ to $6_9'$ are calculated using the mode conversion matrix Gm, the matrix $G_{PID}$ corresponding to the first to third PID control means $6_1$ to $6_3$, and the predistortion matrix Gc composed by the mode converter 5", the first to third PID control means $6_1$ to $6_3$, and the predistorter 7 similar to the one shown in FIG. 38.

Figure 61:
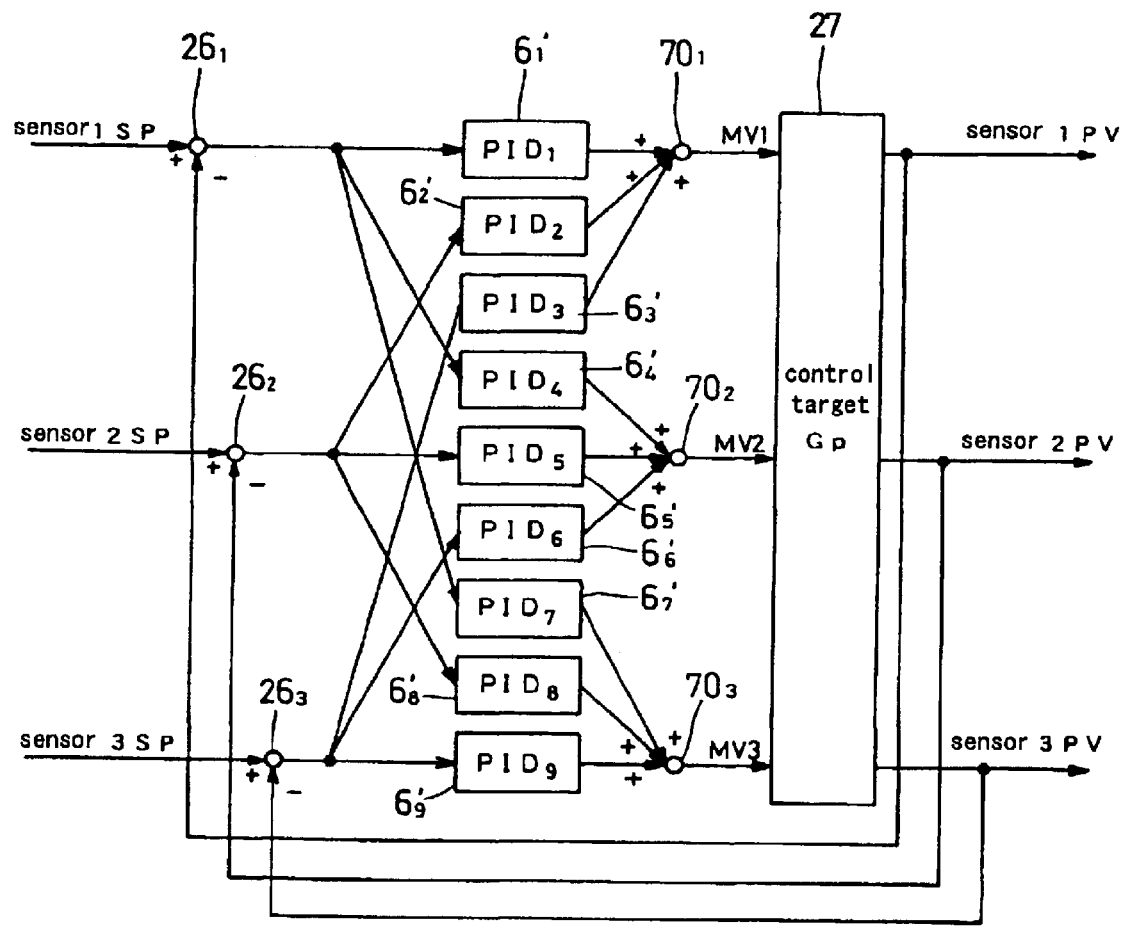
FIG. 61 is a block diagram of further another embodiment.

In FIG. 61, the second PID control means $6_2'$ operates so that the control of the second channel corresponding to the second temperature sensor does not affect or less affects the control of the first channel corresponding to the first temperature sensor; the third PID control means $6_3'$ operates so that the control of the third channel corresponding to the third temperature sensor does not affect or less affects the control of the first channel; the fourth PID control means $6_4'$ operates so that the control of the first channel does not affect or less affects the control of the second channel; the sixth PID control means $6_6'$ operates so that the control of the third channel does not affect or less affects the control of the second channel; the seventh PID control means $6_7'$ operates so that the control of the first channel does not affect or less affects the control of the third channel; and the eighth PID control means $6_8'$ operates so that the control of the second channel does not affect or less affects the control of the third channel.

Figure 62:
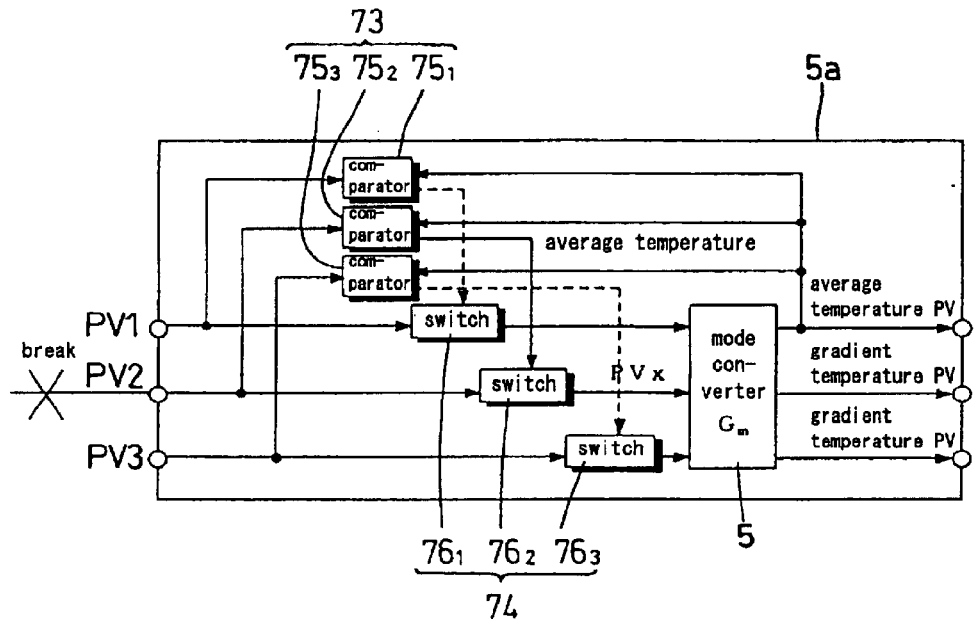
FIG. 62 is a block diagram of the main part of another embodiment.

FIG. 62 is a block diagram showing the main part of further another embodiment of the present invention. For example, in the heat treatment apparatus, when a wafer is heat-treated and the detection signal line from the temperature sensor for detecting the temperature of the heat treatment apparatus is broken, it is immediately detected and control is performed so as to make its influence as little as possible, thereby possibly suppressing the occurrence of a defective product.

Therefore, this embodiment is provided with a mode converter $5a$ having a sensor break distorter for detecting and compensating a break in the temperature sensor. The mode converter $5a$ having the sensor break distorter is composed, in addition to the mode converter 5, of a break detecting means 73 for detecting a break in the detection signal lines of the three temperature sensors and a replacing means 74 for replacing the detection output of the temperature sensor from which a break has been detected with the average temperature of the detection temperature of the temperature sensor.

It goes without saying that in order to detect and compensate a break in the detection signal lines from the temperature sensors, the mode converter $5a$ with the sensor break compensator can be provided outside the mode converter 5 instead of providing it inside the mode converter 5.

The break detecting means 73 is provided with the first to third comparators $75_1$ to $75_3$ for comparing the average temperature obtained from the mode converter 5 and the detection temperatures PV1 to PV3 from the first to third temperature sensors, and outputting the average temperature as the result of a break when the difference exceeds the predetermined threshold value. The replacing means 74 is provided with the first to third switching devices $76_1$ to $76_3$ for outputting the outputs of the temperature sensors by switching them to the average temperatures obtained from the comparators $75_1$ to $75_3$ in response to the outputs of the comparators $75_1$ to $75_3$.

In FIG. 62, the detection signal line from the second temperature sensor is broken, the break is detected by the second comparator $75_2$, and the average temperature is outputted to the second switching device $76_2$. The second switching device $76_2$ outputs the average temperature calculated by the mode converter 5 in place of the output PV2 of the second temperature sensor to the mode converter 5 as the replacement temperature PVx.

The mode converter 5 may be designed to calculate the average temperature only from the detection temperature of the temperature sensor that is not broken, in response to the outputs of the first to third comparators $75_1$ to $75_3$, without using the replaced average temperature corresponding to the temperature sensor from which a break has been detected. Or the replaced average temperature can be used for calculation. The gradient temperature is calculated using the replaced average temperature.

Figure 63:
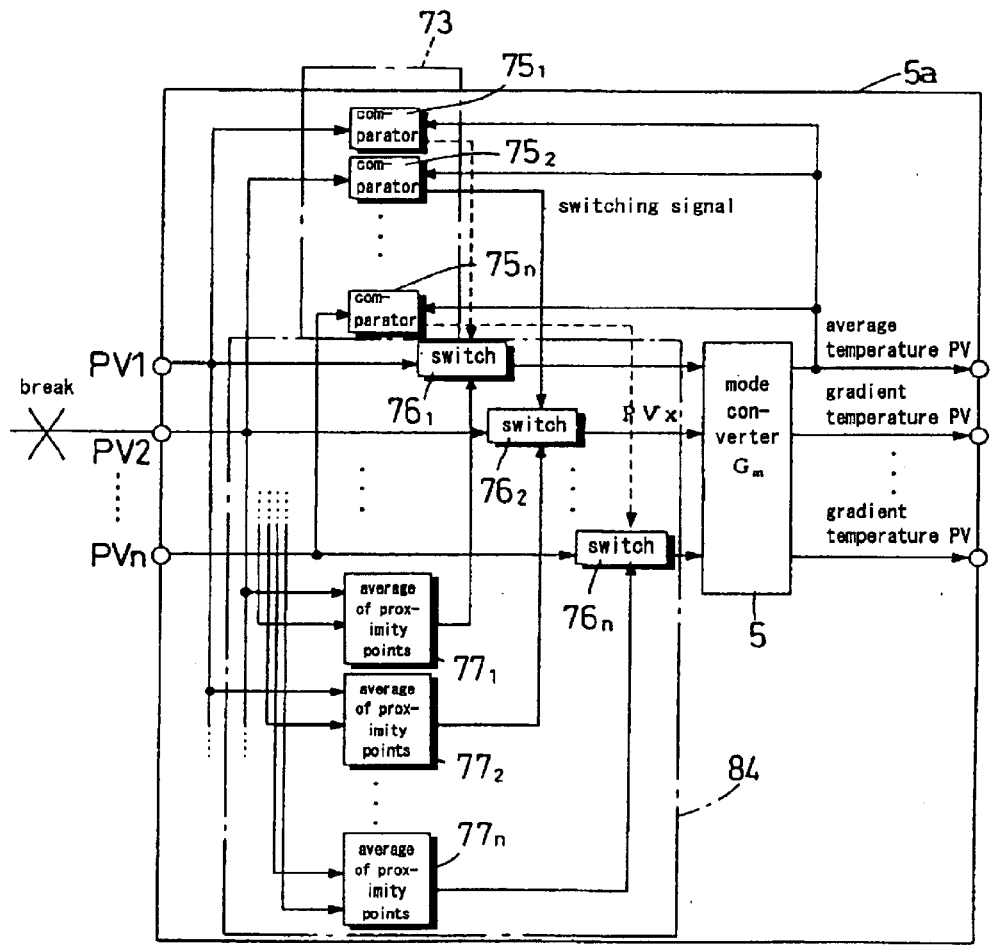
FIG. 63 is a block diagram of the main part of further another embodiment.

FIG. 63 is a diagram of further another embodiment of the present invention which corresponds to FIG. 62, and indicates the case having n inputs and outputs where the components corresponding to those in FIG. 62 are referred to with the same reference symbols.

In the above embodiment, the output of the temperature sensor from which break has been detected is replaced by the average temperature given through the comparators $75_1$ to $75_3$. In contrast, in the present embodiment, the replacing means 74 is provided with proximity point average calculation circuits $77_1$ to $77n$ for calculating the average of the detection temperatures of plural temperature sensors disposed close to each other, and when a break is detected, the output is replaced by the average temperature of the detection temperatures at proximity points calculated by the corresponding one of the proximity point average calculation circuits $77_1$ to $77n$.

The temperature sensors disposed close to each other can be two temperature sensors disposed at both sides of a temperature sensor.

As described above, the output of the temperature sensor from which break has been detected is replaced by the average temperature or the detection temperature of an adjacent temperature sensor. This enables the temperature of the control target to be controlled nearly at a desired condition even if a break occurs.

Figure 64:
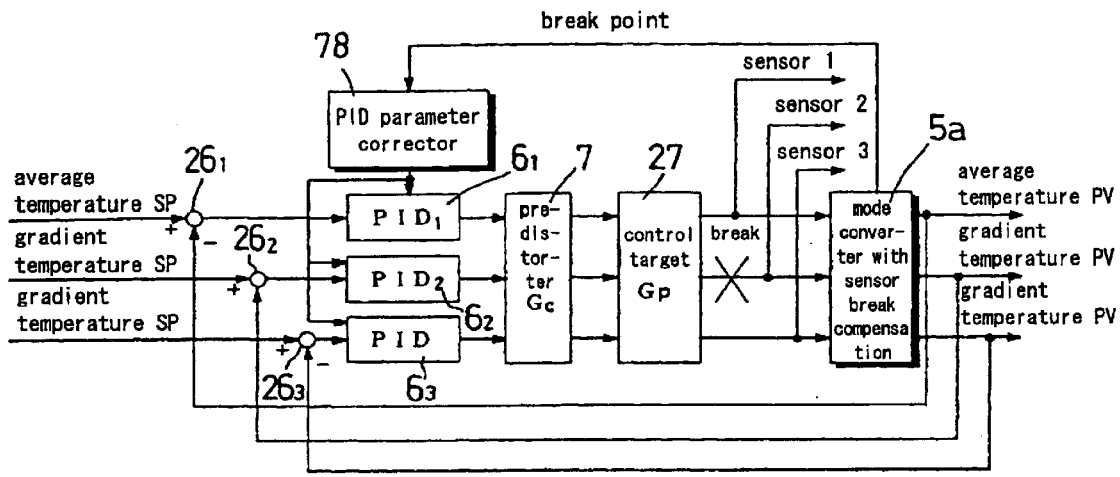
FIG. 64 is a block diagram of another embodiment.

FIG. 64 is a block diagram of the control system of further another embodiment of the present invention where $5a$ corresponds to the mode converter $5a$ with a sensor break compensator of FIG. 62 or 63.

In this embodiment, when a break of a temperature sensor is detected and replaced as mentioned above, the PID parameters of the PID control means $6_1$ to $6_3$ are amended.

In other words, when the detection output of the broken temperature sensor is replaced by the detection temperature of an adjacent temperature sensor, the distance of heat conduction becomes longer than the broken intended temperature sensor, which increases dead time with the possibility of hunching. Therefore, this embodiment provides a PID parameter corrector 78, and when the PID parameter corrector 78 detects a break and replaces the detection output of the temperature sensor, the PID parameters of the PID control means $6_1$ to $6_3$ are corrected to make the proportion gain weak, or the integral time and the differential time longer. It is possible to correct all or one of the proportion gain, the integral time, and the differential time.

Figure 65:
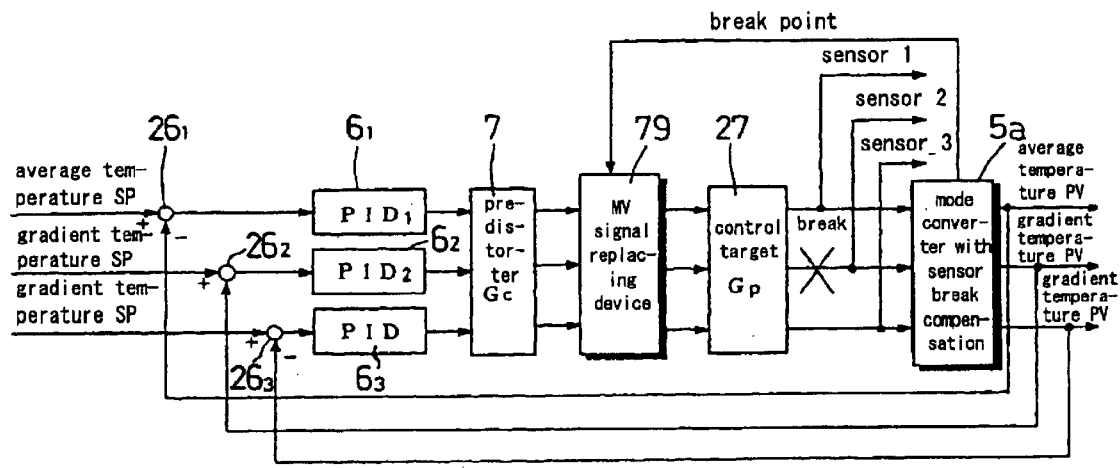
FIG. 65 is a block diagram of an embodiment.

FIG. 65 is a diagram of further another embodiment of the present invention which corresponds to FIG. 64, where the components corresponding to those in FIG. 64 are referred to with the same reference symbols.

In the above embodiment, when the detection output of the temperature sensor from which a break has been detected is replaced, the PID parameters of the PID control means $6_1$ to $6_3$ are corrected; however, in the present embodiment, an operation signal switch 79 is provided for switching the operation signals from the PID control means $6_1$ to $6_3$, and the operation signal switch 79 switches the operation signal for the heater corresponding to the temperature sensor from which a break has been detected is switched to the operation signal for the heater adjacent to the heater.

Figure 66:
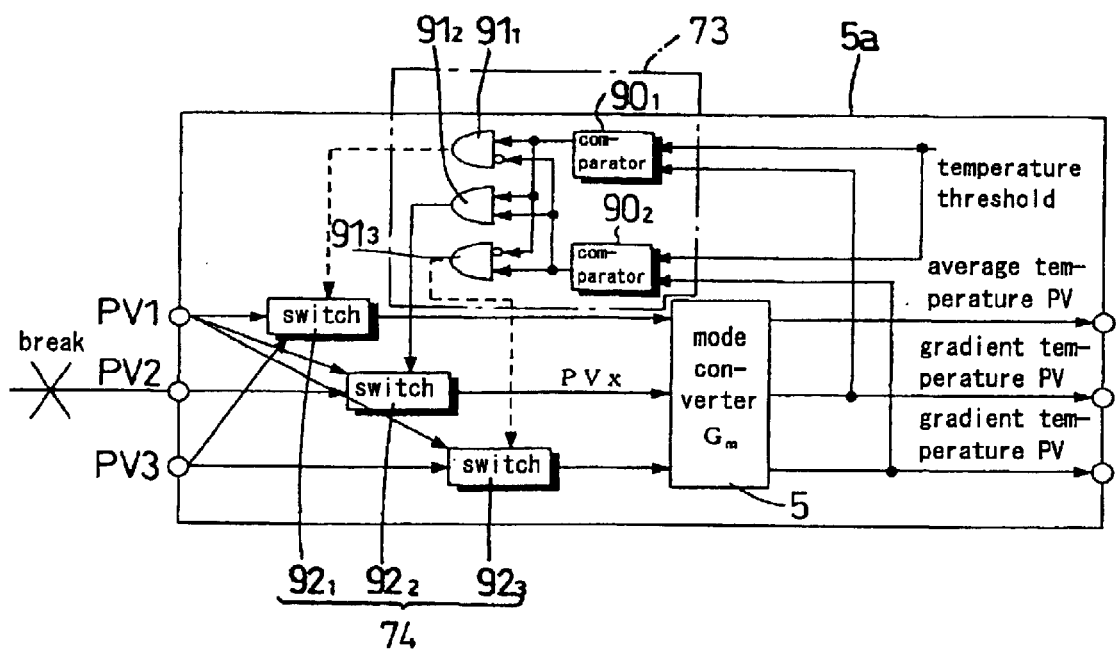
FIG. 66 is a block diagram of another embodiment.

FIG. 66 is a block diagram of the mode converter $5a$ with a sensor break compensator of further another embodiment of the present invention. In this embodiment, the mode converter 5 converts the detection temperatures PV1 to PV3 of the first to third temperature sensors into the first gradient temperature based on the detection temperatures PV1 and PV2 of the first and second temperature sensors and into the second gradient temperature based on the detection temperatures PV2 and PV3 of the second and third temperature sensors.

In this embodiment, a break is detected by making use of the fact that a break in one temperature sensor greatly changes the gradient temperature.

The break detecting means 73 of this embodiment is composed of the first and second comparators $90_1$, $90_2$ for comparing the threshold and the first and second gradient temperatures, respectively, and the first to third gate circuits $91_1$ to $91_3$ which are supplied with the outputs of the comparators $90_1$, $90_2$, respectively. When the first temperature sensor is broken, the first gradient temperature changes greatly enough to exceed the threshold and the output of the first comparator $90_1$ becomes high, which makes the first gate circuit $91_1$ give the detection output. In the same manner, when the second temperature sensor is broken, the first and second gradient temperatures change greatly enough to exceed the threshold and the outputs of the first and second comparators $90_1$ $90_2$ become high, which makes the second gate circuit $91_2$ give the detection output; and when the third temperature sensor is broken, the second gradient temperature changes greatly enough to exceed the threshold and the output of the second comparator $90_2$ becomes high, which makes the third gate circuit $91_3$ give the detection output.

The replacing means 74 for replacing the detection output of a broken temperature sensor is provided with the first to third switches $92_1$ to $92_3$ which are supplied with the detection outputs of the gate circuits $91_1$ to $91_3$, respectively, and is designed to make the detection output of the temperature sensor adjacent to the broken temperature sensor the replacement output PVx. The first switch $92_1$ is designed to replace the detection temperature PV3 of the third temperature sensor by the detection output of the broken temperature sensor, and the second and third switches $92_2$ to $92_3$ are designed to replace the detection temperature PV1 of the first temperature sensor by the detection output of the broken temperature sensor.

Figure 67:
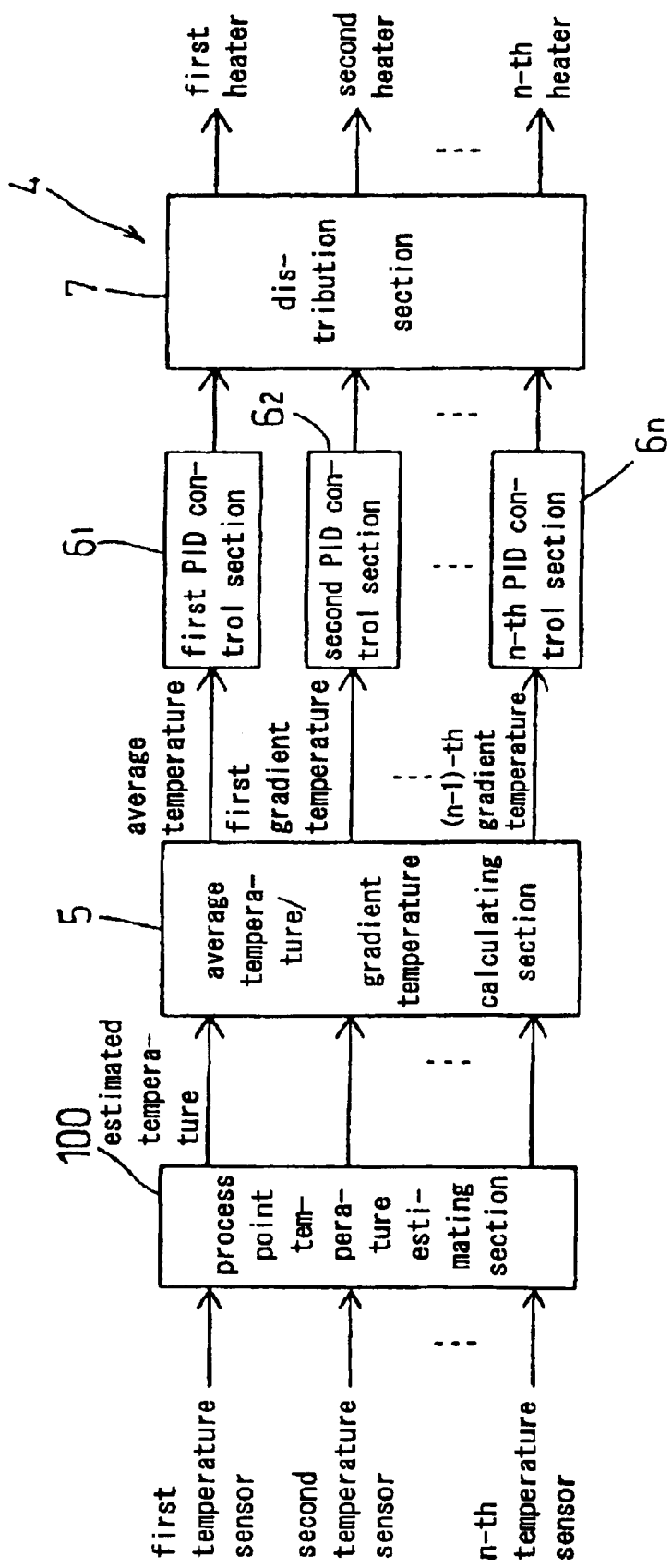
FIG. 67 is a block diagram of further another embodiment.

FIG. 67 is a block diagram of the temperature regulator 4 of further another embodiment of the present invention, and corresponds to aforementioned FIG. 3.

Conventional temperature regulators control the temperature of a processing meansuch as a heat-treated plate as the control target at the desired temperature; however, it is not taken into consideration to control the temperature of the object like a wafer to be processed by the processing means at the desired temperature. The temperature of the object to be processed has been controlled only indirectly by controlling the temperature of the processing means.

For example, in the heat process by a heat-treated plate or the like, heat cannot be transmitted evenly because of the difference in the degree of contact between the heat-treated plate and the object to be processed due to the uneven surface of the heat-treated plate or the uneven material of the heat-treated plate. Consequently, controlling the heat-treated plate at uniform temperatures does not result in the uniform control of the object to be processed like a wafer, thereby failing to apply uniform heat process to the object to be processed.

In other words, conventional temperature regulators can control the temperature of the processing meansuch as a heat-treated plate, but cannot control the object such as a wafer which is processed by the processing means at the desired temperature.

In view of this, the temperature regulator 4 of this embodiment is composed of a process point temperature estimating means 100 for estimating the temperature of process points of the object to be processed by the processing means in the later-described manner based on the detection temperatures of the plural temperature sensors $2_1$ to $2n$ for detecting the temperatures of the processing means; the average temperature/gradient temperature calculating means (mode converter) 5 for calculating in the later-described manner the average temperature of the estimation temperatures and the gradient temperature based on the estimation temperatures; the PID control means $6_1$ to $6n$ as plural temperature control means to which the average temperature or each gradient temperature calculated in the calculation means 5 are entered; and the distribution means (predistorter) 7 for distributing the operation signals (the amount of operation) transmitted from the PID control means $6_1$ to $6n$ to the heaters $1_1$ to $1n$ composing a heating means in the predetermined distribution ratio as mentioned later.

In this embodiment, the process point temperature estimating means 100 estimates the temperatures of the process points of the object to be processed that individually correspond to the detection points of the processing means by the temperature sensors $2_1$ to $2n$ as described later.

This process point temperature estimating means 100, the average temperature/gradient temperature calculating means 5, the PID control means $6_1$ to $6n$, and the distribution means 7 are composed of a micro computer or the like.

In this embodiment, not only the processing meansuch as a heat-treated plate but also the object to be processed by the processing meansuch as a wafer are controlled at the desired temperatures.

For this purpose, the process point temperature estimating means 100 is provided which estimates the temperatures of the process points of the object to be processed by the processing means, based on the detection temperatures of the temperature sensors $2_1$ to $2n$ for detecting the temperatures of the processing means.

Figure 68:
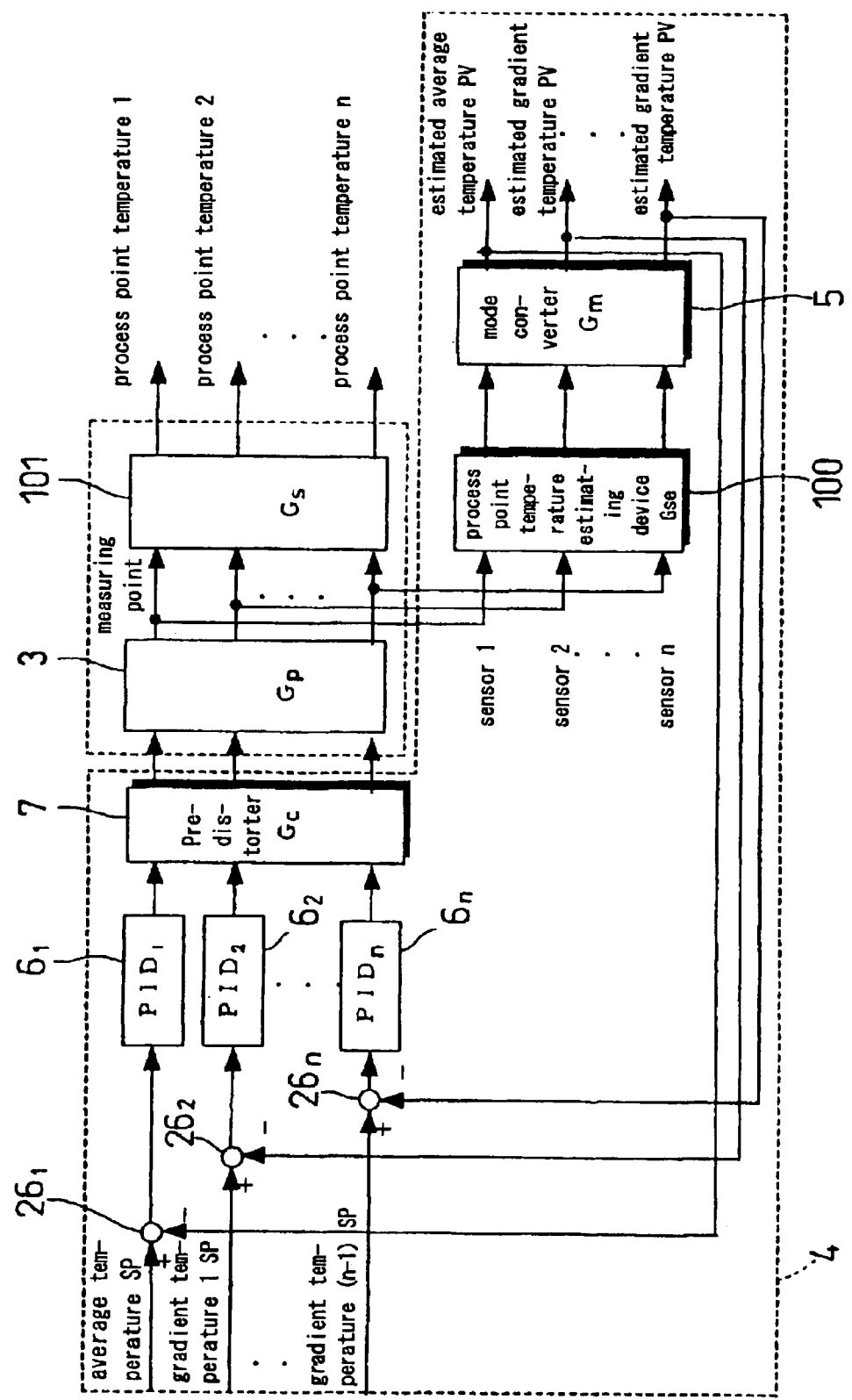
FIG. 68 is a block diagram of further another embodiment.

FIG. 68 is a block diagram of a temperature control system using the temperature regulator 4 of FIG. 67 where the components corresponding to those in FIG. 67 are referred to with the same reference symbols.

In this drawing, the object 100 like a wafer is processed by the processing means 3 as the control target, and the process point temperature estimator 100 estimates as will described later the temperatures of the process points of the object to be processed by the processing means 3 based on the detection temperatures of the temperature sensors $2_1$ to $2n$ which detect the temperatures of the processing means 3 such as a heat-treated plate to heat-process the wafer. The process points individually correspond to the detection points detected by the temperature sensors $2_1$ to $2n$.

Assuming that the processing means 3 is a heat-treated plate and the object to be processed is a wafer mounted on the heat-treated plate, the process point temperature estimator 100 estimates the temperatures of the process points of the wafer corresponding to the detection points, based on the detection temperatures of the temperature sensors for detecting the temperatures of the detection points of the heat-treated plate. As for the relation between the detection points of the heat-treated plate and the process points of the wafer, the point in the wafer locating right above the detection point of the heat-treated plate can be made process point, or a position away from it can be the process point. The process point only has to be the point which allows the temperature of the wafer to be estimated from the detection temperature of at the detection point of the heat-treated plate.

The mode converter 5 calculates the estimation average temperature and the estimation gradient temperature, based on the estimation temperatures of the process point temperature estimator 100, and the PID control means $6_1$ to $6n$ output operation signals, using the deviation between the estimation average temperature and the target average temperature or the deviation between the estimation gradient temperature and the target gradient temperature as the control deviations, and the predistorter 7 distributes the operation signals as above to give them to the heaters as the operating means.

Thus, the above interference-reducing control (gradient temperature control) is carried out not based on the detection temperatures of the temperature sensors but based on the estimation temperatures of the process points individually corresponding to the detection temperatures.

In the case where gradient temperature control is carried out based on the detection temperatures of the temperature sensors, the processing means 3 such as a heat-treated plate can be controlled at the desired temperatures by reducing interference. In contrast, in this embodiment where gradient temperature control is carried out based on the estimation temperatures of the process points of the wafer in place of the detection temperatures, the object 101 to be processed like a wafer can be controlled at the desired temperatures.

The process point temperature estimator 100 will be described in detail as follows.

Figure 69:
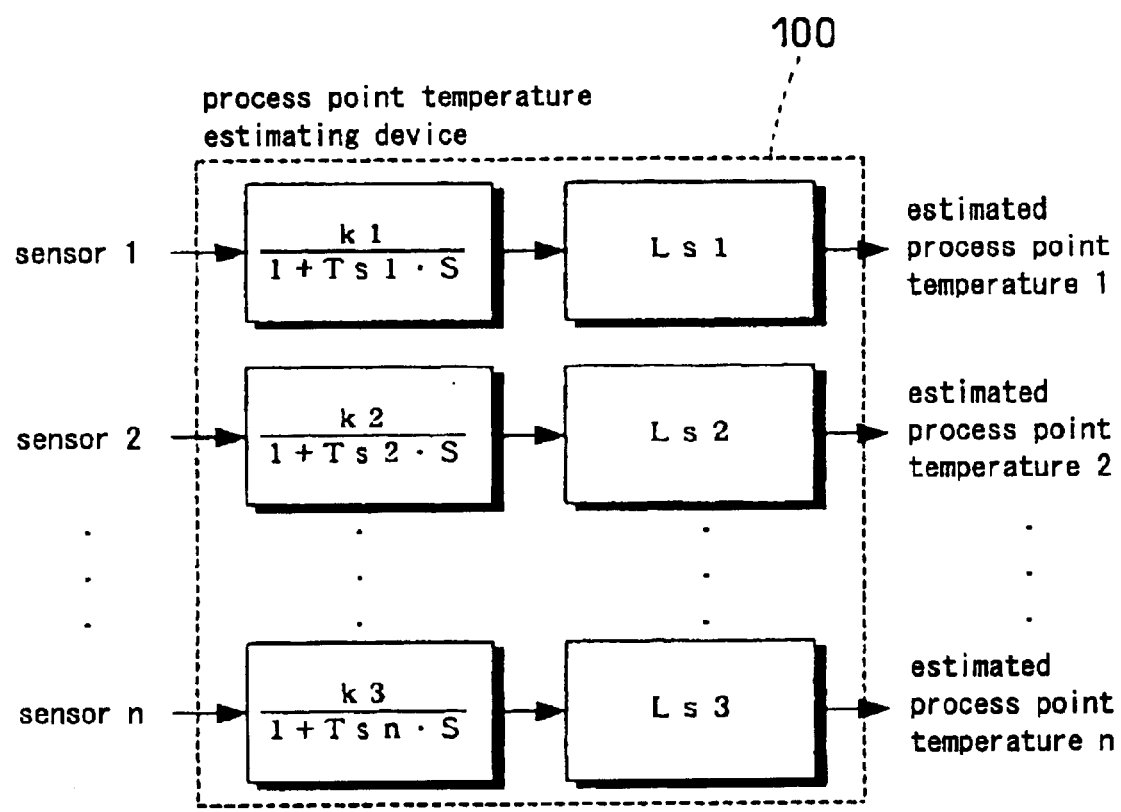
FIG. 69 is a block diagram showing the process point temperature estimating device.

FIG. 69 is a diagram showing a structure of the process point temperature estimator 100. In this embodiment, a first order lag (time constant Ts)+dead time is modeled, and the process point temperature of the object 101 to be processed is estimated based on the detection temperatures of the temperature sensors for detecting the temperatures of the processing means 3.

Identification using the model of the first order lag+dead time will be described.

Figure 70:
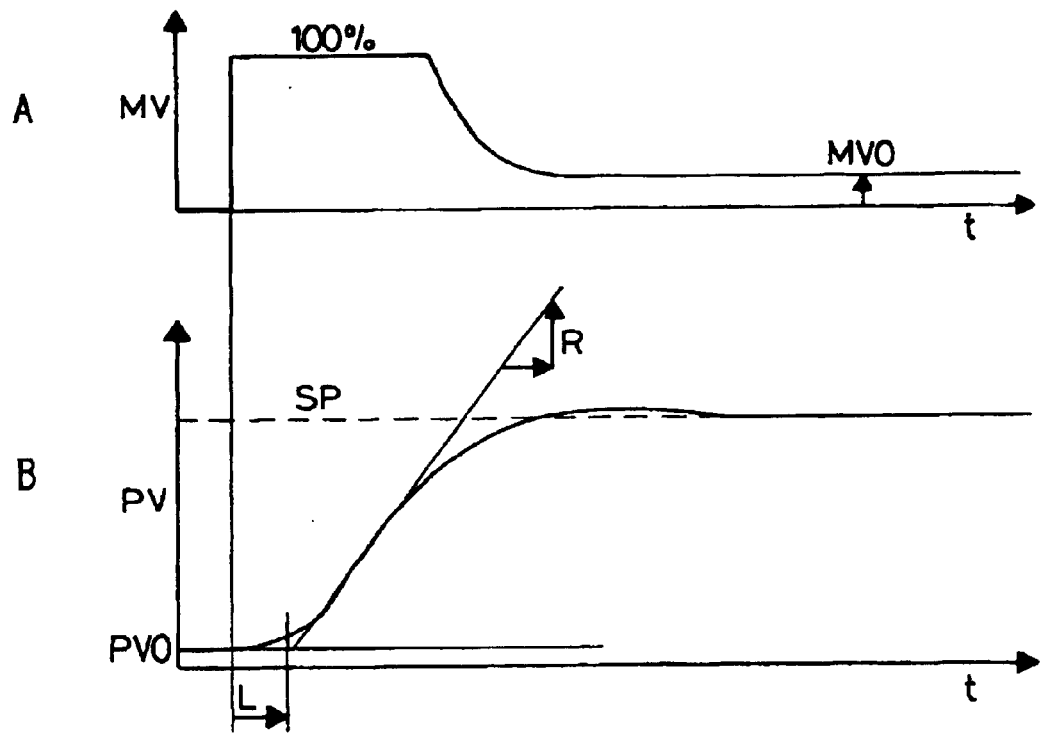
FIG. 70 is a diagram for explaining step response.

The following example uses the method called step response. As shown in FIG. 70, the maximum slant of the detection temperature PV when the amount of operation MV reaches 100% is made R, and the time to the intermeans of the tangent of the point having the maximum slant and the line of the room temperature is made the dead time L. The time constant T can be calculated from the stationary amount of operation MV0 and the set temperature SP as follows:

stationary gain: K=(SP−PV0)/MV0
time constant: T=K/R
model G(s)=K/(Ts+1)·exp(−Ls)

Figure 71:
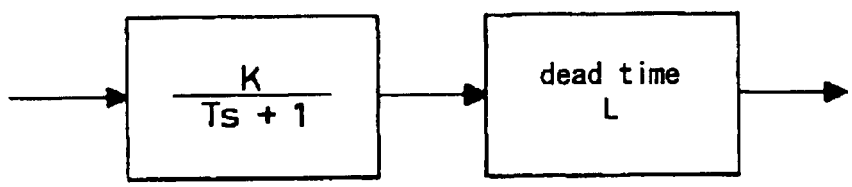
FIG. 71 is a diagram showing the structure of the model.

The block diagram is as shown in FIG. 71.

The model from the temperature of the heat-treated plate as the processing means 3 to the temperature of the wafer as the object to be processed will be described as follows.

Using the above-mentioned method, the model Gmw(s) from the amount of operation MV to the wafer temperature and the model Gmw (s) from the amount of operation MV to the heat-treated plate temperature are calculated. The model Gmw(s) from the heat-treated plate temperature to the wafer temperature can be obtained as follows from the model Gmw from the amount of operation MV to the wafer temperature and the model Gmw (s) from the amount of operation MV to the heat-treated plate temperature:

Ghw(s)=Gmw(s)/Gmh(s), wherein
Gmw(s)=Kmw/(Tmw·s+1)·exp(−Lmw·s)
Gmh(s)=Kmh/(Tmh·s+1)·exp(−Lmh·s)

By substituting the above, the following equation is obtained:

$$Ghw(s)=Kmw(Tmh·s+1)/Kmh/(Tmw·s+1)·exp(−(Lmw−Lmh)·s)$$

Figure 72:
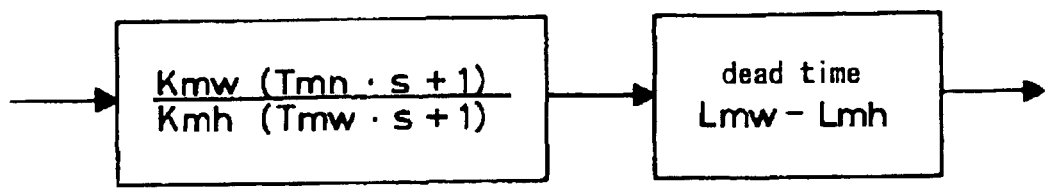
FIG. 72 is a diagram showing the structure of the model from the heat-treated plate to the wafer.

Therefore, the model from the heat-treated plate temperature to the wafer temperature becomes as shown in FIG. 72.

Consequently, it becomes possible to estimate the temperatures of the process points of the wafer as the object to be processed from the corresponding detection outputs of the temperature sensors.

The model Gmw(s) of the wafer temperature is determined by the measurement using an estimating wafer equipped with a sensor capable of measuring the process point temperature of the wafer itself. This estimating wafer is identical with the normal wafers to be processed by a heat-treated plate, except that the temperature of the wafer itself can be measured.

The present invention can be approximated by a model of the first order lag system or an ARX model, besides the model of the first order lag (time constant Ts)+dead time.

Figure 73:
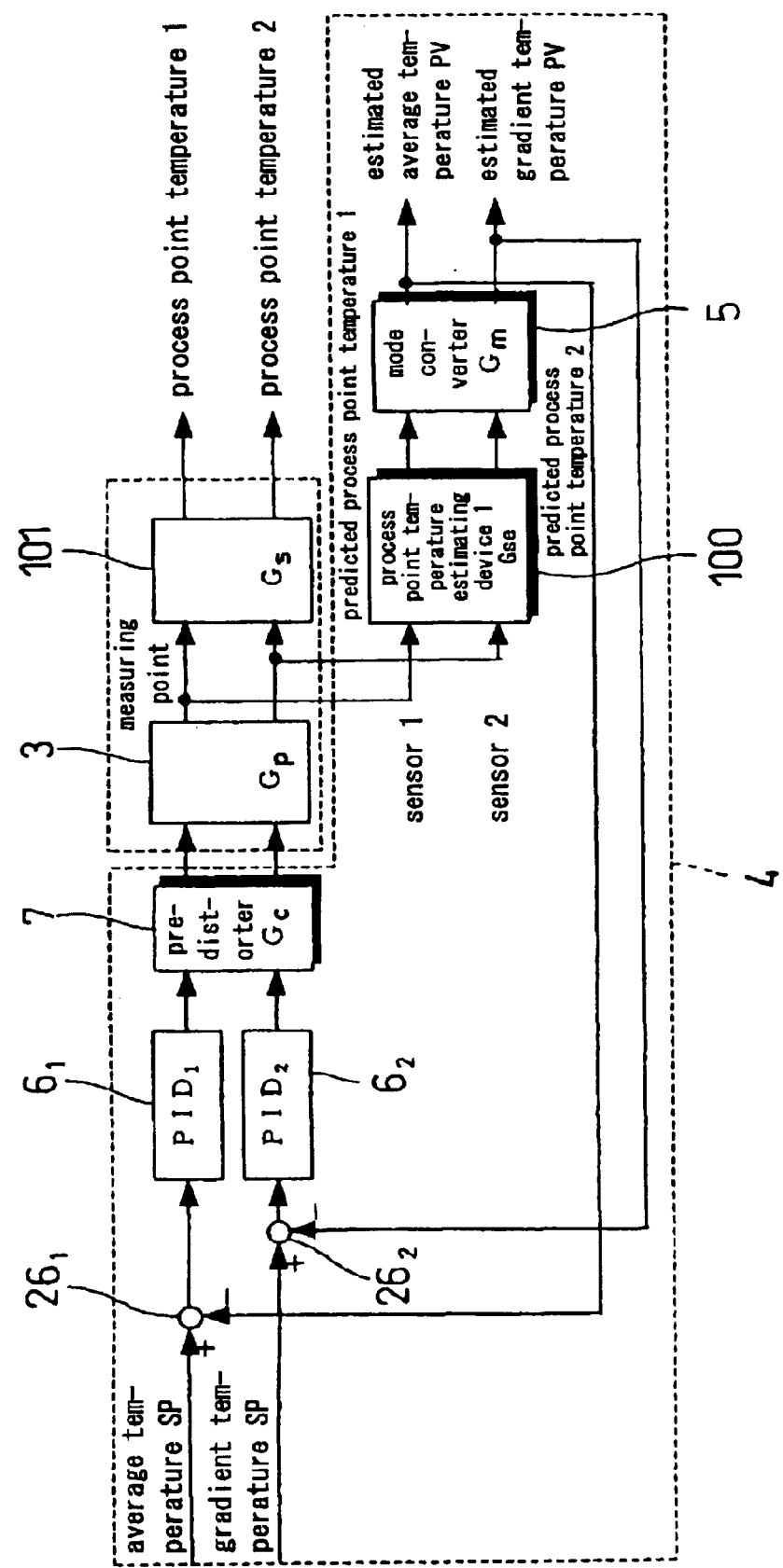
FIG. 73 is a block diagram of an embodiment.

FIG. 73 is a block diagram of the temperature control system showing a two-point control example where the components corresponding to those in FIG. 68 are referred to with the same reference symbols.

In this embodiment, the temperature of the heat-treated plate as the processing means 3 is detected by two temperature sensors. From the detection temperatures, the process point temperature estimator 100 estimates the process point temperatures of the wafer as the object to be processed corresponding to the detection points. The mode converter 5 converts the two estimation temperatures into the estimation average temperature and the estimation gradient temperature, thereby performing the above interference-reducing control using the estimation average temperature and the estimation gradient temperature as the amounts of control.

This embodiment enables control to be performed without interference and the wafer as the object to be processed to be controlled at the desired temperatures, such as uniform temperatures.

Figure 74:
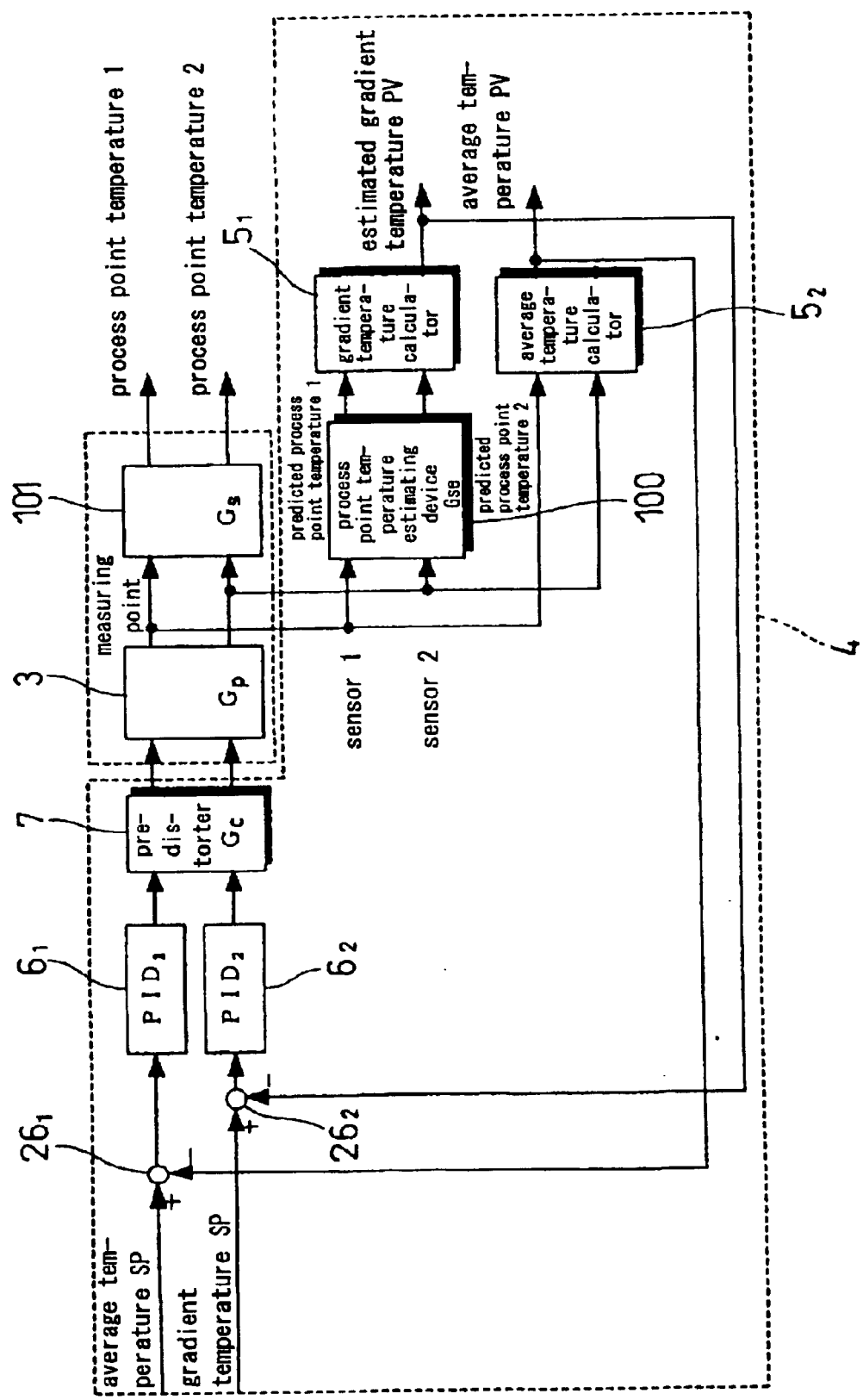
FIG. 74 is a block diagram of another embodiment.

FIG. 74 is a block diagram of the temperature control system of further another embodiment of the present invention where the components corresponding to those in FIG. 73 are referred to with the same reference symbols.

In the embodiment shown in FIG. 74, the aforementioned mode converter 5 is composed of a gradient temperature calculator $5_1$ and an average temperature calculator $5_2$. The gradient temperature calculator $5_1$ is supplied with estimation temperatures from the process point temperature estimator 100, whereas the average temperature calculator $5_2$ is supplied not with the estimation temperatures but with the detection temperatures of the temperature sensors for detecting the temperatures of the heat-treated plate.

According to this structure, the delay time in the feedback of the average temperature can be improved, as compared with the case where the estimation temperatures of the process points of the wafer are used, thereby providing a stable condition where the average temperature is less likely to hunt.

Figure 75:
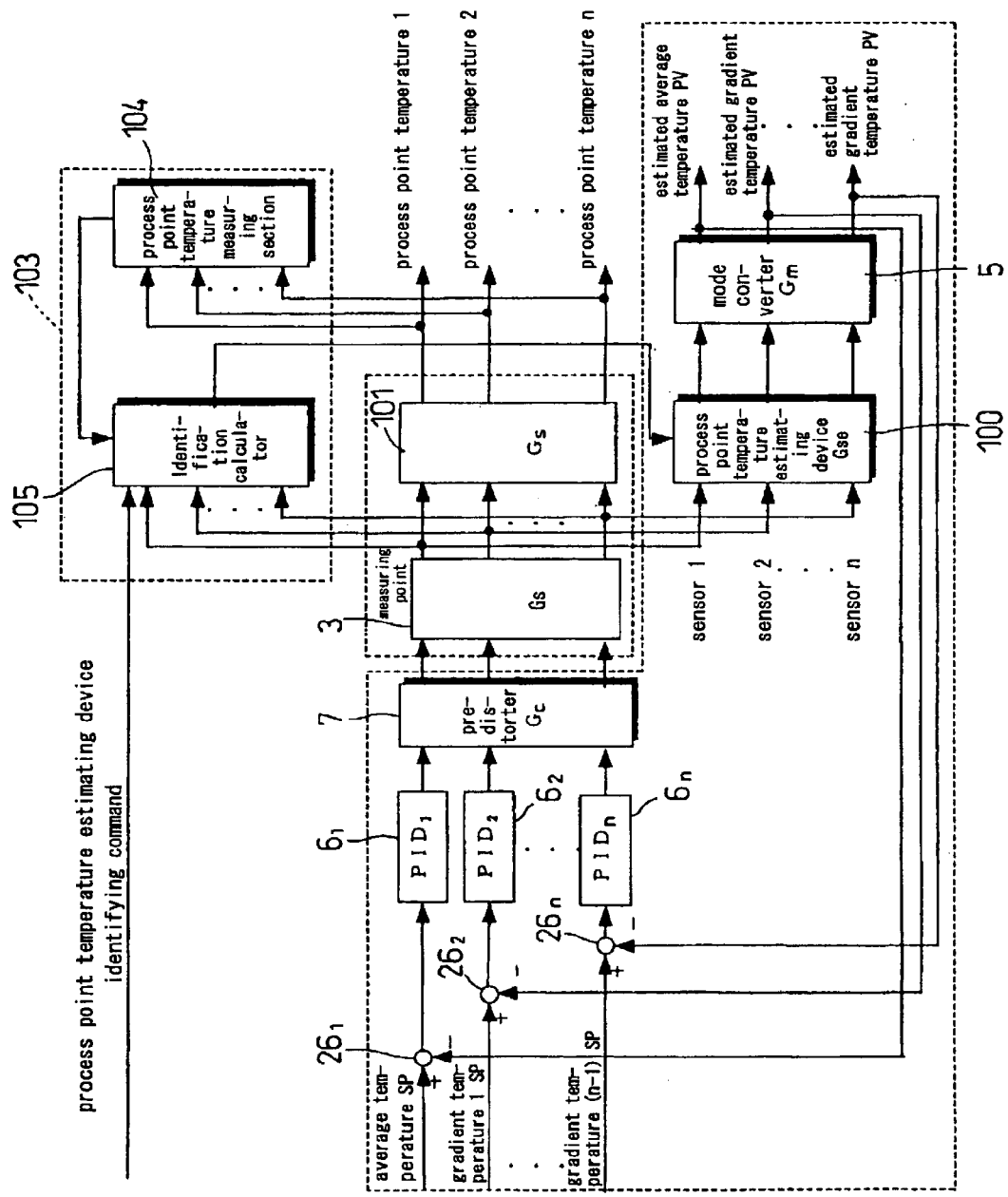
FIG. 75 is a block diagram of further another embodiment.

FIG. 75 is a block diagram of the control system of further another embodiment of the present invention which corresponds to FIG. 68.

The temperature regulator of this embodiment is provided with an identification means 103 for identifying the model of the first order lag+dead time of the process point temperature estimator 100. This identification means 103 includes a process point temperature measuring means 104 which is supplied with the actual measurement temperatures of the process points from the estimating wafer capable of measuring the process point temperatures at the time of final adjustment before shipment, and an identification calculator 105 which calculates identification as mentioned above, based on the process point temperature from the process point temperature measuring means 104 and the detection temperatures of the temperature sensors for detecting the temperatures of the heat-treated plate as the processing means 3.

With respect to the timing for the identification calculation, the moment when the estimating wafer as the object to be processed is mounted on the heat-treated plate at high temperature is given to the identification means 103 as the process point temperature estimator identification instruction from outside, thereby performing identification calculation automatically.

In this example, identification by the process point temperature estimator 100 is done on the assumption of one-time measurement before shipment; however, it goes without saying that changes in the characteristics of the control target can be reflected on the model by performing identification more frequently.

Figure 76:
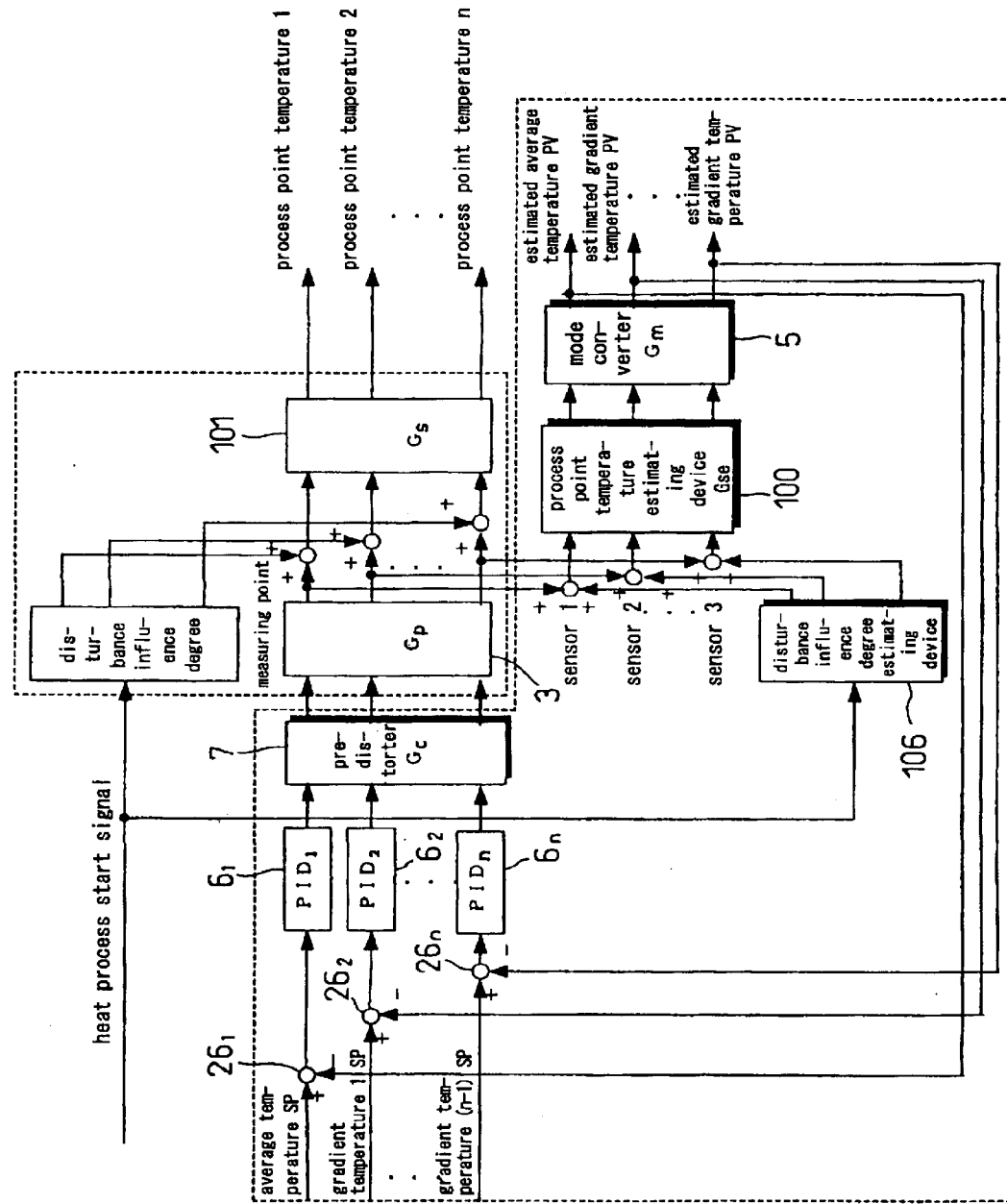
FIG. 76 is a block diagram of further another embodiment.

FIG. 76 is a block diagram of further another embodiment of the present invention corresponding to FIG. 68, where the components corresponding to those in FIG. 68 are referred to with the same reference symbols.

In this embodiment, a disturbance model is added. For example, when the wafer as the object to be processed is mounted on the high-temperature heat-treated plate, the temperatures of the process points of the object to be processed under temperature control are not always decreased by the same degree due to the difference in contact or in heat transfer between the center part and the peripheral part of the heat-treated plate. This embodiment is effective for temperature uniform control with high precision where slight variations in temperature decrease of the object to be heat-processed may cause problems.

To be more specific, this embodiment has a disturbance influence degree estimator 106, which gives an output corresponding to the degree of influence of disturbance in response to the start signal of heat process indicating that the wafer which is the object to be processed is mounted on the heat-treated plate, and adds the output to the detection temperatures of the temperature sensors which detect the temperatures of the heat-treated plate, thereby correcting the influence of the disturbance.

The disturbance influence degree estimator 106 can perform estimation using, e.g., the model of first order lag+dead time.

In order to identify this model, using an estimating wafer equipped with a sensor capable of measuring the process point temperatures of the wafer itself, the model is identified from the heat process start signal indicating the moment that the wafer is mounted on the heat-treated plate and the process point temperatures actually measured by the estimating wafer. This wafer is set in the disturbance influence degree estimator 106.

Figure 77:
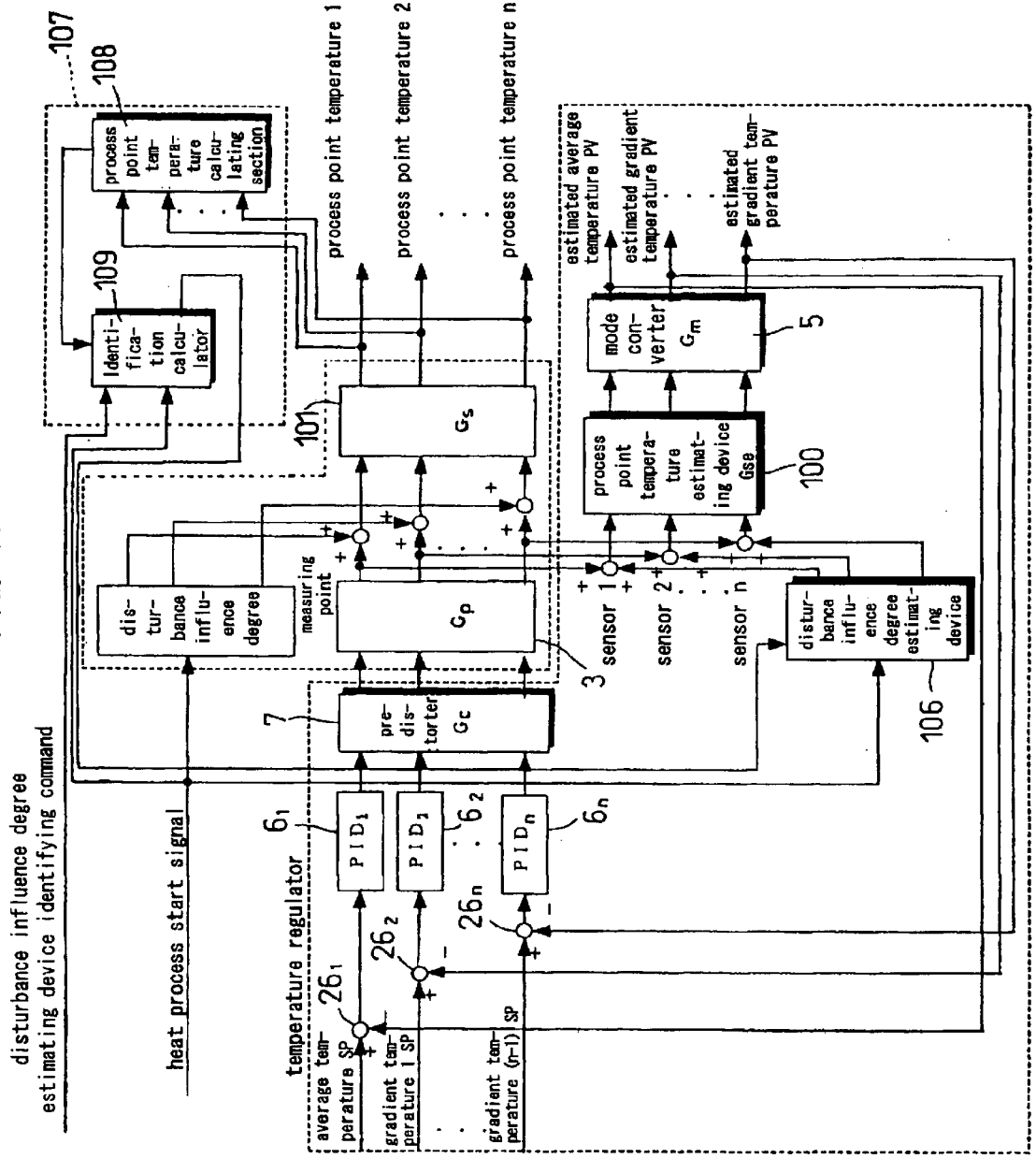
FIG. 77 is a block diagram of further another embodiment.

FIG. 77 is a block diagram of further another embodiment of the present invention corresponding to FIG. 76, where the components corresponding to those in FIG. 76 are referred to with the same reference symbols.

The temperature regulator of this embodiment is provided with an identification means 107 for identifying the parameters of the model of the first order lag+dead time of the disturbance influence degree estimator 106. The identification means 107 includes a process point temperature measuring means 108 which is supplied with the actual measurement of the process points from the estimating wafer capable of measuring the process point temperatures at the time of final adjustment before shipment, and an identification calculator 109 which calculates identification as mentioned above, based on the process point temperature from the process point temperature measuring means 108 and the heat process start signal indicating the moment that the wafer as the object to be processed is mounted on the heat-treated plate as the processing means 3. As to the timing for the identification calculation, the disturbance influence degree estimator identification instruction is given to the identification calculator 109.

Figure 78:
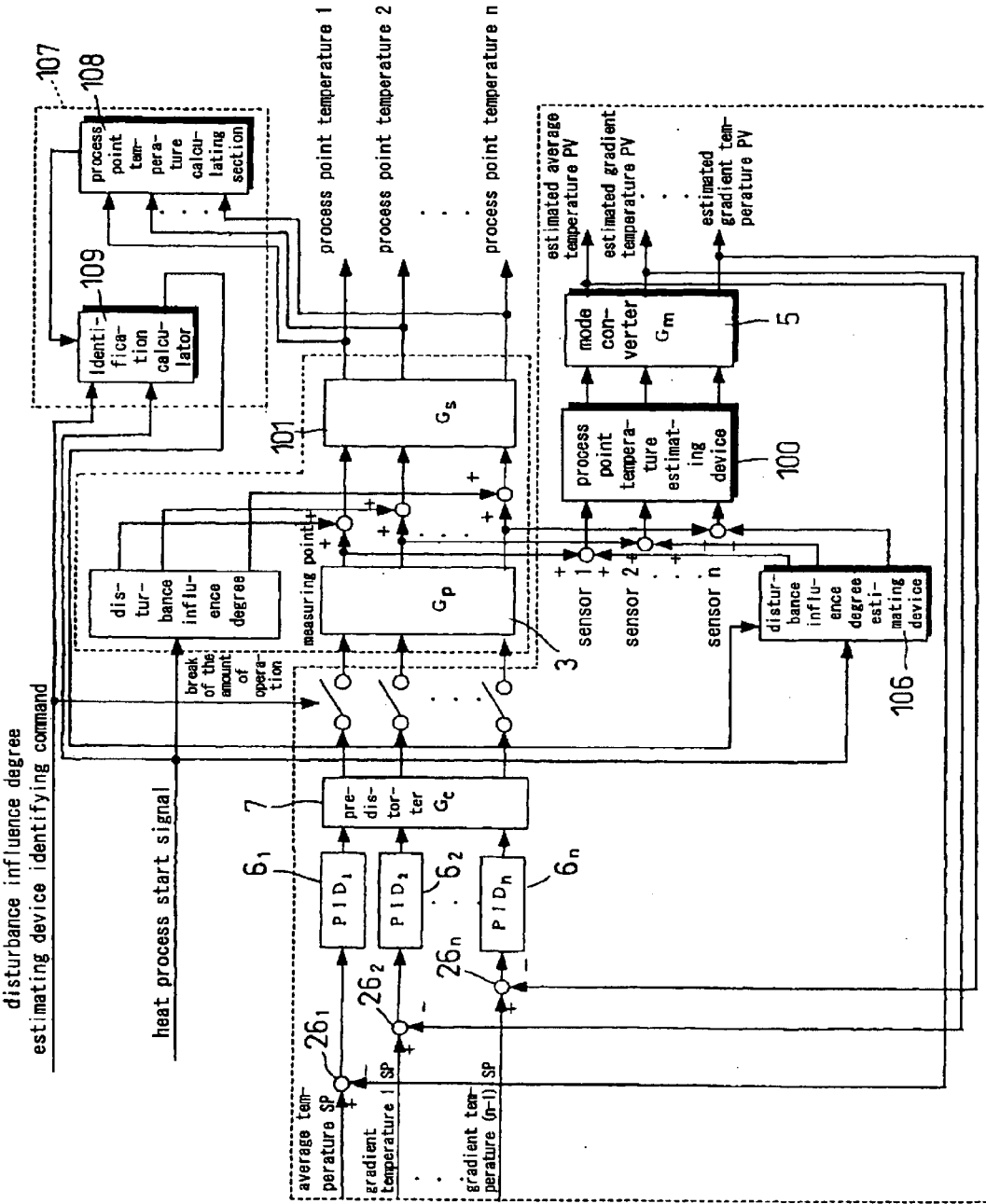
FIG. 78 is a block diagram of further another embodiment.

As further another embodiment of the present invention, as shown in FIG. 78, the feedback side which becomes noise at the time of identification can be detached at the time of identification so as not to give operation signals, thereby performing identification with only disturbance.

Figure 79:
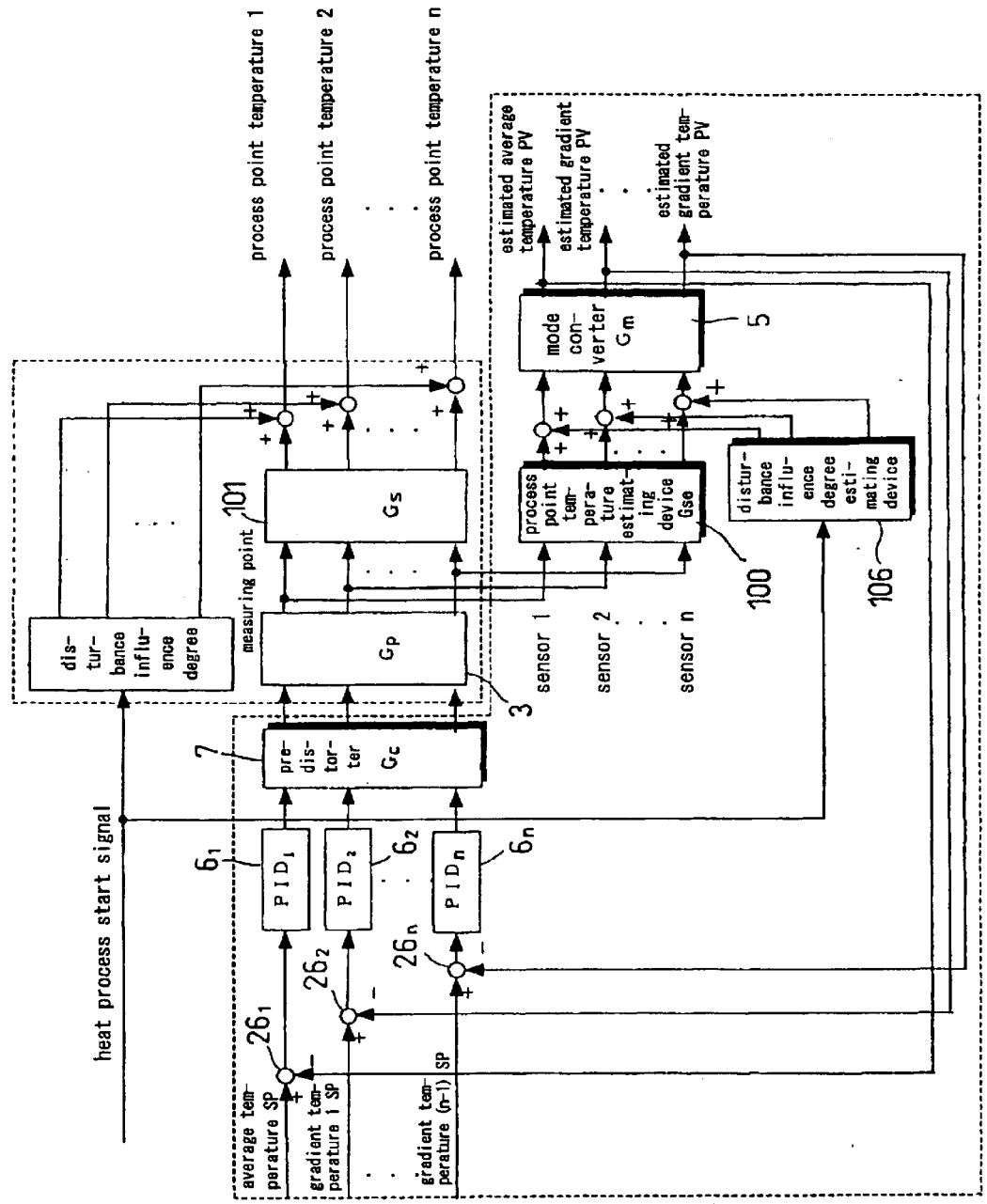
FIG. 79 is a block diagram of further another embodiment.

As further another embodiment of the present invention, as shown in FIG. 79, the disturbance influence degree estimator 106 and the process point temperature estimator 100 can be disposed so as to be combined with each other.

In the structure of FIG. 76, the model on the disturbance side obtained from identification can be found as the sum of the disturbance influence degree estimator 106 and the process point temperature estimator 100. Therefore, in order to use the disturbance influence degree estimator 106 exclusively, it is necessary to calculate excluding the part of the process point temperature estimator 100; however, this embodiment does not need that, thereby simplifying the identification.

In each of the aforementioned embodiments, the process point temperature estimator 100 estimates the temperatures of the process points, and the estimation temperature are used to find the average temperature and the gradient temperature; however, as another embodiment of the present invention, it is possible to estimate the average temperature or the gradient temperature of the process points from the average temperature and the gradient temperature calculated based on the detection temperatures of the temperature sensors.

Figure 80:
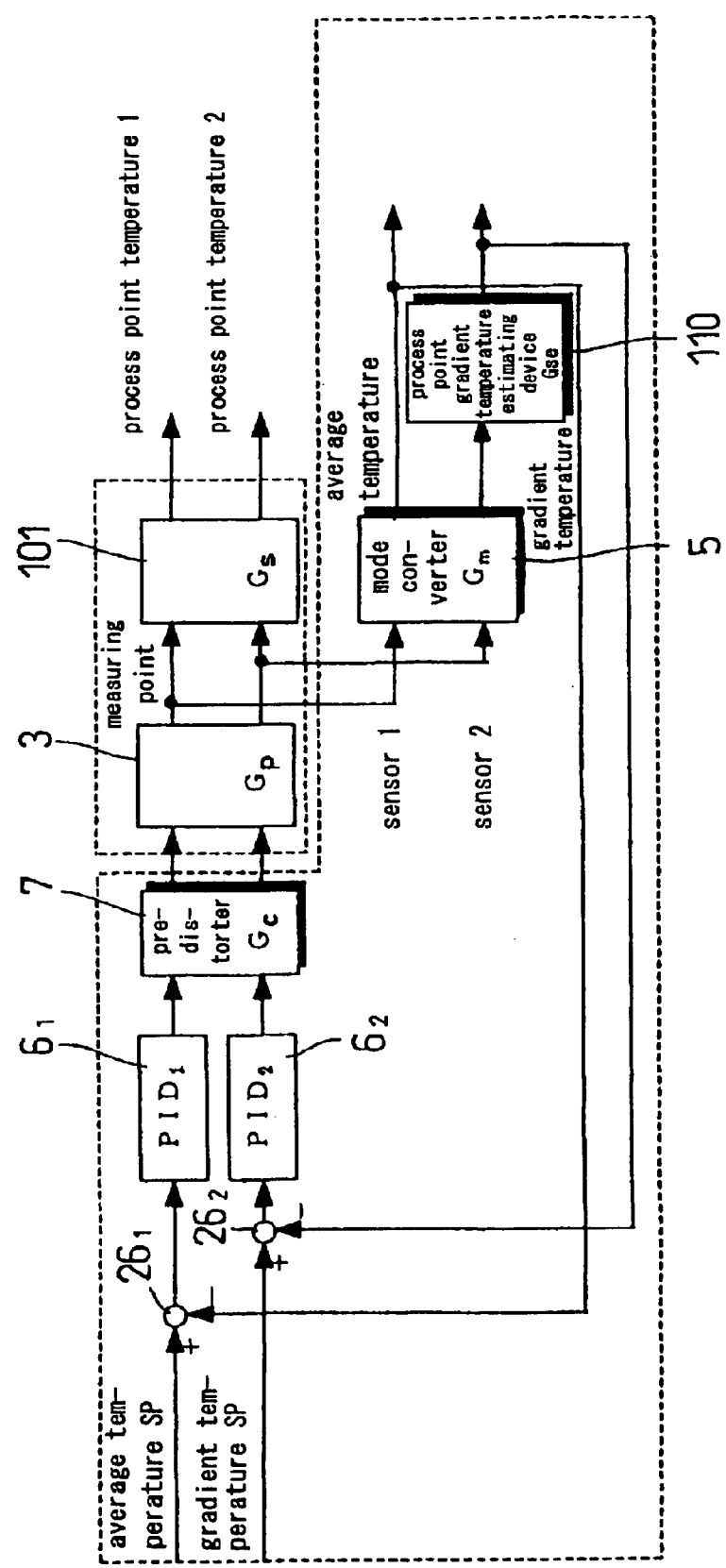
FIG. 80 is a block diagram of further another embodiment.

For example, as shown in FIG. 80, the mode converter 5 converts the detection temperatures of the temperature sensors into the average temperature and the gradient temperature, and the process point gradient temperature estimator 110 estimates the process point gradient temperature from the converted gradient temperature. This process point gradient temperature estimator 110 can be approximated by the model of aforementioned first order lag+dead time, or the like. It goes without saying that the average temperature of the process points can be estimated from the converted average temperature.

In each of the aforementioned embodiments, the average temperature or the gradient temperature is calculated to find the deviation from the target average temperature or the gradient target temperature; however, as further another embodiment of the present invention, it is possible to find the deviation of the estimation temperatures individually corresponding to the detection temperatures of the temperature sensors and the target estimation temperature, and from this deviation, to find the deviation of the average temperature or the deviation of the gradient temperature.

Figure 81:
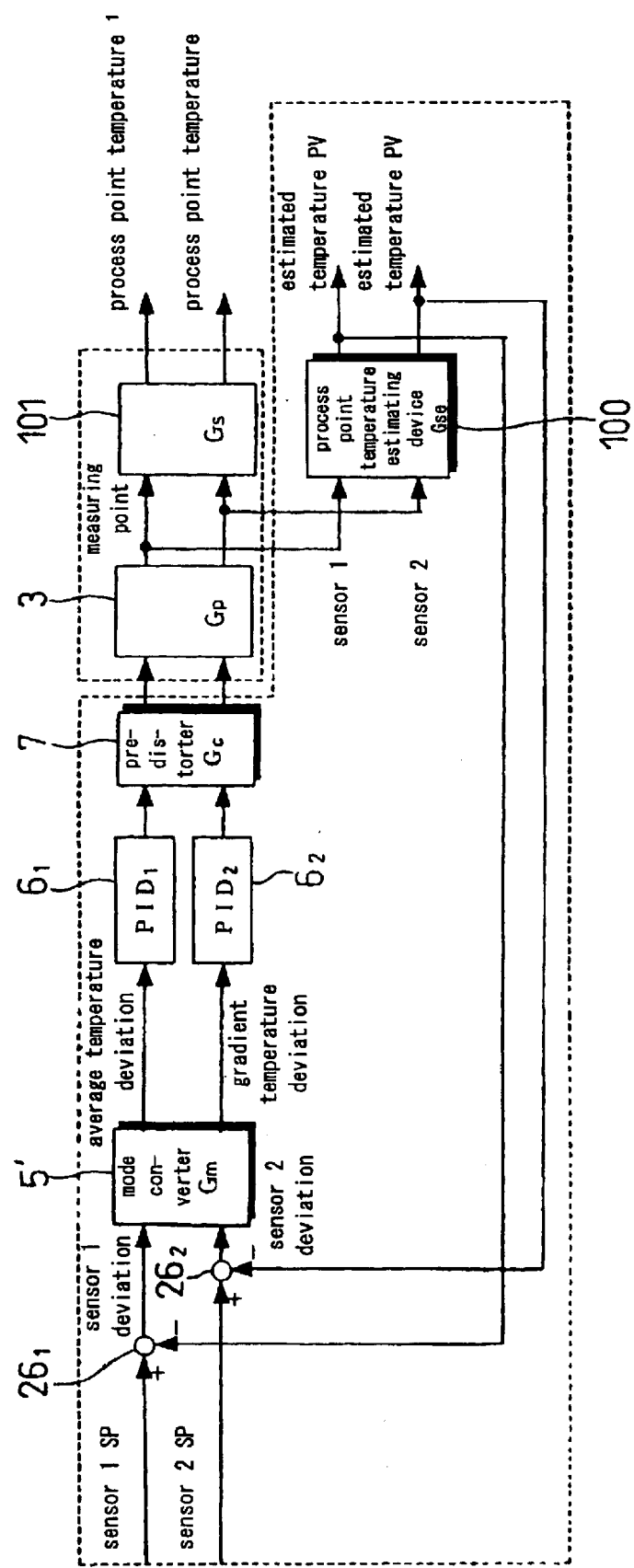
FIG. 81 is a block diagram of further another embodiment.

For example, as shown in FIG. 81, the mode converter 5' converts the temperature deviation between the estimation temperatures individually corresponding to the detection temperatures of the temperature sensors and the target temperature, that is the temperature deviation for each channel into the average temperature deviation which is the deviation between the average temperature and the target average temperature, and also into the gradient temperature deviation which is the deviation between the gradient temperature and the target gradient temperature.

In each of the aforementioned embodiments, the control deviation is found after the estimation temperatures individually corresponding to the detection temperatures are converted into the average temperature and the gradient temperature. In contrast, in this embodiment, the temperature deviation between the estimation temperature and the target temperature is found, and the temperature deviation is converted into the average temperature deviation and the gradient temperature deviation which are the control deviations.

In each of the aforementioned embodiments, the average temperature is used as the representative temperature; however, as another embodiment of the present invention, the temperature at the center zone or the temperature of the central position of the heat-treated plate which heats treat the wafer can be used as the representative temperature in place of the average temperature, thereby performing a control using the representative temperature and the gradient temperature as the amount of control.

Figure 82:
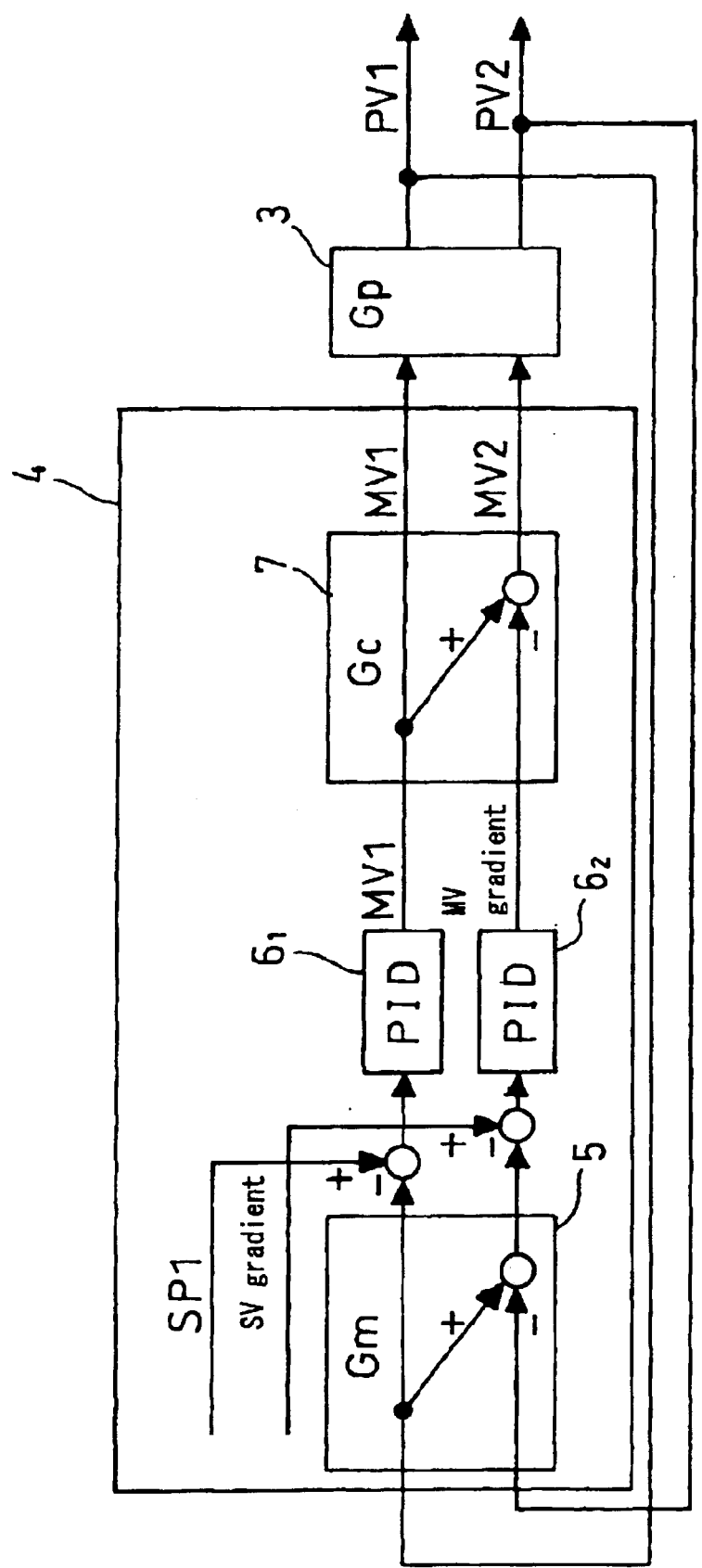
FIG. 82 is a block diagram of further another embodiment.

FIG. 82 shows an embodiment where the temperature of the central position of the heat-treated plate which is the control target 3 is used as the representative temperature.

In this embodiment, the mode conversion matrix Gm of the mode converter 5 is as follows, and the matrix Gc of the predistorter 7 is found by regarding the transmission function matrix Gp of the control target 3 has no interference (unit matrix).

[Numerical Formula 25]

$$Gm = \begin{pmatrix} 1 & 0 \\ 1 & -1 \end{pmatrix}$$

$$Gp = \begin{pmatrix} 1 & 0 \\ 0 & 1 \end{pmatrix}$$

$$Gc = (Gm \cdot Gp)^{-1}$$

$$= \left( \begin{pmatrix} 1 & 0 \\ 1 & -1 \end{pmatrix} \times \begin{pmatrix} 1 & 0 \\ 0 & 1 \end{pmatrix} \right)^{-1}$$

$$= \begin{pmatrix} 1 & 0 \\ 0 & -1 \end{pmatrix}^{-1}$$

$$= \begin{pmatrix} 1 & 0 \\ 1 & -1 \end{pmatrix}$$

The target temperature (target gradient temperature) of the gradient temperature is generally zero (which indicates the absence of temperature difference), so the portion to which SP gradient is added can be omitted.

Furthermore, this example uses the temperature of PV1 as the representative temperature; however, instead, PV2 can be used as the representative temperature, or the ratio of the weight such as heat capacitance or the importance on the temperature control can be multiplied and used as the average temperature or the representative temperature.

By doing so, the internal structure of the mode converter 5 and the predistorter 7 can be simplified.

In the above embodiment, only one of all the average temperatures is used as the average temperature; however, as another embodiment of the present invention, for instance, each average temperature in each group, that is, plural average temperature can be used.

Figure 83:
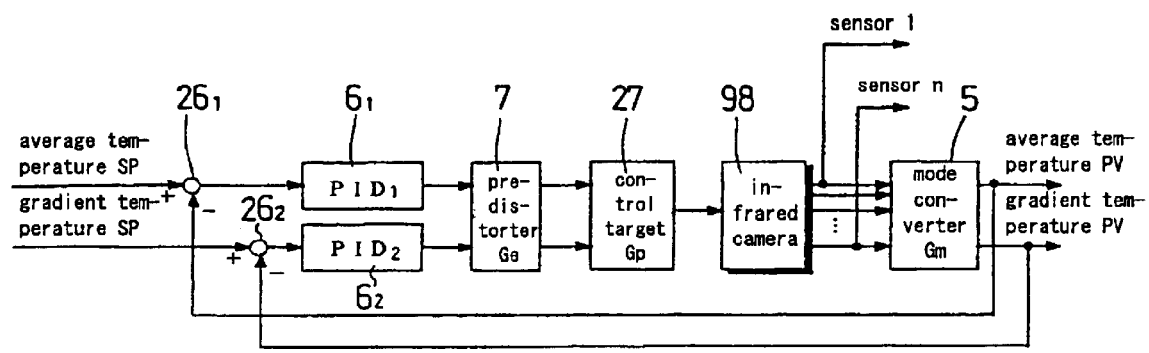
FIG. 83 is a block diagram of further another embodiment.

In each of the aforementioned embodiments, the temperatures of the control target such as a heat-treated plate are detected by plural temperature sensors; however, as another embodiment of the present invention, as shown in FIG. 83, the temperature sensors can be replaced by an infrared camera (thermo camera) 98 so as to detect the temperatures of the control target out of contact.

When the control target is flat in shape, information from the infrared camera 98 is entered to the mode converter 5, and the information about the average or the gradient of temperature distribution is taken out from a lot of information and controlled. Assuming that the number of pixels of the heat image from which the temperature is detected is n and the number of heaters to be controlled is m, the mode converter 5 becomes a matrix with n inputs and m outputs. In the case of FIG. 83, the number m of heaters is 2. The average temperature PV is obtained by calculating the average of all the pixels to be controlled, and the gradient temperature PV can indicate the portion between two heaters which changes most heavily.

Assuming that the average value of the pixels of the heat image corresponding to the region where plural temperature sensors detect temperatures (or the region where each heater is disposed) is the detection temperature of each temperature sensor, the structure of each of the aforementioned embodiments can be applied without any modification. As the simplest method, for example, assuming that the temperature of the pixels of the heat image corresponding to the center position where each temperature sensor is disposed (or the central position of each heater) is the detection temperature of each temperature sensor, each of the aforementioned embodiments can be applied without any modification. This is the case shown in FIG. 83 where the detection outputs of the infrared camera 98 are the temperatures of the pixels at two points corresponding to two temperature sensors.

Figure 84:
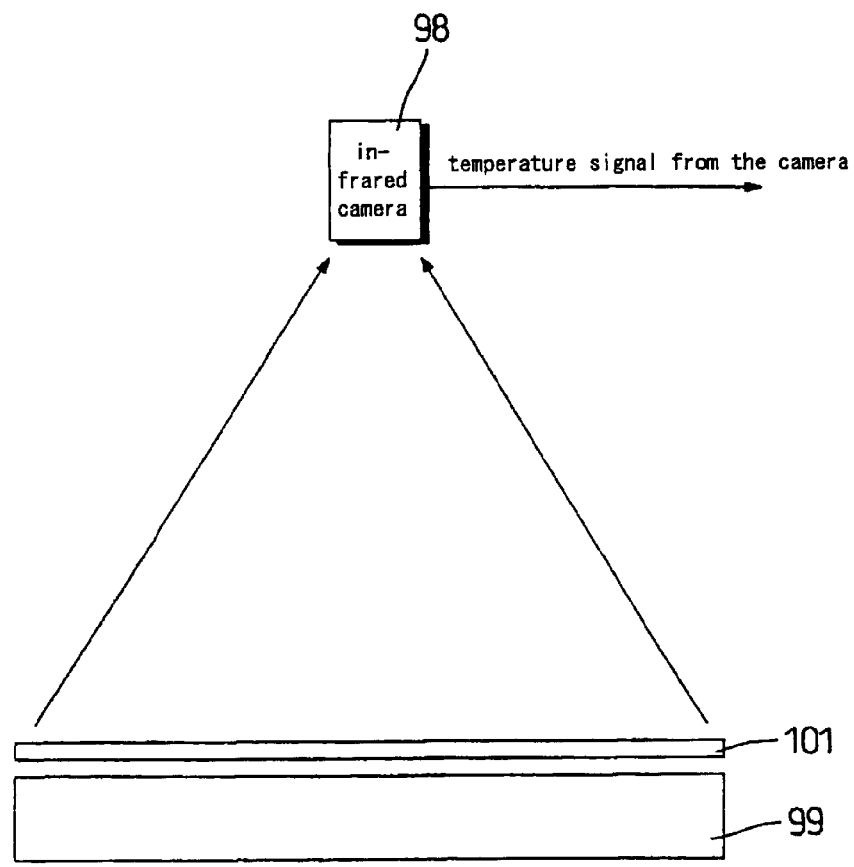
FIG. 84 is a block diagram of temperature detection.

With the use of the infrared camera 98, for example, as shown in FIG. 84, control can be done while directly monitoring the temperature of the object to be processed like a wafer to be treated with heat by the heat-treated plate 99. As a result, the temperature of the object 101 to be processed can be controlled with high precision, as compared with the control done by detecting the temperature of the heat-treated plate 99 by a contact-type temperature sensor such as a thermocouple. In addition, the detection points to detect temperatures can change easily.

Figure 85:
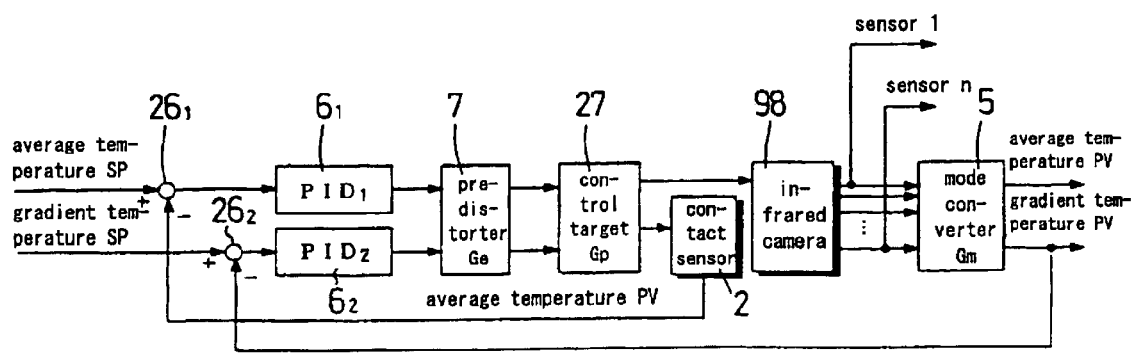
FIG. 85 is a block diagram of another embodiment.
Figure 86:
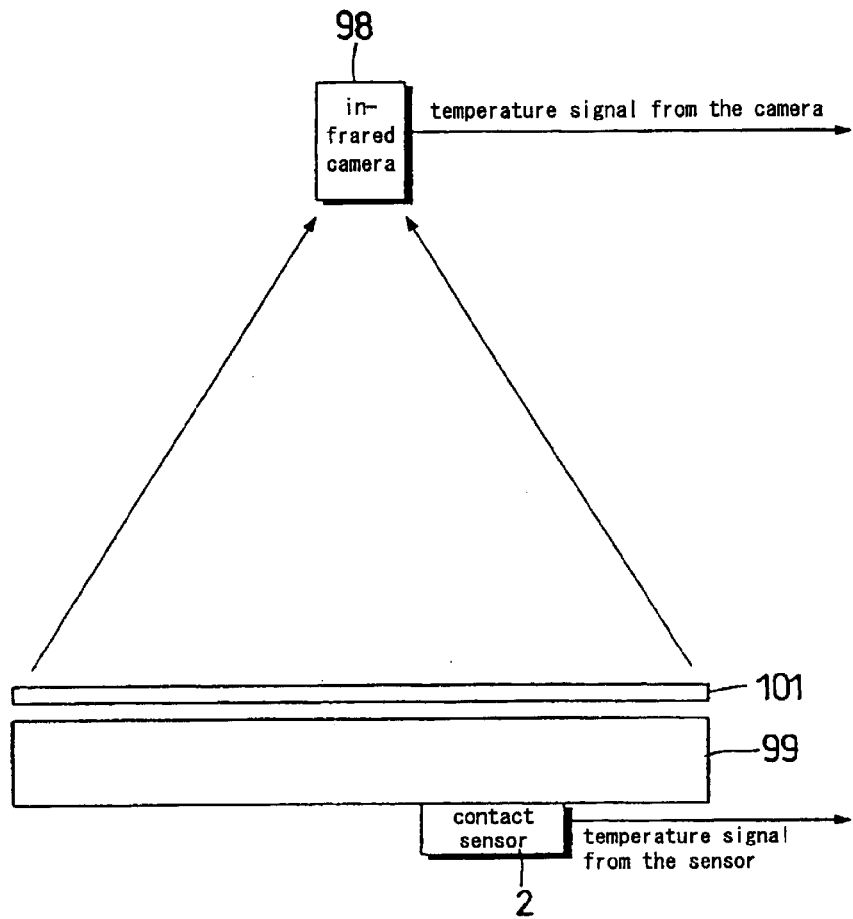
FIG. 86 is another block diagram of temperature detection.

FIGS. 85 and 86 are block diagrams of another embodiment of the present invention where the components corresponding to those in FIGS. 83 and 84 are referred to with the same reference symbols.

In this embodiment, the gradient temperature is controlled by signals from the infrared camera 98, whereas the average temperature is controlled by the contact-type temperature sensor 2 such as a thermocouple. The use of the detection signal of the contact-type temperature sensor 2 capable of measuring the absolute value of the temperature accurately as the average temperature can increase the precision of the average temperature control and compensates the low precision of the absolute value of the infrared camera 98.

Figure 87:
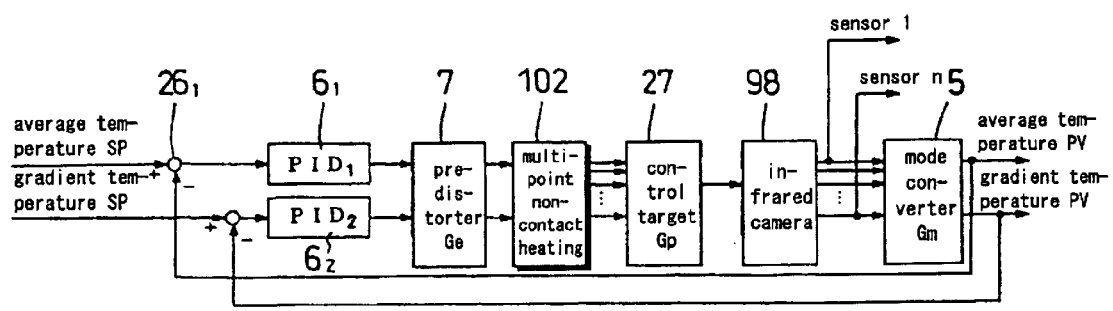
FIG. 87 is a block diagram of further another embodiment.

FIG. 87 is a block diagram of further another embodiment of the present invention where the components corresponding to those in FIG. 83 are referred to with the same reference symbols.

In this embodiment, the multi-point out-of-contact heating 102 is done by laser scanning in place of heaters, thereby performing a uniform control of temperature minutely.

Each of the aforementioned embodiments can be applied without any modification by assigning the regions to be heated by the heaters to the points to be heated by two-dimensional laser scanning.

In FIG. 87, the effective pixels are selected from the temperature detection signals for the number of pixels detected by the infrared camera 98, and the signals for the average temperature and the gradient temperature are calculated by the mode converter 5 so as to control the average temperature and the gradient temperature.

The present invention can be a combination of some of the aforementioned embodiments.

Although the aforementioned embodiments are applied to the PID control, the present invention can be applied to other control systems such as on-off control, proportion control, and integration control.

The heat treatment apparatus of the present invention can be applied for the temperature control in diffusion furnaces, CVC devices, the cylinder unit of injection molding machines, or the heater stage of packaging machines, besides heat oxidation apparatuses. In particular, it is suitable for the temperature control of a resin to be processed inside the cylinder of a molding machine.

The above embodiment is applied to the temperature control using a heating meansuch as a heater; however, it goes without saying that it can be applied to the temperature control using a Peltier element or a cooling device. It is also possible to apply the apparatus of this embodiment to the temperature control using both a heating means and a cooling means.

The present invention can be applied to the control of other physical conditions, such as pressure control for processing the object with pressure, flow rate, speed, or liquid level, besides the temperature control.

Figure 88:
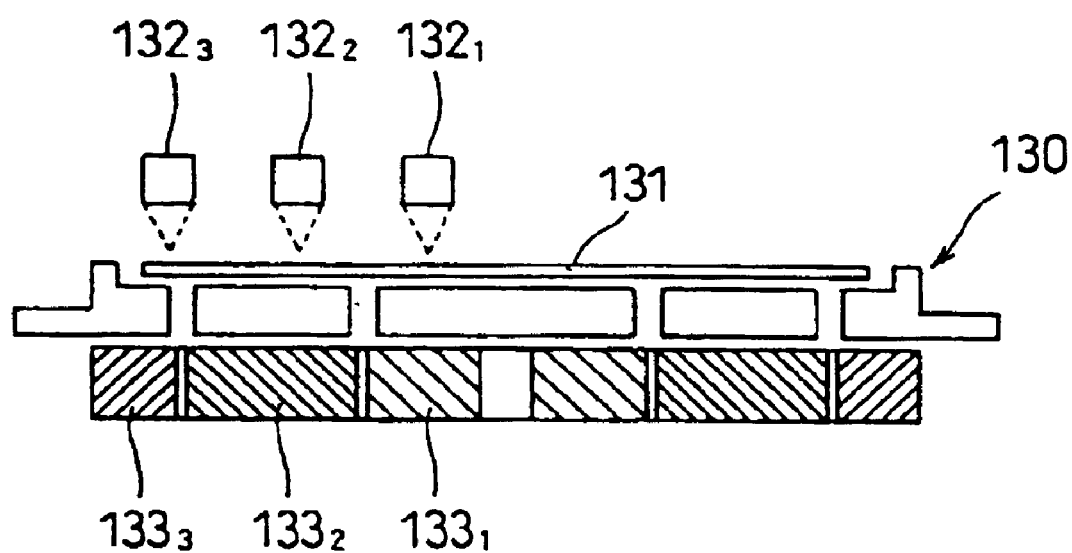
FIG. 88 is a block diagram of further another embodiment.

For example, in the case where a film is formed on the wafer 131 mounted on the wafer heat-treated plate 130 shown in FIG. 88, instead of controlling by the detection of temperature, the film thickness sensors 132$_1$ to 132$_3$ for measuring the film thickness out of contact are used to detect the thickness of the wafer 131 in each zone and calculate the average film thickness and the gradient film thickness. Based on these results, the heaters 133$_1$ to 133$_3$ in the zones are controlled so as to control the average film thickness and the gradient film thickness.

INDUSTRIAL APPLICABILITY

According to the present invention, in the control of a physical condition of the control target with interference, e.g., the temperature control of the control target, the interference can be reduced and high precision control is realized.

What is claimed is:

1. A controller comprising:

a converting means for converting detection information from plural detecting means for respectively detecting physical conditions of a control target into information indicating a gradation of said physical conditions and information indicating a representative of the physical conditions in accordance with a conversion matrix;

a plurality of condition control means individually given the information from said converting means; and a distribution means for distributing operation signals transmitted from said plurality of condition control means to a plurality of operating means for operating said control target so that control of each of said plurality of condition control means may produce less effect on control of another condition control means, said distribution means distributing the operation signals, based on a matrix of a distribution ratio found as a reverse matrix of the product of said conversion matrix by a matrix of a transmission function of said control target.

2. A controller according to claim 1, further comprising a limiting means which is disposed in the former stage of said distribution means and limits the operation signals from at least one of said condition control means.

3. A controller according to claim 1, further comprising a tuning means for tuning a balance in condition control between the condition control means to be supplied with the information indicating the gradient and the condition control means to be supplied with the information indicating the representative.

4. A controller according to claim 1, wherein a coefficient of transmission (transmission function) is previously found to determine a distribution ratio used in said distribution means by measuring changes in the detection information of said detecting means by changing the operation signals of said plurality of condition control means.

5. A controller comprising:

a converting means for converting a deviation between detection information from plural detecting means for respectively detecting physical conditions of a control target and plural pieces of target information individually corresponding to said plural detecting means into a deviation of information indicating a gradation of said physical conditions and a deviation of information indicating a representative of the physical conditions in accordance with a conversion matrix;

a plurality of condition control means for individually outputting operation signals by using as a control deviation the deviation of the information indicating said gradation or the deviation of the information indicating said representative from said converting means; and a distribution means for distributing the operation signals transmitted from said plurality of condition control means to a plurality of operating means for operating said control target so that control of each of said plurality of condition control means may produce less effect on control of another condition control means, said distribution means distributing the operation signals, based on a matrix of a distribution ratio found as a reverse matrix of the product of said conversion matrix by a matrix of a transmission function of said control target.

6. A controller according to claim 5, further comprising a limiting means which is disposed in the former stage of said distribution means and limits the operation signals from at least one of said plurality of condition control means.

7. A controller according to claim 5, further comprising a tuning means for tuning a balance in condition control between the condition control means which outputs an operation signal using the deviation of the information indicating said gradient as the control deviation, and the condition control means which outputs an operation signal using the deviation of the information indicating said representative as the control deviation.

8. A controller according to claim 5, wherein a coefficient of transmission (transmission function) is previously found to determine a distribution ratio used in said distribution means by measuring changes in the detection information of said detecting means by changing the operation signals of said plurality of condition control means.

9. A controller comprising:

a plurality of condition control means for individually outputting operation signals to a plurality of operating means individually corresponding to said detecting means, based on each deviation between plural pieces of detection information from the plurality of detecting means for detecting physical conditions of a control target and plural pieces of target information, and at least one interference-reducing control means for outputting, based on the deviation corresponding to one of the detecting means, an operation signal to one of the plurality of operating means that does not correspond to the one of said detecting means, wherein said plurality of condition control means and said interference-reducing control means function as:

a converting means for converting each deviation between the plural pieces of detection information and the plural pieces of target information into a deviation of information indicating a gradient of said physical conditions of the control target and a deviation of information indicating a representative of said physical conditions in accordance with a conversion matrix;

a plurality of condition control means for individually outputting operation signals, based on the deviation of the information indicating said gradient or the deviation of the information indicating said representative obtained from said converting means; and a distribution means for distributing the operation signals transmitted from said plurality of condition control means to a plurality of operating means for operating said control target so that control of each of said plurality of condition control means may produce less effect on control of another condition control means, said distribution means distributing the operation signals, based on a matrix of a distribution ratio found as a reverse matrix of the product of said conversion matrix by a matrix of a transmission function of said control target.

10. A controller comprising:

an estimating means for estimating physical conditions of an object to be processed and outputting plural pieces of estimation information, based on detection information transmitted from a plurality of detecting means for individually detecting physical conditions of a process means for processing said object;

a converting means for converting the plural pieces of estimation information estimated by said estimating means into information indicating a gradient of said physical conditions and information indicating a representative of the physical conditions;

a plurality of condition control means for individually outputting operation signals, based on the information indicating the gradient or the information indicating the representative transmitted from said converting means; and a distribution means for distributing the operation signals transmitted from said condition control means to a plurality of operating means for operating said processing means so that control of each of said plurality of condition control means may produce less effect on control of another condition control means.

11. A controller according to claim 10, further comprising a limiting means which is disposed in the former stage of said distribution means and limits the operation signals from at least one of said plurality of condition control means.

12. A controller according to claim 10, further comprising a tuning means for tuning a balance in condition control between the condition control means to be supplied with the information indicating said gradient and the condition control means to be supplied with the information indicating the representative.

13. A controller according to claim 10, wherein a coefficient of transmission (transmission function) is previously found to determine a distribution ratio used in said distribution means by measuring changes in the detection information of said detecting means by changing the operation signals of said plurality of condition control means.

14. A controller comprising:

an estimating means for estimating physical conditions of an object to be processed and outputting plural pieces of estimation information, based on detection information transmitted from a plurality of detecting means for individually detecting physical conditions of a processing means for processing said object;

a converting means for converting a deviation between plural pieces estimation information and plural pieces of target information estimated by said estimating means into a deviation of information indicating a gradient of said physical conditions and a deviation of information indicating a representative of the physical conditions;

a plurality of condition control means for individually outputting operation signals, using as a control deviation the deviation of information indicating said gradation or the deviation of information indicating the representative obtained from said converting means; and a distribution means for distributing the operation signals transmitted from said plurality of condition control means to a plurality of operating means for operating said processing means so that control of each of said plurality of condition control means may produce less effect on control of another condition control means.

15. A controller according to claim 14, further comprising a limiting means which is disposed in the former stage of said distribution means and limits the operation signals from at least one of said plurality of condition control means.

16. A controller according to claim 14, further comprising further comprising a tuning means for tuning a balance in condition control between the condition control means which outputs an operation signal using the deviation of the information indicating said gradient as the control deviation, and the condition control means which outputs an operation signal using the deviation of the information indicating said representative as the control deviation.

17. A controller according claim 14, wherein a coefficient of transmission (transmission function) is previously found to determine a distribution ratio used in said distribution means by measuring changes in the detection information of said detecting means by changing the operation signals of said plurality of condition control means.

18. A temperature regulator comprising:

a converting means for converting detection temperatures obtained from a plurality of temperature detecting means for individually detecting temperatures of a control target into gradient temperatures based on the plural detection temperatures and a representative temperature in accordance with a conversion matrix;

a plurality of temperature control means for outputting operation signals, using the gradient temperatures or the representative temperature obtained from said converting means as the amount of control; and a distribution means for distributing the operation signals transmitted from said each of temperature control means to a plurality of operating means for changing the temperatures of said control target so that control of each of the plurality of temperature control means may produce less effect on control of another temperature control means, said distribution means distributing said operation signals, based on a matrix of a distribution ratio found as a reverse matrix of the product of said conversion matrix by a matrix of a transmission function of said control target.

19. A temperature regulator according to claim 18, further comprising a limiter which is disposed in the former stage of said distribution means and limits the operation signals from at least one of said temperature control means.

20. A temperature regulator according to claim 18, further comprising a tuning means for tuning a balance in temperature control between the temperature control means which outputs an operation signal, using said gradient temperatures as the amount of control, and the temperature control means which outputs an operation signal, using said representative temperature as the amount of control.

21. A temperature regulator according to claim 20, wherein said tuning means adjusts at least either of the limiter for limiting the operation signals and a control parameter of said temperature control means according to a setting.

22. A temperature regulator according to claim 18, wherein a coefficient of transmission (transmission function) is previously found to determine a distribution ratio used in said distribution means by measuring changes in the detection temperatures of said each of temperature detecting means by changing the operation signals of said each of temperature control means.

23. A temperature regulator according to claim 22, wherein the operation signals of said each of temperature control means are changed sequentially so as to measure changes in the detection temperatures of said each of temperature detecting means.

24. A temperature regulator according to claim 23, wherein said coefficient of transmission (transmission function) is found by using step response or limit cycle.

25. A temperature regulator according to claim 18, wherein said representative temperature is an average temperature based on the plural detection temperatures, and said gradient temperature is a difference between the detection temperature of the temperature detecting means in one group, and the detection temperature of the temperature detecting means in the other group when said plurality of temperature detecting means are divided into two groups.

26. A temperature regulator according to claim 25, wherein said plurality of temperature control means individually output operation signals while inputting the control deviation between said average temperature and the target average temperature or the control deviation between said gradient temperature and the target gradient temperature, and a temperature control means which inputs the control deviation between the gradient temperature and the target gradient temperature, is made to have a larger amplitude than a temperature control means which inputs the control deviation between said average temperature and the target average temperature.

27. A temperature regulator according to claim 18, further comprising a correcting means for correcting control parameters of said temperature control means, based on said representative temperature or the target representative temperature.

28. A temperature regulator according to claim 18, further comprising a break detecting means for detecting a break in detection signal lines of said plurality of temperature detecting means.

29. A temperature regulator according to claim 18, further comprising a target temperature converting means for converting target temperatures individualistically corresponding to said plurality of temperature detecting means into target representative temperatures and target gradient temperatures.

30. A temperature regulator comprising:
a converting means for converting a temperature deviation between detection temperatures obtained from a plurality of temperature detecting means for individually detecting temperatures of a control target and plural target temperatures individualistically corresponding to said plurality of temperature detecting means into a deviation of gradient temperatures and a deviation of a representative temperature in accordance with a conversion matrix;
a plurality of temperature control means for individually outputting operation signals, using the deviation of the gradient temperatures or the deviation of the representative temperature obtained from said converting means as a control deviation; and
a distribution means for distributing the operation signals obtained from said each of temperature control means to a plurality of operating means for changing the temperatures of said control target so that control of each of said plurality of temperature control means may produce less effect on control of another temperature control means, said distribution means distributing the operation signals, based on a matrix of a distribution ratio found as a reverse matrix of the product of said conversion matrix by a matrix of a transmission function of said control target.

31. A temperature regulator according to claim 30, further comprising a limiter which is disposed in the former stage of said distribution means and limits the operation signals from at least one of said temperature control means.

32. A temperature regulator according to claim 30, further comprising a tuning means for tuning a balance in temperature control between the temperature control means which is given the deviation of said gradient temperatures and the temperature control means which is given the deviation of said representative temperature.

33. A temperature regulator according to claim 32, wherein said tuning means adjusts at least either of the limiter for limiting the operation signals and a control parameter of said temperature control means according to a setting.

34. A temperature regulator according to claim 30, wherein a coefficient of transmission (transmission function) is previously found to determine a distribution ratio used in said distribution means by measuring changes in the detection temperatures of said each of temperature detecting means by changing the operation signals of said each of temperature control means.

35. A temperature regulator according to claim 34, wherein the operation signals of said each of temperature control means are changed sequentially so as to measure changes in the detection temperatures of said each of temperature detecting means.

36. A temperature regulator according to claim 35, wherein said coefficient of transmission (transmission function) is found by using step response or limit cycle.

37. A temperature regulator according to claim 30, wherein said representative temperature is an average temperature based on the plural detection temperatures, and said gradient temperature is a difference between the detection temperature of the temperature detecting means in one group, and the detection temperature of the temperature detecting means in the other group when said plurality of temperature detecting means are divided into two groups.

38. A temperature regulator according to claim 37, wherein a temperature control means which outputs the operation signal, using the deviation of the gradient temperature as the control deviation is made to have a larger amplitude than a temperature control means which outputs the operation signal, using the deviation of the average temperature that is the representative temperature as the control deviation.

39. A temperature regulator according to claim 30, further comprising a break detecting means for detecting a break in detection signal lines of said plurality of temperature detecting means.

40. A temperature regulator, comprising:
a plurality of temperature control means for individually outputting operation signals to a plurality of operating means individualistically corresponding to said temperature control means, based on each of the temperature deviations between plural detection temperatures obtained from the plurality of temperature detecting means for individually detecting temperatures of a control target and plural target temperatures, and at least one interference-reducing control means for outputting, based on the temperature deviation corresponding to one of said temperature detecting means, an operation signal to one of the plurality of operating means that does not correspond to the one of said temperature detecting means, wherein said plurality of temperature control means and interference-reducing control means function as:

a converting means for converting each temperature deviation between said plural detection temperatures and the plural target temperatures into a deviation of the gradient temperatures and a deviation of a representative temperature in accordance with a conversion matrix;

a plurality of temperature control means for individually outputting operation signals, based on the deviation of the gradient temperatures or the deviation of the representative temperature obtained from said converting means; and a distribution means for distributing the operation signals transmitted from said each of temperature control means to a plurality of operating means for changing the temperatures of said control target so that control of each of said plurality of temperature control means may produce less effect on control of another temperature control means, said distribution means distributing the operation signals, based on a matrix of a distribution ratio found as a reverse matrix of the product of said conversion matrix by a matrix of a transmission function of said control target.

41. A temperature regulator comprising:

a temperature estimating means for estimating temperatures of an object to be processed and outputting plural estimation temperatures, based on detection temperatures obtained from a plurality of temperature detecting means for individually detecting temperatures of a heat treating means for heat-treating said object;

a converting means for converting the plural estimation temperatures estimated by said temperature estimating means into gradient temperatures and a typical representative temperature based on the plural estimation temperatures;

a plurality of temperature control means for individually outputting operation signals, using the gradient temperatures or the representative temperature obtained from said converting means as the amount of control; and a distribution means for distributing the operation signals transmitted from said plurality of temperature control means to a plurality of operating means for changing the temperature of said heat treating means so that control of each of said plurality of temperature control means may produce less effect on control of another temperature control means.

42. A temperature regulator according to claim 41, further comprising a disturbance estimating means for estimating an influence degree of disturbance to correct said detection temperatures of said temperature detecting means or the estimation temperatures of said temperature estimating means.

43. A temperature regulator according to claim 41, further comprising a limiter which is disposed in the former stage of said distribution means and limits the operation signals from at least one of said temperature control means.

44. A temperature regulator according to claim 41, further comprising a tuning means for tuning a balance in temperature control between the temperature control means which outputs an operation signal, using said gradient temperatures as the amount of control, and the temperature control means which outputs an operation signal, using said representative temperature as the amount of control.

45. A temperature regulator according to claim 44, wherein said tuning means adjusts at least either of the limiter for limiting the operation signals and a control parameter of said temperature control means according to a setting.

46. A temperature regulator of claim 41, wherein a coefficient of transmission (transmission function) is previously found to determine a distribution ratio used in said distribution means by measuring changes in the detection temperatures of said each of temperature detecting means by changing the operation signals of said each of temperature control means.

47. A temperature regulator according to claim 46, wherein the operation signals of said each of temperature control means are changed sequentially so as to measure changes in the detection temperatures of said each of temperature detecting means.

48. A temperature regulator according to claim 47, wherein the coefficient of transmission (transmission function) is found by using step response or limit cycle.

49. A temperature regulator according to claim 41, wherein said representative temperature is an average temperature based on the plural estimation temperatures, arid said gradient temperature is a difference between the estimation temperatures corresponding to the detection temperatures of the temperature detecting means in one group, and the estimation temperatures corresponding to the detection temperatures of the temperature detecting means in the other group when said plurality of temperature detecting means are divided into two groups.

50. A temperature regulator according to claim 49, wherein a temperature control means which outputs the operation signal, using the gradient temperature as the amount of control is made to have a larger amplitude than a temperature control means which outputs the operation signal, using the average temperature that is the representative temperature as the amount of control.

51. A temperature regulator according to claim 41, further comprising a correcting means for correcting control parameters of said temperature control means, based on said representative temperature or the target representative temperature.

52. A temperature regulator comprising:

a converting means for converting detection temperatures obtained from a plurality of temperature detecting means for individually detecting temperatures of a heat treating means for heat-treating an object to be processed into gradient temperatures and a typical representative temperature based on the plural detection temperatures;

a temperature estimating means for estimating the gradient temperatures and the representative temperature corresponding to said object, based on said gradient temperatures and the representative temperature;

a plurality of temperature control means for individually outputting operation signals, using said gradient temperatures or the representative temperature estimated by said temperature estimating means as the amount of control; and a distribution means for distributing the operation signals transmitted from said plurality of temperature control means to a plurality of operating means for changing the temperatures of said heat treating means so that control of each of said plurality of temperature control means may produce less effect on control of another temperature control means.

53. A temperature regulator according to claim 52, wherein
said temperature estimating means estimates at least part of the gradient temperatures and the representative temperature corresponding to said object to be processed, based on part of said gradient temperatures and the representative temperature converted by said converting means, and
as for the gradient temperatures and the representative temperature not estimated by said temperature estimation measures, the gradient temperatures obtained from the converting means or an average temperature can be given to said temperature control means.

54. A temperature regulator according to claim 52, further comprising a disturbance estimating means for estimating an influence degree of disturbance to correct said detection temperatures of said temperature detecting means or the estimation temperatures of said temperature estimating means.

55. A temperature regulator according to claim 52, further comprising a limiter which is disposed in the former stage of said distribution means and limits the operation signals from at least one of said temperature control means.

56. A temperature regulator according to claim 52, further comprising a tuning means for tuning a balance in temperature control between the temperature control means which outputs an operation signal, using said gradient temperatures as the amount of control, and the temperature control means which outputs an operation signal, using said representative temperature as the amount of control.

57. A temperature regulator according to claim 56, wherein said tuning means adjusts at least either of the limiter for limiting the operation signals and a control parameter of said temperature control means according to a setting.

58. A temperature regulator according to claim 52, wherein a coefficient of transmission (transmission function) is previously found to determine a distribution ratio used in said distribution means by measuring changes in the detection temperatures of said each of temperature detecting means by changing the operation signals of said each of temperature control means.

59. A temperature regulator according to claim 58, wherein the operation signals of said each of temperature control means are changed sequentially so as to measure changes in the detection temperatures of said each of temperature detecting means.

60. A temperature regulator of claim 59, wherein said coefficient of transmission (transmission function) is found by using step response or limit cycle.

61. A temperature regulator according to claim 52, wherein said representative temperature is an average temperature based on the plural detection temperatures, and said gradient temperature is a difference between the detection temperature of the temperature detecting means in one group, and the detection temperature of the temperature detecting means in the other group when said plurality of temperature detecting means are divided into two groups.

62. A temperature regulator according to claim 61, wherein a temperature control means which outputs the operation signal, using the gradient temperature as the amount of control is made to have a larger amplitude than a temperature control means which outputs the operation signal, using the average temperature that is the representative temperature as the amount of control.

63. A temperature regulator according to further claim 52, further comprising a correcting means for correcting control parameters of said temperature control means, based on said representative temperature or the target representative temperature.

64. A temperature regulator comprising:
a temperature estimating means for estimating temperatures of an object to be processed and outputting plural estimation temperatures, based on detection temperatures obtained from a plurality of temperature detecting means for individually detecting temperatures of a heat treating means for heat-treating said object;
a converting means for converting a deviation between plural estimation temperatures estimated by said temperature estimating means and plural target temperatures into a deviation of gradient temperatures and a deviation of a typical representative temperature;
a plurality of temperature control means for individually outputting operation signals, using the deviation of the gradient temperatures or the deviation of said representative temperature obtained from said converting means as a control deviation; and
a distribution means for distributing the operation signals transmitted from said each of temperature control means to a plurality of operating means for operating said heat treating means so that control of each of said plurality of temperature control means may produce less effect on control of another temperature control means.

65. A temperature regulator according to claim 64, further comprising a disturbance estimating means for estimating an influence degree of disturbance to correct said detection temperatures of said temperature detecting means or the estimation temperatures of said temperature estimating means.

66. A temperature regulator according to claim 64, further comprising a limiter which is disposed in the former stage of said distribution means and limits the operation signals from at least one of said temperature control means.

67. A temperature regulator according to claim 64, further comprising a tuning means for tuning a balance in temperature control between the temperature control means which outputs an operation signal, using the deviation of said gradient temperatures as a control deviation, and the temperature control means which outputs an operation signal, using the deviation of said representative temperature as the control deviation.

68. A temperature regulator according to claim 67, wherein said tuning means adjusts at least either of the limiter for limiting the operation signals and a control parameter of said temperature control means according to a setting.

69. A temperature regulator according to claim 64, wherein a coefficient of transmission (transmission function) is previously found to determine a distribution ratio used in said distribution means by measuring changes in the detection temperatures of said each of temperature detecting means by changing the operation signals of said each of temperature control means.

70. A temperature regulator according to claim 69, wherein the operation signals of said each of temperature control means are changed sequentially so as to measure changes in the detection temperatures of said each of temperature detecting means.

71. A temperature regulator according to claim 70, wherein said coefficient of transmission (transmission function) is found by using step response or limit cycle.

72. A temperature regulator according to claim 64, wherein said representative temperature is an average temperature based on the plural estimation temperatures, and said gradient temperature is a difference between the estimation temperatures corresponding to the detection temperatures of the temperature detecting means in one group, and the estimation temperatures corresponding to the detection temperatures of the temperature detecting means in the other group when said plurality of temperature detecting means are divided into two groups.

73. A temperature regulator according to claim 72, wherein a temperature control means which outputs the operation signal, using the deviation of the gradient temperature as the control deviation is made to have a larger amplitude than a temperature control means which outputs the operation signal, using the deviation of the average temperature that is the representative temperature as the control deviation.

74. A heat treatment apparatus comprising:
a heat treating means;
a plurality of temperature detecting means for detecting temperatures of said heat treating means;
a plurality of operating means for changing the temperatures of said heat treating means; and
a temperature regulator, wherein said temperature regulator comprises:
a converting means for converting detection temperatures obtained from said plurality of temperature detecting means into gradient temperatures based on plural detection temperatures and a representative temperature in accordance with a conversion matrix;
a plurality of temperature control means for individually outputting operation signals using the gradient temperatures or the representative temperature obtained from said converting means as the amount of control; and
a distribution means for distributing the operation signals from said each of temperature control means into said plurality of operating means so that control of each of said plurality of temperature control means may produce less effect on control of another temperature control means, said distribution means distributing said operation signals, based on a matrix of a distribution ratio found as a reverse matrix of the product of said conversion matrix by a matrix of a transmission function of said control target.

75. A heat treatment apparatus comprising:
a heat treating means;
a plurality of temperature detecting means for detecting temperatures of said heat treating means; a plurality of operating means for changing the temperatures of said heat treating means; and
a temperature regulator, wherein
said temperature regulator comprises:
a converting means for converting a temperature deviation between detection temperatures obtained from said plurality of temperature detecting means and plural target temperatures individualistically corresponding to said plurality of temperature detecting means into a deviation of gradient temperatures and a deviation of a representative temperature in accordance with a conversion matrix;
a plurality of temperature control means for individually outputting operation signals, using the deviation of the gradient temperatures or the deviation of the representative temperature obtained from said converting means as a control deviation; and
a distribution means for distributing the operation signals from said each of temperature control means into said plurality of operating means so that control of each of said plurality of temperature control means may produce less effect on control of another temperature control means, said distribution means distributing the operation signals, based on a matrix of a distribution ratio found as a reverse matrix of the product of said conversion matrix by a matrix of a transmission function of said control target.

76. A heat treatment apparatus, comprising:
a heat treating means;
a plurality of temperature detecting means for detecting temperatures of said heat treating means;
a plurality of operating means for changing the temperatures of said heat treating means; and
a temperature regulator, comprising:
a plurality of temperature control means for individually outputting operation signals to said plurality of operating means individualistically corresponding to said temperature detecting means, based on the temperature deviations between plural detection temperatures obtained from said plurality of temperature detecting means and plural target temperatures; and
at least one interference-reducing control means for outputting an operation signal, based on the temperature deviation corresponding to one of said temperature detecting means, to one of said plurality of operating means that does not correspond to said one of said temperature detecting means, and wherein
said plurality of temperature control means and said interference-reducing control means of said temperature regulator function as:
a converting means for converting each temperature deviation between said plural detection temperatures and the plural target temperatures into a deviation of gradient temperatures and a deviation of a representative temperature in accordance with a conversion matrix;
a plurality of temperature control means for individually outputting operation signals, based on the deviation of the gradient temperatures or the deviation of the representative temperature obtained from said converting means; and
a distribution means for distributing the operation signals transmitted from said each of temperature control means to said plurality of operating means so that control of each of said plurality of temperature control means may produce less effect on control of another temperature control means, said distribution means distributing the operation signals, based on a matrix of a distribution ratio found as a reverse matrix of the product of said conversion matrix by a matrix of a transmission function of said control target.

77. A heat treatment apparatus comprising:
a heat treating means for heat-treating an object to be processed; a plurality of operating means for changing temperatures of said heat treating means; a plurality of temperature detecting means for detecting the temperatures of said heat treating means; and a temperature regulator, wherein
said temperature regulator comprises:
a temperature estimating means for estimating temperatures of said object and outputting plural estimation temperatures, based on detection temperatures obtained from said plurality of temperature detecting means;

a converting means for converting the plural estimation temperatures estimated by said temperature estimating means into gradient temperatures and a typical representative temperature based on the plural estimation temperatures;

a plurality of temperature control means for individually outputting operation signals, using the gradient temperatures or the representative temperature obtained from said converting means as the amount of control; and a distribution means for distributing the operation signals transmitted from said each of temperature control means to said plurality of operating means so that control of each of said plurality of temperature control means may produce less effect on control of another temperature control means.

78. A heat treatment apparatus comprising:

a heat treating means for heat-treating an object to be processed;

a plurality of operating means for changing temperatures of said heat treating means;

a plurality of temperature detecting means for detecting the temperatures of said heat treating means; and a temperature regulator, wherein said temperature regulator comprises:

a converting means for converting detection temperatures obtained from said plurality of temperature detecting means into gradient temperatures and a representative temperature based on the plural detection temperatures;

a temperature estimating means for estimating the gradient temperatures and the representative temperature corresponding to said object, based on said gradient temperatures and the representative temperature;

a plurality of temperature control means for individually outputting operation signals, using said gradient temperatures or the representative temperature estimated by said temperature estimating means as the amount of control; and a distribution means for distributing the operation signals transmitted from said plurality of temperature control means to said plurality of operating means so that control of each of said plurality of temperature control means may produce less effect on control of another temperature control means.

79. A heat treatment apparatus comprising:

a heat treating means for heat-treating an object to be processed;

a plurality of operating means for changing temperatures of said heat treating means; a plurality of temperature detecting means for detecting the temperatures of said heat treating means; and a temperature regulator, wherein said temperature regulator comprises:

a temperature estimating means for estimating temperatures of said object and outputting plural estimation temperatures, based on the detection temperatures obtained from said plurality of temperature detecting means;

a converting means for converting a deviation between plural estimation temperatures estimated by said temperature estimating means and plural target temperatures into a deviation of gradient temperatures and a deviation of a typical representative temperature;

a plurality of temperature control means for individually outputting operation signals, using the deviation of the gradient temperatures or the deviation of the representative temperature obtained from said converting means as a control deviation; and a distribution means for distributing the operation signals transmitted from said each of temperature control means to said plurality of operating means so that control of each of said plurality of temperature control means may produce less effect on control of another temperature control means.

* * * * *